(12) United States Patent
McClain et al.

(10) Patent No.: US 8,392,135 B2
(45) Date of Patent: Mar. 5, 2013

(54) METHODS AND SYSTEMS FOR ANALYZING PERFORMANCE OF A SORTING SYSTEM

(75) Inventors: Stephen B. McClain, St. Charles, MO (US); James J. Schuster, Olathe, KS (US); Ricky G. Byers, Florissant, MO (US); Gerald L. Adams, Sugar Grove, IL (US)

(73) Assignee: Smurfit-Stone Container Enterprises, Inc., Chicago, IL (US)

( * ) Notice: Subject to any disclaimer, the term of this patent is extended or adjusted under 35 U.S.C. 154(b) by 323 days.

(21) Appl. No.: 12/855,576

(22) Filed: Aug. 12, 2010

(65) Prior Publication Data

US 2012/0037547 A1    Feb. 16, 2012

(51) Int. Cl.
*G06F 15/00* (2006.01)

(52) U.S. Cl. .......... 702/81; 702/128; 702/182; 702/187; 702/189; 209/617; 209/900; 209/645; 209/584; 700/223; 700/227

(58) Field of Classification Search .................. 702/128, 702/182, 187, 189; 209/3.1, 19, 659, 12.1, 209/617, 900, 645, 592, 584, 583; 700/224, 700/223, 216, 231, 227, 237; 705/29, 34, 705/39; 271/3, 14, 4.01
See application file for complete search history.

(56) References Cited

U.S. PATENT DOCUMENTS

| | | | |
|---|---|---|---|
| 4,630,191 A | 12/1986 | Strosser | |
| 4,951,452 A | 8/1990 | Lundahl et al. | |
| 5,043,908 A * | 8/1991 | Manduley et al. | 700/227 |
| 5,239,919 A | 8/1993 | Maki et al. | |
| 5,501,567 A * | 3/1996 | Lanzdorf et al. | 414/408 |
| 5,730,037 A | 3/1998 | Manning | |
| 6,032,122 A * | 2/2000 | Gertner et al. | 715/772 |
| 6,337,451 B1 * | 1/2002 | De Leo | 209/584 |
| 6,360,186 B1 | 3/2002 | Durbin | |
| 6,408,261 B1 | 6/2002 | Durbin | |
| 6,423,254 B1 * | 7/2002 | Bertoglio | 264/45.3 |
| 6,453,270 B1 | 9/2002 | Durbin | |
| 6,533,124 B1 * | 3/2003 | Tacito et al. | 209/3.1 |
| 6,587,806 B2 * | 7/2003 | Mangiameli et al. | 702/128 |
| 6,651,820 B2 * | 11/2003 | Takizawa | 209/546 |
| 6,687,656 B2 | 2/2004 | Durbin et al. | |
| 6,830,805 B2 * | 12/2004 | Bertoglio | 428/306.6 |
| 6,856,847 B2 | 2/2005 | Kao et al. | |
| 7,081,217 B2 * | 7/2006 | Treleaven | 264/40.1 |
| 7,124,059 B2 | 10/2006 | Wetzer et al. | |
| 7,264,124 B2 * | 9/2007 | Bohlig et al. | 209/30 |
| 7,341,156 B2 * | 3/2008 | Bohlig et al. | 209/592 |
| 7,379,782 B1 | 5/2008 | Cocco | |
| 7,462,649 B2 * | 12/2008 | Nakao et al. | 521/48 |
| 7,611,018 B2 * | 11/2009 | Bohlig et al. | 209/559 |
| 7,846,985 B1 * | 12/2010 | Azulay et al. | 521/40 |
| 7,893,307 B2 * | 2/2011 | Smith | 585/241 |

(Continued)

*Primary Examiner* — Carol Tsai
(74) *Attorney, Agent, or Firm* — Armstrong Teasdale LLP

(57) ABSTRACT

A method for analyzing performance of a sorting system is provided. The method includes recording downtime experienced by the sorting system, recording runtime experienced by the sorting system, and recording an optimal characterization of a product stream to be sorted by the sorting system. The optimal characterization includes at least an optimal weight of a first commodity of the product stream. An actual characterization of the product stream as sorted by the sorting system is recorded. The actual characterization includes at least an actual weight of the first commodity sorted from the product stream. The method further includes determining the performance of the sorting system based on at least two of the downtime, the runtime, the optimal characterization, and the actual characterization.

12 Claims, 33 Drawing Sheets

U.S. PATENT DOCUMENTS

| | | | |
|---|---|---|---|
| 7,937,184 B2* | 5/2011 | Stemmle | 700/223 |
| 7,947,916 B2* | 5/2011 | Stemmle | 209/584 |
| 8,046,192 B2* | 10/2011 | McClain et al. | 702/182 |
| 8,127,933 B2* | 3/2012 | Bohlig et al. | 209/555 |
| 8,202,918 B2* | 6/2012 | Azulay et al. | 521/45.5 |
| 2002/0031654 A1* | 3/2002 | Bertoglio | 428/304.4 |
| 2003/0110142 A1 | 6/2003 | Sesek et al. | |
| 2004/0049369 A1 | 3/2004 | Konicek et al. | |
| 2005/0004390 A1* | 1/2005 | Nakao et al. | 560/89 |
| 2005/0126958 A1* | 6/2005 | Bohlig et al. | 209/19 |
| 2005/0242006 A1* | 11/2005 | Bohlig et al. | 209/659 |
| 2006/0157388 A1* | 7/2006 | Blaine et al. | 209/3.2 |
| 2006/0254957 A1* | 11/2006 | Bohlig et al. | 209/12.1 |
| 2007/0299150 A1* | 12/2007 | Nakao et al. | 521/48 |
| 2008/0237093 A1* | 10/2008 | Bohlig et al. | 209/3.1 |
| 2009/0007484 A1* | 1/2009 | Smith | 44/606 |
| 2009/0070338 A1* | 3/2009 | Spitzig et al. | 707/10 |
| 2009/0222240 A1* | 9/2009 | McClain et al. | 702/182 |
| 2010/0072114 A1* | 3/2010 | Briane | 209/522 |

* cited by examiner

METHODS AND SYSTEMS FOR ANALYZING PERFORMANCE OF A SORTING SYSTEM

BACKGROUND OF THE INVENTION

The embodiments described herein relate generally to the monitoring of industrial equipment and, more particularly, to monitoring the performance of a sorting system for use in a recycling facility.

Sorting loose solid waste material streams, usually including several types of commodities, into single commodities is common in refuse disposal and recycling and is used routinely, for example, at recycling centers, manufacturing facilities, and/or retail and wholesale stores to separate at least one commodity from a product stream. Equipment and machinery for sorting the product streams, often referred to as sorting systems, are typically utilized to sort the refuse material through a series of screens and/or stations. For example, using spaced-apart rollers, a screen allows most of the product stream to pass through the rollers while passing at least one commodity over the rollers, thus, separating the larger items that do not pass through the rollers. Further, at least some commodities are sorted from the product stream by hand.

As recycling becomes more central to industrial and manufacturing processes, sorting systems play an important role in efficient processing of recyclable materials. Effectively evaluating performance aspects of sorting systems in use to achieve efficient and optimal operation of sorting systems is challenging in a number of aspects and so far has been elusive.

BRIEF SUMMARY OF THE INVENTION

In one aspect, a method for analyzing performance of a sorting system is provided. The method includes recording downtime experienced by the sorting system, recording runtime experienced by the sorting system, and recording an optimal characterization of a product stream to be sorted by the sorting system. The optimal characterization includes at least an optimal weight of a first commodity of the product stream. An actual characterization of the product stream as sorted by the sorting system is recorded. The actual characterization includes at least an actual weight of the first commodity sorted from the product stream. The method further includes determining the performance of the sorting system based on at least two of the downtime, the runtime, the optimal characterization, and the actual characterization.

In another aspect, a method for monitoring downtime of a sorting system is provided. The method includes providing a monitoring interface within the sorting system and providing at least one sensor within the sorting system. The at least one sensor is coupled in communication with the monitoring interface to input data to the monitoring interface. When the inputted data indicates that at least a portion of the sorting system is experiencing downtime, the method includes beginning recording of the downtime and qualifying the downtime. When the inputted data indicates that at least the portion of the sorting system has been enabled, the method includes ending the recording of the downtime. The recorded downtime is output.

In yet another aspect, a method for characterizing a product stream to be sorted is provided. The method includes sampling the product stream to determine an optimal characterization of the product stream. The optimal characterization includes at least an optimal weight of a first commodity within the product stream. The method further includes feeding the product stream into a sorting system, weighing the product stream as the product stream is fed into the sorting system, sorting at least the first commodity from the product stream using the sorting system, weighing the first commodity sorted from the product stream to determine an actual weight of the first commodity, and outputting the optimal weight of the first commodity and the actual weight of the first commodity.

In still another aspect, a sorting system is provided. The sorting system includes at least one sensor positioned within the sorting system, and a computer system coupled in communication with the at least one sensor to receive data from the at least one sensor. The computer system is configured to record downtime experienced by the sorting system, record runtime experienced by the sorting system, record an optimal characterization of a product stream to be sorted by the sorting system, and record an actual characterization of the product stream as sorted by the sorting system. The optimal characterization includes at least an optimal weight of a first commodity of the product stream, and the actual characterization includes at least an actual weight of the first commodity sorted from the product stream. The performance of the sorting system is determined based on at least two of the downtime, the runtime, the optimal characterization, and the actual characterization.

BRIEF DESCRIPTION OF THE DRAWINGS

FIGS. 1-29 show exemplary embodiments of the systems and methods described herein.

FIG. 1 is a schematic view of an exemplary sorting system.

FIG. 2 is a top view of the sorting system shown in FIG. 1.

FIG. 3 is a block diagram of a monitoring interface that may be used with the sorting system shown in FIGS. 1 and 2.

FIG. 4 is a simplified block diagram of an exemplary computer system that may include the monitoring interface shown in FIG. 3.

FIG. 5 is an expanded block diagram of an exemplary embodiment of a server architecture that may be used with the computer system shown in FIG. 4.

FIG. 6 is a flowchart of an exemplary downtime monitoring method that may be used with the systems shown in FIGS. 3-5.

FIG. 7 is a flowchart of an exemplary characterization method that may be used with the systems shown in FIGS. 3-5.

FIG. 8 is a flowchart of an exemplary performance analysis method that may be used with the systems shown in FIGS. 3-5.

FIGS. 9-21 illustrate exemplary embodiments of a user interface for the systems shown in FIGS. 3-5, wherein:

FIG. 9 is a main/production screen;
FIG. 10 is a setup menu screen;
FIG. 11 is a shift menu screen;
FIG. 12 is an operator menu screen;
FIG. 13 is a maintenance menu screen;
FIG. 14 is a counts screen;
FIG. 15 is a stream screen;
FIG. 16 is a down code menu screen;
FIG. 17 is a screen down code screen;
FIG. 18 is a glass cleaning down code screen;
FIG. 19 is a metering drum down code screen;
FIG. 20 is a conveyor down code screen; and
FIG. 21 is a system down code screen.

FIGS. 22, 23, and 24 illustrate exemplary embodiments of reports and analysis data produced by the systems shown in FIGS. 3-5, wherein:

FIG. 24 represents a report including a downtime categories section.

FIGS. 25-29 illustrate exemplary sorting system comparison charts produced by the systems shown in FIGS. 3-5, wherein:

FIG. 25 is a representative downtime chart for a first single sorting system;

FIG. 26 is representative downtime chart for a second single sorting system;

FIG. 27 is a representative sorter system comparison chart for a first group of sorting systems;

FIG. 28 is a representative sorter system comparison chart for a second group of sorting systems; and FIG. 29 is a representative sorter system comparison chart for a third group of sorting systems.

DETAILED DESCRIPTION OF THE INVENTION

Figure 1:
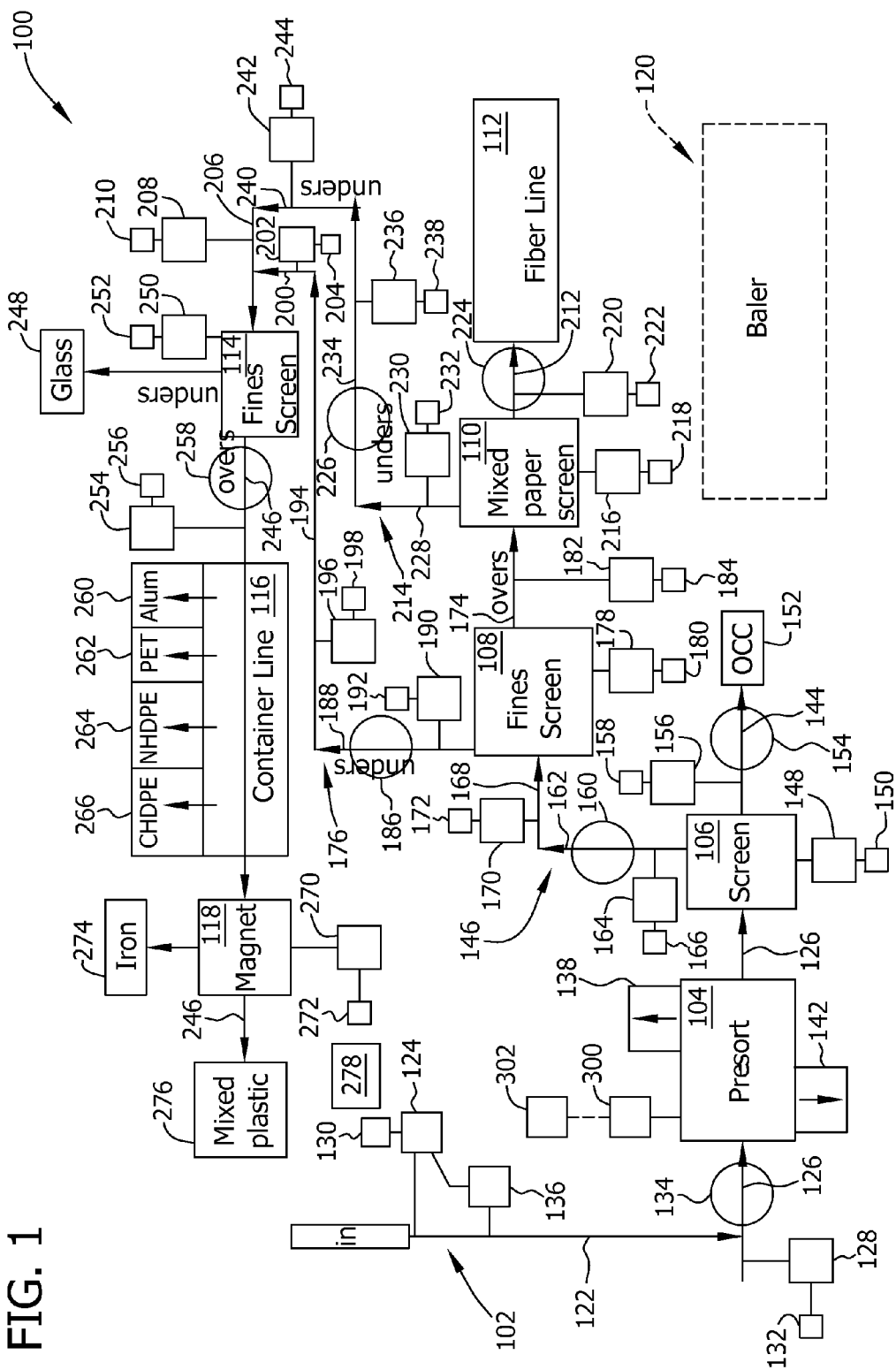

Exemplary embodiments of interfaces, systems, and methods are disclosed herein that overcome problems, difficulties, and disadvantages discussed herein for monitoring and analyzing operating performance of sorting systems. This is achieved, at least in part, with the provision of monitoring interfaces that are local to a sorting system, and performance interfaces that may be remote from the sorting system. In some embodiments, the performance interfaces may be interactive web-based systems. Methods for collecting and analyzing data relating to operation of a number of sorting systems are also disclosed.

Data and information related to the sorting systems may be archived in system databases and, with menu driven user interface and graphic displays, operators may quickly provide runtime and downtime data inputs associated with the respective sorting systems. With the performance interfaces, operators can quickly evaluate sorting system production and performance issues, including but not limited to, identifying underperforming sorting systems, permitting effective diagnostic and troubleshooting procedures to optimize sorting system performance, facilitating corrective action to optimize sorting system operation, and directly comparing performance data among different sorting systems to reveal operating trends that facilitate strategic planning for a reclamation facility. Interested parties, such as reclamation facility management personnel, may identify optimal modes of sorting system operation in different facilities. Performance feedback for a plurality of sorting systems in a plurality of locations may be centralized and made available in summary form and in a detailed form to a variety of different persons in different facilities.

The following detailed description illustrates embodiments of the invention by way of example and not by way of limitation. It is contemplated that the invention has general application to monitoring downtime of a system, optimizing estimates, and/or analyzing the performance of a system. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, the term "product stream" refers to a quantity, such as a truckload, of materials that are to be sorted by a sorting system. The product stream can include all materials put out for recycling within a neighborhood, business, and/or facility. The terms "single stream" and/or "commingled stream" refer to a product stream that includes items formed from several different types of materials. The terms "single commodity stream" and/or "non-commingled stream" refer to a product stream that includes substantially one material. Although the non-commingled stream includes mostly one type of material, the non-commingled stream may include other materials. For example, a non-commingled stream of newspaper may include a small amount of items formed from corrugated cardboard and/or other types of paper products. Further, as used herein, the term "commodity" refers to items formed from a one particular type of material. For example, without limitation, corrugated cardboard, fibers, glass, aluminum, colored high-density polyethylene (hereinafter referred to as "CHDPE"), natural high-density polyethylene (hereinafter referred to as "NHDPE"), polyethylene terephthalate (hereinafter referred to as "PET"), iron, and/or mixed plastics are each considered a commodity. As such, a commingled stream includes several commodities in varying amounts, and a non-commingled stream includes mostly one commodity with relatively small amounts, if any, of other commodities. A container, area, and/or room for storing a commodity after separation from a product stream is referred to herein as a "commodity bunker."

Moreover, as used herein, the term "upstream" refers to a direction toward a beginning of a sorting system, and the term "downstream" refers to a direction toward a commodity bunker and/or other ending location of a sorting system. The term "overs" as used herein refers to items and/or materials that pass over rollers of a screen, and the term "unders" as used herein refers to items and/or materials that pass and/or fall through the rollers of the screen.

In order to appreciate the disclosed embodiments to their fullest extent, the following disclosure will be divided into different parts or segments, wherein Part I discusses particular problems of evaluating sorting system performance; Part II discloses an exemplary sorting system; Part III discloses exemplary interface and computer systems for monitoring, analyzing, and evaluating sorting system performance; Part IV discloses exemplary processes utilized by the systems of Part III to perform monitoring and/or analysis; Part V discusses exemplary user interfaces implementing the interface and computer systems and processes disclosed in Parts III and IV; Part VI discusses exemplary reports and charts produced by the interface and computer systems and processes disclosed in Parts III and IV; and Part VII provides a conclusion.

I. Introduction

Sorting systems can make grouping similar commodities easier and cheaper, as well as more profitable to collect. Objectively evaluating the performance of any given sorting system, however, including but not limited to, sorting system 100 (shown in FIGS. 1 and 2), is a difficult task. A number of difficult issues have so far have impeded a reliable and accurate evaluation of sorting system production and performance in any particular installation. For example, the sorting systems can be very large, quite complex, and rather expensive. Operating the sorting systems in an optimal manner is key to recouping significant costs for acquiring and maintaining the sorting systems. For a variety of reasons, it is often difficult to assess, however, whether any given sorting system is actually operating in an optimal manner.

With respect to sorting systems, an optimal manner of operation includes, not only a high level of throughput (as in baling machines), but a high level of accuracy in the sorting because more accurate sorting maximizes the recovery of a product stream entering a sorting system. As such, an optimal manner of operation may include slowing a throughput of a sorting system to achieve higher accuracy of sorting. Moreover, a make up of a product stream by percentage of each type of commodity that may be present within the product stream, i.e. a characterization of the product stream, determines a potential level of recovery from a particular product stream. A bid for a product stream is based on an estimated characterization of the product stream. If the estimated characterization is not substantially close to an actual characterization of the product stream, then the recovery on that product stream may be adversely affected. As such, it is important to be able to accurately characterize a product stream from a certain provider or location to more accurately estimate future characterization of similar product streams. Further, if the characterization of the stream is not substantially recovered by the sort system it can adversely affect the sustainability model needed to process like streams.

Further, a number of potential equipment failure conditions, error conditions, and/or maintenance issues may present themselves with such complicated machinery. Such conditions may result in so-called downtime conditions wherein a sorting system may not sort a product stream into single commodities unless appropriate maintenance procedures are completed or unless error conditions or equipment failures are rectified. In some instances, system-related downtime conditions can represent a substantial portion of otherwise available production time.

Downtime conditions, however, also may be attributable to other factors apart from the sorting system itself, including but not limited to, a lack of material being fed to the sorting system, operator break times, or other times when an otherwise operable sorting system is not being used to sort a stream.

Downtime conditions are specifically contrasted with runtime conditions. Runtime conditions correspond to normal operation of the sorting system with a stream being sorted into commodities by the system. Of course, one goal of operating the sorting system is to minimize downtime and maximize runtime with a high level of sorting accuracy, but because of the various causes of downtime that are both machine-related and human-related, it can be difficult to evaluate whether or how downtime conditions can be decreased.

As previously noted, many different types of refuse materials may be sorted using sorting systems, and the sorting systems themselves are available in various sizes and configurations. The sorting systems typically include many different adjustable operating settings and operating modes geared toward different materials and different needs. The sorting systems, however, are often operated by personnel having varying levels of expertise, and also different preferences in operating the systems, such that different operators may choose different settings for the systems. In particular, discerning the limitations of a sorting system from the limitations of its operators can be especially difficult.

The output capability of the sorting system is partially dependent on the ability of its operators to select the most appropriate operating settings, personnel levels, and modes for materials being sorting, and also in properly operating and maintaining the system components. While the operators tend to be skilled workers, and much effort is made to properly train them, the operational results of sorting systems may vary widely amongst human teams tasked with operating them. Consistently identifying and using the optimal system settings can be difficult, and sometimes is a trial and error process where the implications of certain system settings and modes to overall machine performance is poorly understood, if it is understood at all. Simply put, a sorting system being run at sub-optimal settings will not produce optimal outputs, but is often not apparent when sub-optimal system settings are being used. Consequently, it can therefore be difficult to assess whether there is room for improvement in runtime performance of the sorting system.

Still further, many different types of refuse materials may be sorted using such sorting systems, and sorting systems are available in various sizes and configurations, with various numbers of screens and other sorting machines, making it difficult to compare the performance of different sorting systems to one another. This can be particularly problematic from a strategic planning perspective in which facility managers are trying to decide, for example, what types of equipment to purchase to complement existing equipment or whether existing equipment should be replaced.

For at least these reasons, efficient and optimal operation of sorting systems is difficult to objectively assess, and more difficult to achieve. Such problems are compounded when trying to evaluate a number of different sorting systems in different facilities.

As an illustrative example, a significant producer in the sorting industry may own eleven different sorting systems, including sorting systems provided by several different manufacturers having different numbers of component machines, with many of the sorting systems being customized to meet particular needs of the respective reclamation facilities in which they are located. The locations may include, for example, ten different plants with diverse product streams, commodity form, and product mix. Different workers at the different plants operate the sorting systems in multiple shifts. The management challenges in tracking and evaluation performance of the sorting systems in such circumstances are simply enormous.

With each sorting system being a component of a larger collection of sorting systems, assessing the performance of the network requires assessment of the respective contribution of each sorting system to the overall network. For at least the reasons set forth above, however, assessing the performance of individual sorting systems, let alone the collection of sorting systems, is elusive.

II. An Exemplary Sorting System

The computer systems and methods described herein can be used with any suitable sorting system. One example of a sorting system is described herein, but it should be understood that a sorting system can have various stations, conveyors, storage areas, and/or other components in any suitable order and/or configuration that enables a commingled stream to be sorted into single commodities. Further, although scale sensors are positioned at the below-described locations within the sorting system, the sorting system can include more or less scale sensors at additional and/or alternative locations within the sorting system. For example, scale sensors may be positioned along each conveyor of the sorting system or at each location in which a commodity is sorted from the product stream. Moreover, although each motor described below includes a respective motor sensor, it should be understood that less than all of the motors within the sorting system may include a motor sensor.

Figure 2:
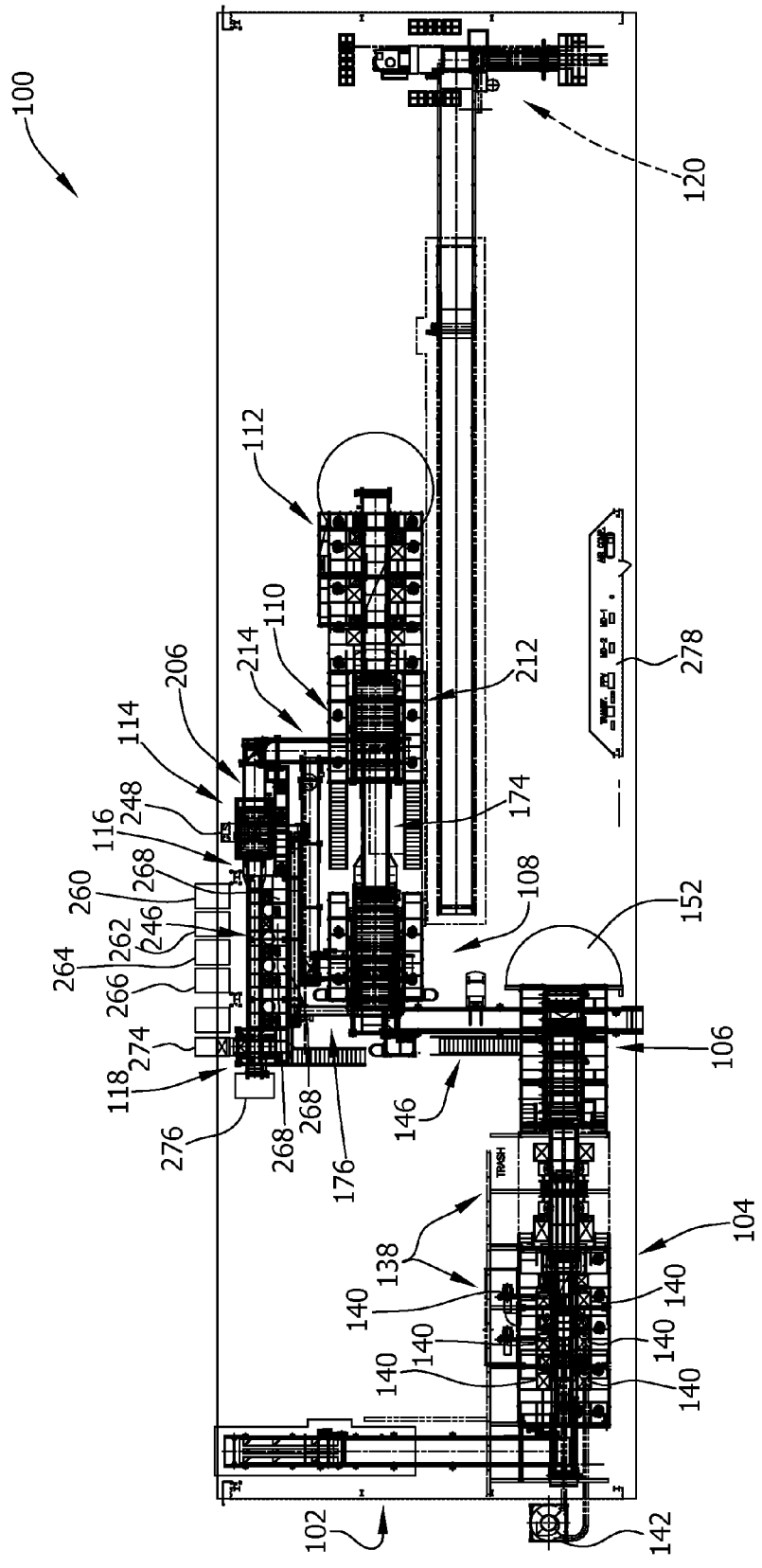

FIG. 1 is a schematic view of an exemplary sorting system 100. FIG. 2 is a top view of sorting system 100. In the exemplary embodiment, sorting system 100 includes an in-feed conveyor 102, a pre-sorting station 104, a first paper screen 106, a first fines screen 108, a second paper screen 110, a fiber line station 112, a second fines screen 114, a container line station 116, and a magnet station 118. Sorting system 100 also includes a monitoring interface 300 located at sorting system 100 and a performance interface 302 located at sorting system 100 and/or remote from sorting system 100. A baler 120 may be provided in or near a facility housing sorting system 100 to bale sorted commodities output by sorting system 100.

In-feed conveyor 102 includes a first conveyor belt 122 powered by a motor 124, and a second conveyor belt 126 powered by a motor 128. A motor sensor 130 and 132 is coupled to a respective motor 124 or 128 to measure and/or sense a movement of motor 124 and/or 128. In the exemplary embodiment, first conveyor belt 122 is angled upward from a ground level or below ground level to a height of pre-sorting station 104, and second conveyor belt 126 is at a height to extend through pre-sorting station 104. Alternatively, second conveyor belt 126 extends to pre-sorting station 104, and another conveyor extends through pre-sorting station 104. In the exemplary embodiment, first conveyor belt 122 extends slightly above second conveyor belt 126 to drop an incoming product stream onto second conveyor belt 126. A scale sensor 134 is located along second conveyor belt 126, slightly downstream of a location where the product stream is dropped onto second conveyor belt 126, and scale sensor 134 is configured to measure a weight of the product stream on in-feed conveyor 102. Further, an eye sensor 136 is positioned along in-feed conveyor 102, such as at first conveyor belt 122, and is configured to determine if material is present on in-feed conveyor 102. Eye sensor 136 is coupled in communication with at least motor 124 and/or 128 to stop in-feed conveyor 102 when no material is present on in-feed conveyor 102 and/or to determine if sorting system 100 is experiencing downtime. Although only one eye sensor 136 is described herein, it should be understood that any number of eye sensors can be positioned through sorting system 100 at any suitable locations for determining if a material is present on or in a component of sorting system 100.

Pre-sorting station 104 is located above a plurality of bunkers 138 and includes a plurality of workstations 140 positioned along second conveyor belt 126. Each workstation 140 is configured to enable a human worker to hand pick items from the product stream and deposit those items in a bunker 138. For example, the worker hand picks plastic bags, trash, and/or items that cannot pass through components of sorting system 100 from the product stream and places the item into a chute that channels the item to the appropriate bunker 138. In the exemplary embodiment, each workstation 140 is located near an overhead vacuum chute that pulls plastic bags into a container 142. Second conveyor belt 126 extends to first paper screen 106 to channel the product stream into first paper screen 106.

First paper screen 106 is a coarse screen configured to direct corrugated cardboard (hereinafter referred to as "OCC") over rollers of first paper screen 106 onto a third conveyor 144 and to allow the remainder of the product stream to fall through the rollers of first paper screen 106 onto a fourth conveyor 146 as unders. First paper screen 106 includes a motor 148 that rotates the rollers and a motor sensor 150 configured to measure and/or sense movement of motor 148. During operation of first paper screen 106, the OCC is collected within an OCC bunker, container, and/or area 152 at an end of third conveyor 144. A scale sensor 154 is positioned along third conveyor 144 to measure a weight of the OCC as it is discharged from first paper screen 106. The OCC remains within area 152 for baling and/or transport. Third conveyor 144 also includes a motor 156 having a motor sensor 158. A scale sensor 160 is positioned along fourth conveyor 146 to measure a weight of the remaining product stream.

Fourth conveyor 146 may include one or more conveyor belts depending on a layout of sorting system 100. In the exemplary embodiment, fourth conveyor 146 includes a first conveyor belt 162 having a motor 164 and a motor sensor 166 and a second conveyor belt 168 having a motor 170 and a motor sensor 172. The product stream falls onto first conveyor belt 162 and is transferred to second conveyor belt 168. Second conveyor belt 168 extends to first fines screen 108 for sorting the product stream. As such, fourth conveyor 146 transports the product stream from first paper screen 106 to first fines screen 108.

First fines screen 108 is a screen configured to direct mixed papers over rollers of first fines screen 108 onto a fifth conveyor 174 and to allow the remainder of the product stream to fall through the rollers of first fines screen 108 onto a sixth conveyor 176 as unders. First fines screen 108 includes a motor 178 that rotates the rollers and a motor sensor 180 configured to measure and/or sense movement of motor 178. During operation of first fines screen 108, mixed papers are directed onto fifth conveyor 174 as overs for transfer to second paper screen 110. Fifth conveyor 174 includes a motor 182 having a motor sensor 184. A scale sensor 186 is positioned along sixth conveyor 176 to measure a weight of the remaining product stream.

Sixth conveyor 176 may include one or more conveyor belts depending on a layout of sorting system 100. In the exemplary embodiment, sixth conveyor 176 includes a first conveyor belt 188 having a motor 190 and a motor sensor 192, a second conveyor belt 194 having a motor 196 and a motor sensor 198, and a third conveyor belt 200 having a motor 202 and a motor sensor 204. The product stream falls onto first conveyor belt 188 from first fines screen 108 and is transferred to second conveyor belt 194 then to third conveyor belt 200. Third conveyor belt 200 extends to a seventh conveyor 206 that extends to second fines screen 114 for sorting the product stream. As such, sixth conveyor 176 transports the product stream from first fines screen 108 to second fines screen 114. Further, seventh conveyor 206 includes a motor 208 having a twelfth motor sensor 210.

Second paper screen 110 is a screen configured to direct fibers over rollers of second paper screen 110 onto an eighth conveyor 212 and to allow the remainder of the product stream to fall through the rollers of second paper screen 110 onto a ninth conveyor 214 as unders. Second paper screen 110 includes a motor 216 that rotates the rollers and a motor sensor 218 configured to measure and/or sense movement of motor 216. During operation of second paper screen 110, the fibers are directed onto eighth conveyor 212 as overs for transfer to fiber line station 112. Within fiber line station 112, the fibers are further sorted by hand and/or using optic technology. Alternatively, the fibers remain within fiber line station for baling and/or transport. In the exemplary embodiment, eighth conveyor 212 includes a motor 220 having a motor sensor 222. A scale sensor 224 is positioned along eighth conveyor 212 to measure a weight of the fibers. A scale sensor 226 is positioned along ninth conveyor 214 to measure a weight of the remaining product stream.

Ninth conveyor 214 may include one or more conveyor belts depending on a layout of sorting system 100. In the exemplary embodiment, ninth conveyor 214 includes a first conveyor belt 228 having a motor 230 and a motor sensor 232, a second conveyor belt 234 having a motor 236 and a motor sensor 238, and a third conveyor belt 240 having a motor 242 and a motor sensor 244. The product stream falls onto first conveyor belt 228 from second paper screen 110 and is transferred to second conveyor belt 234 then to third conveyor belt 240. Third conveyor belt 240 extends to seventh conveyor 206 that extends to second fines screen 114 for sorting the product stream. As such, ninth conveyor 214 transports the product stream from second paper screen 110 to second fines screen 114.

Second fines screen 114 is a fine screen configured to direct the remaining product stream over rollers of second fines screen 114 onto a tenth conveyor 246 while allowing glass to fall through the rollers of second fines screen 114 into a glass bunker 248 as unders. Alternatively, a conveyor transports the glass from second fines screen 114 to glass bunker 248. In the exemplary embodiment, glass is cleaned, paper is removed from glass, and/or the unders are separated into fines and cullets within glass bunker 248. Second fines screen 114 includes a motor 250 that rotates the rollers and a motor sensor 252 configured to measure and/or sense movement of motor 250. During operation of second fines screen 114, the remaining product stream is directed onto tenth conveyor 246 as overs for transfer to container line station 116. Tenth conveyor 246 includes a motor 254 having a motor sensor 256. A scale sensor 258 is positioned along tenth conveyor 246 to measure a weight of the remaining product stream.

Tenth conveyor 246 extends through container line station 116 to magnet station 118, however, it should be understood that a separate conveyor may extend through container line station 116 and tenth conveyor 246 only extends to container line station 116. Container line station 116 is located above a plurality of bunkers 260, 262, 264, and 266 and includes a plurality of workstations 268 positioned along tenth conveyor 246. Each workstation 268 is configured to enable a human worker to hand pick items from the product stream and deposit those items in a bunker 260, 262, 264, and/or 266. For example, the worker hand picks items formed from CHDPE, NHDPE, PET, and/or aluminum from the product stream and places the item into a chute that channels the item to the appropriate bunker 260, 262, 264, and/or 266. More specifically, each workstation 268 includes at least one chute leading to a CHDPE bunker 266, a NHDPE bunker 264, a PET bunker 262, and/or an aluminum bunker 260. In particular embodiments, at least one workstation 268 is configured to enable a worker to hand pick items formed from one or two of the target materials while another workstation 268 is configured to enable another worker to hand pick items formed from the remaining target materials from the product stream. In the exemplary embodiment, tenth conveyor 246 extends to magnet station 118 to channel the product stream into and through magnet station 118. Alternatively, a separate conveyor extends through magnet station 118 and tenth conveyor 246 extends to magnet station 118.

In the exemplary embodiment, magnet station 118 includes a powered magnet that rotates substantially perpendicularly to tenth conveyor 246 to pull items formed from iron from the product stream. A motor 270 drives magnet station 118, and a motor sensor 272 measures and/or senses movements of motor 270. A device within magnet station removes the iron products from the magnet to allow the iron products to fall into an iron bunker 274. Alternatively, the iron products fall from the magnet onto a conveyor for transport to iron bunker 274. In the exemplary embodiment, tenth conveyor 246 ends at a mixed plastic bunker 276. Accordingly, sorting system 100 is configured to remove all but mixed plastic items from the product stream using pre-sorting station 104, first paper screen 106, first fines screen 108, second paper screen 110, second fines screen 114, container line station 116, and magnet station 118. Any of the sorted commodities can be removed from a bunker to baler, such as an in-feed conveyor of baler 120, to be baled for storage and/or transport.

Further, sorting system 100 includes a control system 278 coupled in communication with each sensor 130, 132, 134, 136, 150, 154, 158, 160, 166, 172, 180, 184, 186, 192, 198, 204, 210, 218, 222, 224, 226, 232, 238, 244, 252, 256, 258, and 272 in sorting system 100 (hereinafter referred to in Part II as "the sensors"). Based on inputs from the sensors and/or an operator, control system 278 controls sorting system 100. For example, depending on operator inputs and/or the sensor inputs, control system 278 controls a speed of conveyors 102, 144, 146, 174, 176, 206, 212, 214, and/or 246 (hereinafter referred to in Part II as "the conveyors") and/or screens 106, 108, 110, and/or 114. In one embodiment, based on the sensor inputs, control system 278 automatically stops a component and/or sorting system 100, for example, without limitation, when a mechanical, electrical, structural, jam, overload, and/or no material situation occurs within sorting system 100. In another embodiment, based on the operator input, control system 278 starts or stops sorting system 100 at, for example, beginnings and ends of shifts, breaks, meetings, jams, cleaning, and/or emergencies. Control system 278 is also coupled in communication with monitoring interface 300 and performance interface 302. Connections to control system 278 are omitted from FIGS. 1 and 2 for the sake of clarity, however it should be understood how and what connections exist based on the descriptions herein.

Monitoring interface 300 and performance interface 302 are configured to perform the methods and processes described herein. In the exemplary embodiment, monitoring interface 300 includes the sensors and a user interface 700 (shown in FIGS. 9-21). Monitoring interface 300 is configured to automatically receive input from the sensors, and to manually receive input from operators of sorting system 100. Although in the exemplary embodiment, monitoring interface 300 is shown as being at pre-sorting station 104, but it should be understood that components of monitoring interface 300 are distributed throughout sorting system 100, and user interface 700 of monitoring interface 300 can be positioned at pre-sorting station 104 and/or at any other suitable location within a facility housing sorting system 100.

Performance interface 302 is coupled in communication with monitoring interface 300 and is positioned locally and/or remotely. Performance interface 302 is configured to receive data from at least one monitoring interface 300 and to process the received data as described herein. In particular embodiments, performance interface 302 is coupled in communication with a plurality of monitoring interfaces 300 located at a plurality of sorting systems. In such an embodiment, performance interface 302 is configured to analyzed the performance of each sorting system of the plurality of sorting systems using the data received from the plurality of monitoring interfaces 300.

III. Monitoring and Performance System

The problems described in Part I are overcome in large part with the provision of monitoring and performance interfaces that comprehensively gather and analyze a variety of different data relating to runtime and downtime conditions of sorting systems. The interfaces described herein provide much needed insight for objectively evaluating sorting systems, either individually or collectively. The interfaces are amenable to monitoring and tracking performance of various types of sorting systems in various locations, and facilitate identification of trends and allow comparisons to be drawn and conclusions to be made regarding potential improvements to be made toward optimizing their use. Strategic planning is also facilitated by using the interfaces and computer systems described herein.

In one embodiment, the computer systems described herein use a computer program that is embodied on a computer readable medium and that utilizes a Structured Query Language (SQL) with a client user interface front-end for administration and a web interface for standard user input and reports. In an exemplary embodiment, the computer systems are web enabled and are run on a business-entity intranet. In yet another embodiment, the computer systems are fully accessed by individuals having an authorized access outside the firewall of the business-entity through the Internet. In a further exemplary embodiment, the computer systems are being run in a Windows® environment (Windows is a registered trademark of Microsoft Corporation, Redmond, Wash.) and/or on a mainframe environment and a UNIX® server environment (UNIX is a registered trademark of AT&T, New York, N.Y.). The applications described herein are flexible and designed to run in various different environments without compromising any major functionality.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
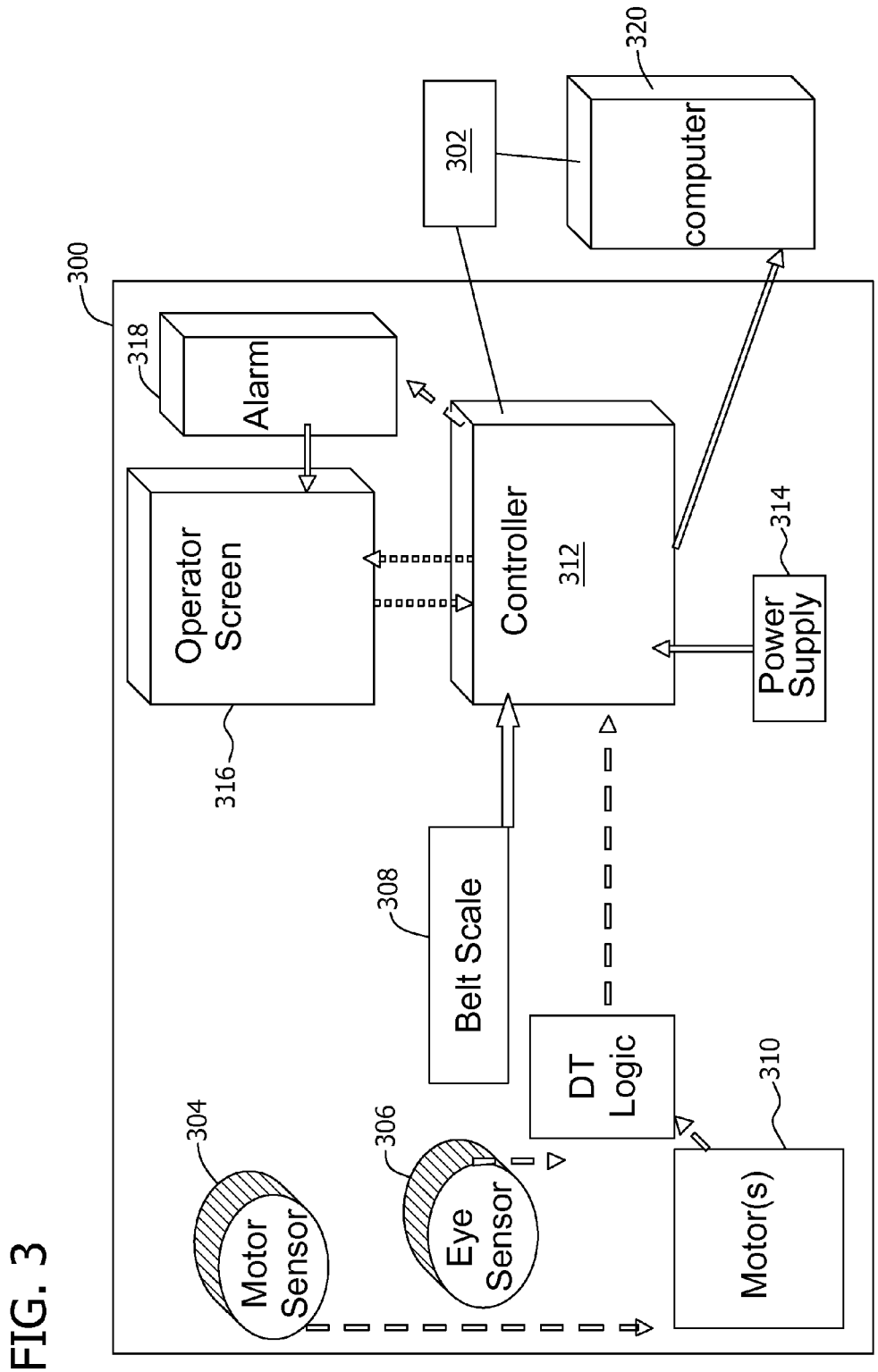

FIG. 3 is a block diagram of monitoring interface 300 and performance interface 302 for use with sorting system 100 (FIGS. 1 and 2). Monitoring interface 300 and/or performance interface 302 facilitates objective evaluation of the production performance of at least one sorting system, such as sorting system 100 described above, for sorting many types of materials for various purposes (e.g., trash, refuse, recycling, etc.), including plastic, paper, metals, glass, and/or other commodities.

Referring to FIGS. 1-3, monitoring interface 300 includes at least motor sensor 304, such as sensors 130, 132, 150, 158, 166, 172, 180, 184, 192, 198, 204, 210, 218, 222, 232, 238, 244, 252, 256, and/or 272, a conveyor eye sensor 306, such as sensor 136, and at least one scale sensor 308, such as sensors 134, 154, 160, 186, 224, 226, and/or 258. Conveyor eye sensor 306 communicates with a motor 310 of a conveyor system, such as motor 124, 128, 148, 156, 164, 170, 178, 182, 190, 196, 202, 208, 216, 220, 230, 236, 242, 250, 254, and/or 270. Sensors 304, 306, and/or 308 may pre-exist in conveyor system and/or may be separately provided for the purposes described below. Signals from sensors 304 and/or 306 are input to motors 310, and may be used to operate conveyors, such as conveyors 102, 144, 146, 174, 176, 206, 212, 214, and/or 246 and/or monitor operations of sorting system 100. Alternatively, sensors 304 and/or 306 may be directly input to a controller 312 without involving motors 310 and/or directly input into control system 278, which transmits data to monitoring interface 300. In the exemplary embodiment, scale sensor 308 is coupled in communication with controller 312 to input data thereto. Alternatively, scale sensor 308 is coupled to control system 278, which transmits data to monitoring interface 300.

In the exemplary embodiment, monitoring interface 300 includes controller 312 and a power supply 314, and controller 312 is in communication with motors 310 so that it may also be provided with the signal inputs from sensors 304 and 306. It is contemplated that controller 312 be located on site and proximate to sorting system 100, although it could be located elsewhere in other embodiments, including at a location remote from sorting system 100. Also, controller 312 and power supply 314 as illustrated are provided separately from motors 310 such that an existing sorting system may be upgraded with monitoring interface 300 in a retrofit fashion. It is appreciated, however, that in a new sorting system installation, the functionality of controller 312 could be integrated into motors 310 and/or control system 278, or still another controller for the system, if desired, including sorting system 100 itself. That is, controller 312, or the functionality of controller 312 as explained below, may be implemented as an automatic control feature of sorting system 100 itself, as opposed to a separately provided control element.

Controller 312 may be for example, a microcomputer or other processor-based device. Controller 312 may include a microprocessor and a memory for storing instructions, control algorithms, and other information as required to function in the manner explained below. A memory of controller 312 may be, for example, a random access memory (RAM), or other forms of memory used in conjunction with RAM memory, including but not limited to, flash memory (FLASH), programmable read only memory (PROM), and electronically erasable programmable read only memory (EEPROM). As those in the art will appreciate, controller 312 may also be implemented with programmable logic controllers and the like to receive and respond to input signals and data as described below.

For purposes of controller 312, sensors 304, 306, and/or 308 may be used to signal downtime conditions and/or actual performance measurements to controller 312. That is, controller 312 is interfaced with sensors 304, 306, and 308 and may receive and record data associated with detected downtime conditions and/or detected actual conditions. For example, if any conveyor motor 310 is not moving and/or there is no sorting material present on in-feed conveyor 102, as determined based on data from sensors 304, 306, and/or 308, controller 312 automatically detects a downtime condition for sorting system 100. Controller 312 may record the times and durations of such events for monitoring and analysis purposes.

While three sensors 304, 306, and 308 are illustrated in FIG. 3, it is appreciated that greater or fewer numbers of sensors, as well as other types of sensors, may likewise be utilized to detect downtime conditions of a single system or more than one system as desired. As one example, one or more sensors may be provided in other areas or components of sorting system 100 to detect downtime conditions, such as by monitoring the frequency of cylinder movement in compression chambers of the components to detect component downtime conditions. Also, more than one controller 312 may be provided to accept sensor inputs from different sorting system or from different areas or component of a single sorting system.

As also depicted in the illustrative embodiment of FIG. 3, controller 312 is further connected to an input device 316 that may take the form of a display screen, and an alarm element 318 that allows downtime conditions to be communicated to interested parties. Controller 312 may be configured to trigger an alarm condition, via alarm element 318, in response to signals from sensors 304, 306, and/or 308 and/or other events or alarm conditions.

In one embodiment, input device 316 is provided for the benefit of the sorting system operator and is located locally on site with sorting system 100, although in other embodiments input device 316 may be located elsewhere. As explained further below, input device 316 may notify the operator of a downtime condition so that the operator may attend to it or instruct others to respond to the downtime condition, and also seek input regarding the cause of the downtime condition for analysis purposes. As will become apparent below, runtime data and information may also be input by an operator using input device 316 using, for example, graphical user interfaces as described in more detail below. For example, input device 316 may accept user provided data inputs regarding runtime operation of sorting system 100, such as a material type input in the product stream to be sorted, a shift during which sorting system 100 is being operated, an operator operating sorting system 100, and/or a maintenance personnel servicing sorting system 100. Further, input device 316 may display to an operator actual conditions of sorting system 100, such as actual weights of commodities sorted from a product stream.

In one embodiment, input device 316 is a touch sensitive screen known in the art for interactive, menu-based input by the operator through touching selected regions or areas of a screen of input device 316. That is, data inputs may be presented to a user, such as an operator, for selection by touching a predetermined area of the screen. Data inputs selected from such a display may include, for example, a stream identification input, an operator identification input, a shift input, a maintenance person input, other operator information, down code input, and combinations thereof.

In other embodiments, other types of display screens may be utilized with input device 316. For example, input device 316 may alternatively or additionally take the form of a keyboard or mouse that an operator or other person may use to enter the necessary data inputs. Further, more than one input device 316 may be provided for the same sorting system or for different sorting systems in various embodiments.

Alarm element 318 may be, for example, an alarm beacon familiar to those in the art that is activated or illuminated by controller 312 and/or control system 278 during a downtime condition or other specified alarm condition. Alarm element 318 may be located, for example, over an operator station or in another highly visible location so that it may be easily seen when activated. As such, personnel, including but not limited to, the machine operator, need not be physically present at the location of input device 316 to receive notice of a downtime or alarm condition. Still other audio or visual alarm elements may be provided in combination with, or in lieu of, an alarm beacon to provide notification of downtime/alarm conditions and summon personnel to help respond to them.

Controller 312 is also placed in communication with performance interface 302, which, in different embodiments, is separate from or integrated into an office or personal computer 320. Computer 320 may be a computer used by a manager of at least one sorting system and can be used to communicate with monitoring interface 300 and/or performance interface 302. Alternatively, performance interface 302 is integrated into monitoring interface 300 and/or computer 320. In the exemplary embodiment, performance interface 302 is configured to analyze sorting system performance as described below.

In an embodiment in which performance interface 302 is separate from computer 320, computer 320 communicates with performance interface 302 to produce reports and/or charts as described herein. Further, in such an embodiment, performance interface 302 is networked to a plurality of monitoring interfaces 300 and/or a plurality of computers 320, wherein at least one monitoring interface 300 and at least one computer 320 is local to each of a plurality of sorting systems. Alternatively, not all of the sorting systems include a computer 320. In the present embodiment, computer 320 communicates with a remotely located and networked performance interface 302 for analyzing the performance of multiple sorting systems. In still another embodiment, controller 312 may communicate directly with performance interface 302, which is co-located with monitoring interface 300 or remotely located from monitoring interface 300. Controller 312 may be configured to communicate data received, accepted, and/or recorded, via any known manner, from monitoring interface 300 to performance interface 302 for generation of a detailed performance report. Communication between controller 312 of monitoring interface 300 and computer 320 and/or performance interface 302 may be established in any of a variety of techniques known in the art so that data may be transmitted from controller 312 to computer 320 and/or remote performance interface 302 for analysis purposes.

Figure 4:
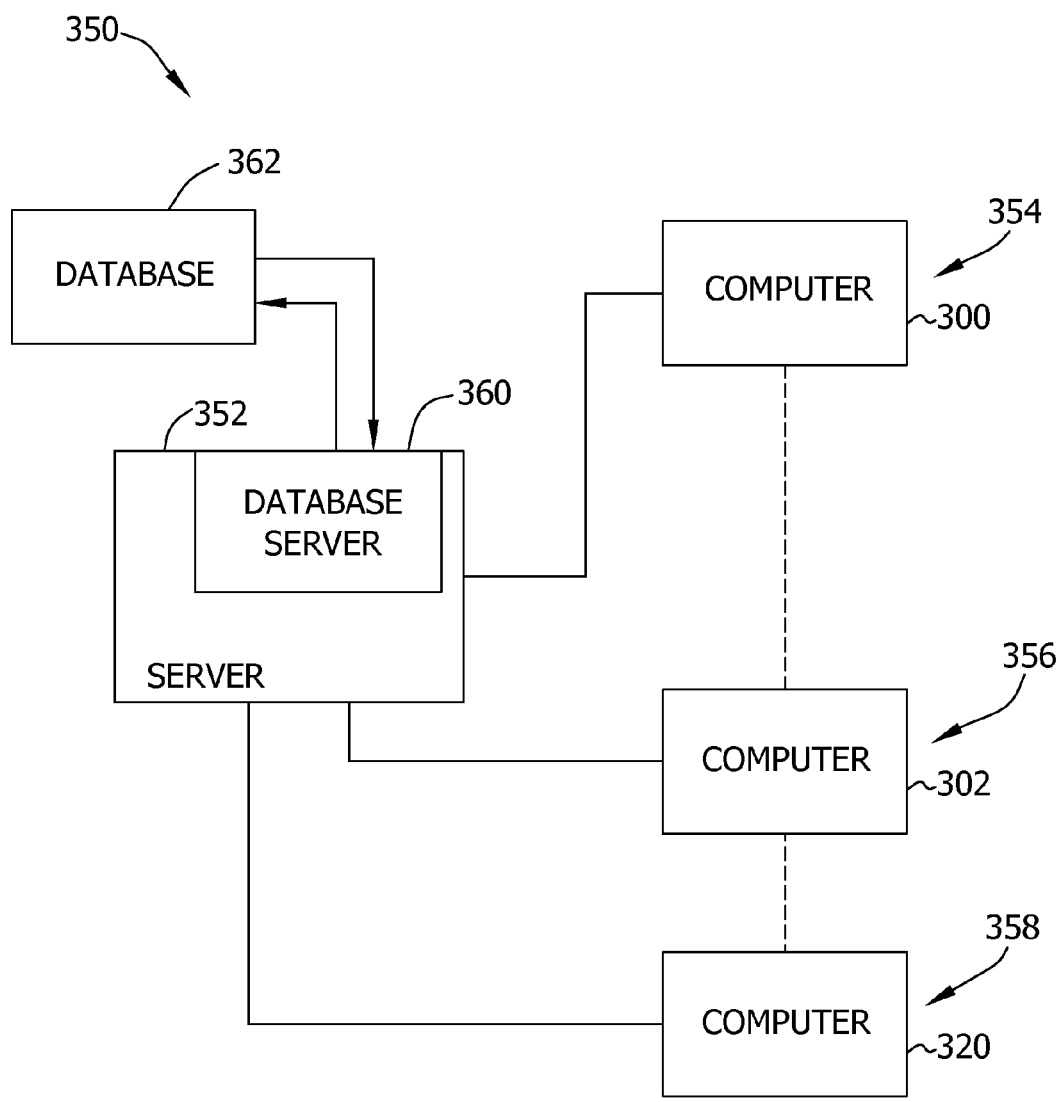

FIG. 4 is a simplified block diagram of an exemplary computer system 350 that may include monitoring interface 300, performance interface 302, and computer 320. Computer system 350 is a monitoring and performance system, which can be utilized to monitor and analyze performance of at least one sorting system, such as sorting system 100 (shown in FIGS. 1 and 2). Although shown as separate components in FIGS. 4 and 5, it should be understood that monitoring interface 300, performance interface 302, and/or computer 320 may be integrated into one component. Further, although FIGS. 4 and 5 assume performance interface 302 is not embodied on computer 320, it should be understood that performance interface 302 may be embodied on computer 320.

In the exemplary embodiment, computer system 350 includes a server system 352, and a plurality of client subsystems, also referred to as client systems 354, 356, and 358, connected to server system 352. Client system 354 includes monitoring interface 300, client system 356 includes performance interface 302, and client system 358 includes computer 320. Computerized modeling and grouping tools, as described below in more detail, are stored in server system 352 and can be accessed by an authorized requester at any client system 354, 356, and/or 358. In one embodiment, client systems 354, 356, and 358 are each computers including a web browser, such that server system 352 is accessible to client systems 354, 356, and 358 using the Internet. Client systems 354, 356, and 358 are interconnected to the Internet through many interfaces including a network, such as a local area network (LAN) or a wide area network (WAN), dial-in-connections, cable modems, and special high-speed ISDN lines. Client systems 354, 356, and/or 358 could be any device capable of interconnecting to the Internet including a web-based phone, personal digital assistant (PDA), or other web-based connectable equipment.

A database server 360 is connected to database 362, which contains information on a variety of matters, as described below in greater detail. Database 362 is also referred to herein as a data warehouse. In one embodiment, centralized database 362 is stored on server system 352 and can be accessed by potential users at one of client systems 354, 356, and/or 358 by logging onto server system 352 through one of client systems 354, 356, and/or 358. In an alternative embodiment, database 362 is stored remotely from server system 352 and/or may be non-centralized.

Database 362 may store monitoring data and/or performance analysis data generated from inputs from sensors 304, 306, and/or 308 (shown in FIG. 3) and/or inputs by operators of sorting system 100. Database 362 may also store data relating to optimal weights, an optimal characterization, actual weights, an actual characterization, motor conditions, component conditions, sorting system information, operator information, shift information, maintenance personnel information, and/or any other data suitable for performing the methods and processes described herein.

Figure 5:
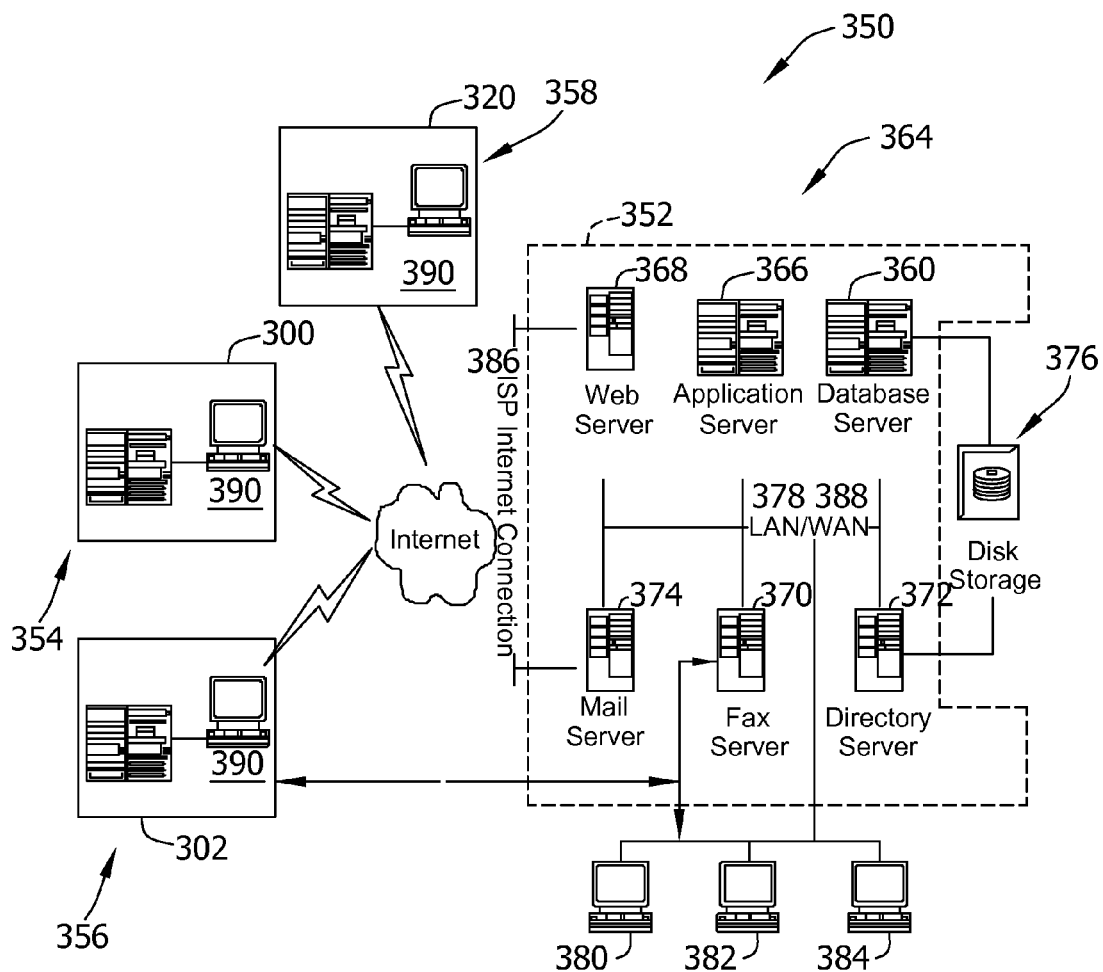

FIG. 5 is an expanded block diagram of an exemplary embodiment of a server architecture of a system 364 in accordance with one embodiment of the present invention. Components in system 364 that are identical to components of computer system 350 (shown in FIG. 4) are identified in FIG. 5 using the same reference numerals as used in FIG. 4. System 364 includes server system 352, and client systems 354, 356, and 358. Server system 352 further includes database server 360, an application server 366, a web server 368, a fax server 370, a directory server 372, and a mail server 374. A disk storage unit 376 is coupled to database server 360 and directory server 372. Servers 360, 366, 368, 370, 372, and 374 are coupled in a local area network (LAN) 378. In addition, a system administrator's workstation 380, a user workstation 382, and/or a supervisor's workstation 384 can be coupled to LAN 378. Alternatively, workstations 380, 382, and/or 384 can be coupled to LAN 378 using an Internet link or are connected through an intranet.

Server system 352 is configured to be communicatively coupled to various individuals, including client systems 354, 356, and 358, using an ISP Internet connection 386. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 388, local area network 378 could be used in place of WAN 388.

In the exemplary embodiment, any authorized individual having a workstation 390 can access system 350. At least one client system 354, 356, and 358 includes a workstation 390 located at a remote location. Workstations 390 are computers having a web browser. Also, workstations 390 are configured to communicate with server system 352.

IV. Methods and Processes

The functionality and programming of interfaces 300 and 302 (shown in FIGS. 1 and 3-5) is explained in detail below with respect to the methods and processes described below in Parts IV(a)-(c) and the user interfaces disclosed in Part V.

The methods described below are performed to monitor and/or analyze downtime of sorting system 100 (shown in FIGS. 1 and 2), a characterization of a product stream entering sorting system 100, and/or an accuracy of sorting system 100. The methods described herein are performed by controller 312 (shown in FIG. 3) and/or control system 278 (shown in FIGS. 1 and 2) sending commands and/or instructions to components of sorting system 100, monitoring interface 300, performance interface 302, and/or computer 320. Controller 312 and/or control system 278 is programmed with code segments configured to perform the herein-described methods. Alternatively, the methods are encoded on a computer-readable medium that is readable by controller 312 and/or control system 278. In such an embodiment, controller 312 and/or control system 278 is configured to read computer-readable medium for performing at least one of the herein-described methods. In the exemplary embodiment, at least one method is automatically performed continuously and/or at selected times. Alternatively, a method is performed upon request of an operator of sorting system 100 and/or when controller 312 and/or control system 278 determines at least one method described herein is to be performed.

The technical effect of the processes and systems described herein is achieved when data and information pertaining to operation of sorting system(s) is entered, transmitted, downloaded or otherwise accepted by interfaces 300 and/or 302. As will become apparent, the data and information is in part provided with interfaces 300 and/or 302, in part automatically detected by monitoring interface 300, and in part obtained through inputs entered by persons. A unique combination of automatic and user-entered feedback regarding system performance in both runtime and downtime conditions allows a rather comprehensive and objective evaluation of sorting system performance.

In illustrative examples, the data and information used by monitoring interface 300 may be supplied and accepted through sensors 304, 306, and/or 308, through input device 316, and/or supplied directly to controller 312 and/or control system 278. In one embodiment, monitoring interface 300 is provided with software prompts requesting certain runtime and downtime information from system operators while sorting system 100 is operating. In another embodiment, the system runtime and downtime information is entered after-the-fact by system operators or other persons.

The data and information used by performance interface 302 may be supplied and accepted through any workstation connected to server system 352 as described above, from any controller and/or control system associated with one or more sorting systems being monitored, or may be supplied from still other sources if desired. Exemplary data and information utilized by the system is described in some detail below, but in an exemplary embodiment, monitoring and performance interfaces 300 and 302 include production query capabilities to track variables corresponding to the components of a sorting system, reasons a component and/or system may be experiencing downtown, and/or the personnel and/or shifts at a sorting systems. Performance interface 302 may generate detailed reports in which system performance of one of more sorting system may be analyzed in an objective manner across a number of aspects. Analysis information may be made available in varying degrees of detail, and may be presented in graphical form.

The data and information supplied to performance interface 302 may be stored or archived in server system 352, and the data and information may be accessed by performance interface 302 to permit a reliable assessment, evaluation, and/or analysis of sorting system runtime and downtime considerations.

The processes utilized by interfaces 300 and 302 will now be explained using the example of sorting system 100, wherein monitoring interface 300 is configured to ensure efficient and reliable data collection, and performance interface 302 is configured to efficiently and reliably evaluate and assess performance of sorting system 100 and/or any other sorting system provided with a monitoring interface 300 using the collected data.

a. Downtime Methods and Processes

Figure 6:
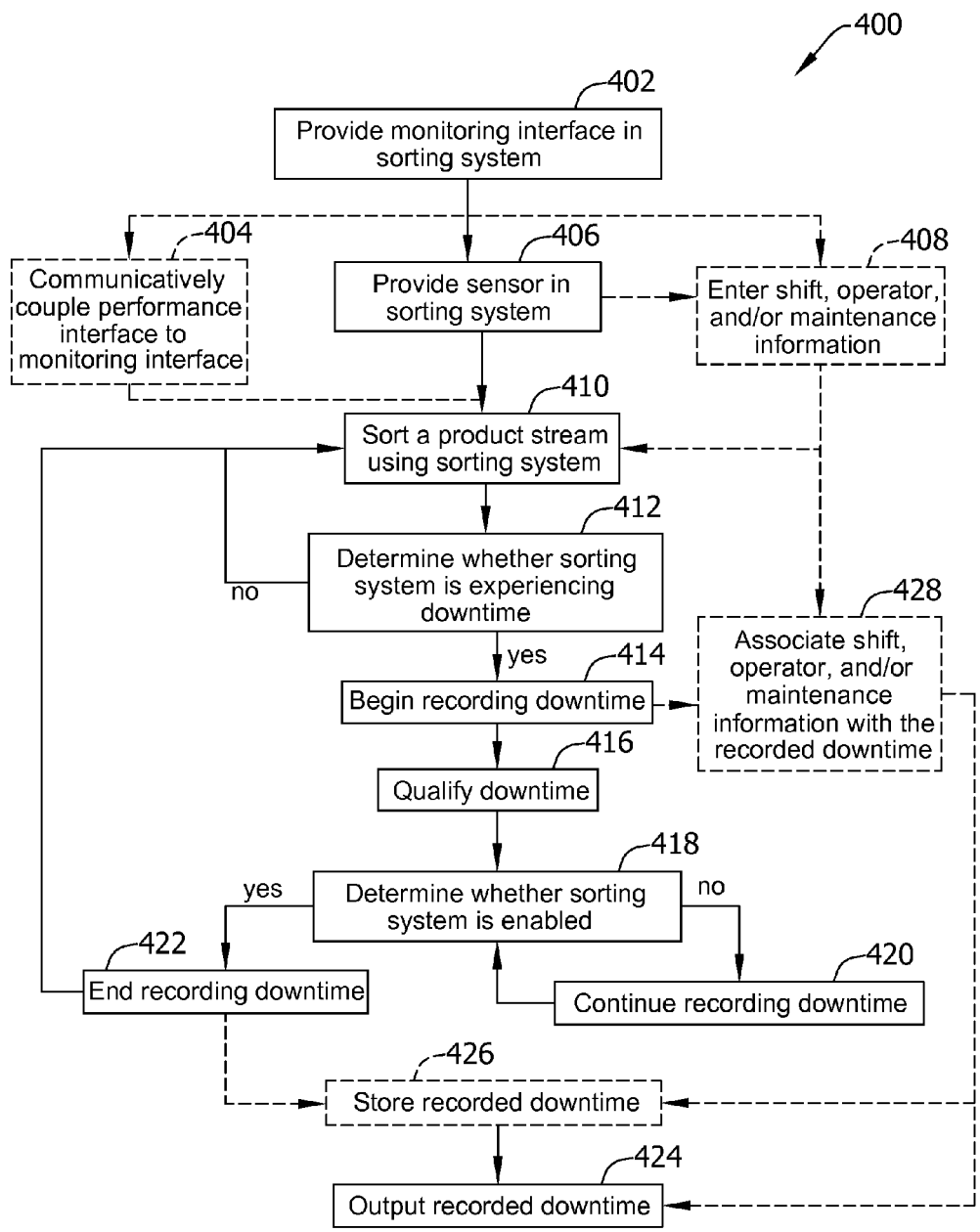

FIG. 6 is a flowchart of an exemplary method 400 for monitoring downtime that may be used with the systems shown in FIGS. 3-5. In the exemplary embodiment, method 400 includes providing 402 monitoring interface 300 within sorting system 100 (shown in FIGS. 1 and 2), and communicatively coupling 404 performance interface 302 with monitoring interface 300. When only one sorting system 100 is being monitored, performance interface 302 may be included within monitoring interface 300 rather than being communicatively coupled 404 to monitoring interface 300. Further, at least one sensor 304, 306, and/or 308 (shown in FIG. 3) is provided 406 within sorting system 100. Sensor 304, 306, and/or 308 is coupled in communication with monitoring interface 300 to input data to monitoring interface 300. More specifically, sensor 304, 306, and/or 308 inputs data, such as weights, a presence of material, and/or a state of a motor, to monitoring interface 300.

Information regarding operating of sorting system 100 is entered 408 into monitoring interface 300 using, for example, the screens shown in FIGS. 9-15. In the exemplary embodiment, an operator enters 408 shift information, operator information, and/or maintenance information related to the operation of sorting system 100. In one embodiment, sorting system 100 does not begin sorting a product stream until such information is entered 408. Once any required information has been entered 408 and a product stream has been provided to sorting system 100, sorting system 100 begins sorting 410 the product stream as described above with respect to FIGS. 1 and 2. As sorting system 100 sorts the product stream, sensors 304, 306, and/or 308 input data to monitoring interface 300.

Based on the inputted data, monitoring interface 300 and/or performance interface 302 determines 412 whether at least a portion of sorting system 100 is experiencing downtime. For example, and referring to FIG. 1, if sensor 136 on in-feed conveyor 102 does not sense the presence of material on in-feed conveyor 102, if sensor 130 and/or 132 does not sense a movement of motor 124 and/or 128 of in-feed conveyor 102, and/or if sensor 134 does not recorded any weight thereon, monitoring interface 300 and/or performance interface 302 determines 412 that in-feed conveyor 102 is experiencing downtime. Further, if any of scale sensors 308 and/or motor sensors 304 associated with a component of sorting system 100 records no weight and/or no motor movement, monitoring interface 300 and/or performance interface 302 determines 412 that that component is experiencing downtime. If, for example, none of motor sensors 304 senses movements of motors 310 within sorting system 100, monitoring interface 300 and/or performance interface 302 determines 412 that entire sorting system 100 is experiencing downtime. In the exemplary embodiment, monitoring interface 300 and/or performance interface 302 does not determine 412 downtime is being experienced until a sensor does not sense material, weight, and/or motor movement for a predetermined length of time, such as 30 seconds. In a particular embodiment, when a downtime is determined 412, an alarm is activated to alert personnel to the downtime. The alarm can be any suitable alarm, such as an audio and/or visual alarm.

When the inputted data indicates that at least a portion of sorting system 100 is experiencing downtime as determined 412 by monitoring interface 300 and/or performance interface 302, monitoring interface 300 begins 414 recording the downtime. Alternatively or additionally, computer 320 and/or performance interface 302 begins 414 recording the downtime. When the downtime begins 414 being recording, the operator is prompted to qualify 416 the downtime by entering a component, or entire sorting system 100, experiencing downtime, and/or a description of a reason at least a portion of sorting system 100 is experiencing downtime. Alternatively, the downtime can be qualified 416 during and/or after the beginning 414 of the downtime recording. In the exemplary embodiment, the operator uses, for example, the screens shown in FIGS. 16-21, to qualify 416 the downtime. The qualification and/or the indication of which portion of sorting system 100 experienced the downtime is associated with the recorded downtime by monitoring interface 300, computer 320, and/or performance interface 302.

Monitoring interface 300 and/or performance interface 302 determines 418 whether sorting system 100 has been enabled to continue sorting 410 the product stream. If sorting system 100 has been not been enabled, monitoring interface 300 and/or performance interface 302 continues 420 recording the downtime until sorting system 100 has been enabled. If sorting system 100 has been enabled, sorting system 100 returns to sorting 410 the product stream, and monitoring interface 300 and/or performance interface 302 ends 422 the recording of the downtime. The recorded downtime is output 424 and/or stored 426. When outputting 424 and/or storing 426 the recorded downtime, the shift information, operator information, and/or maintenance information, if available, is associated 428 with the recorded downtime. After ending 422 recording of the downtime, monitoring interface 300 continues receiving data from sensors 304, 306, and/or 308 to determine 412 whether a downtime is occurring within sorting system 100.

Figure 24:
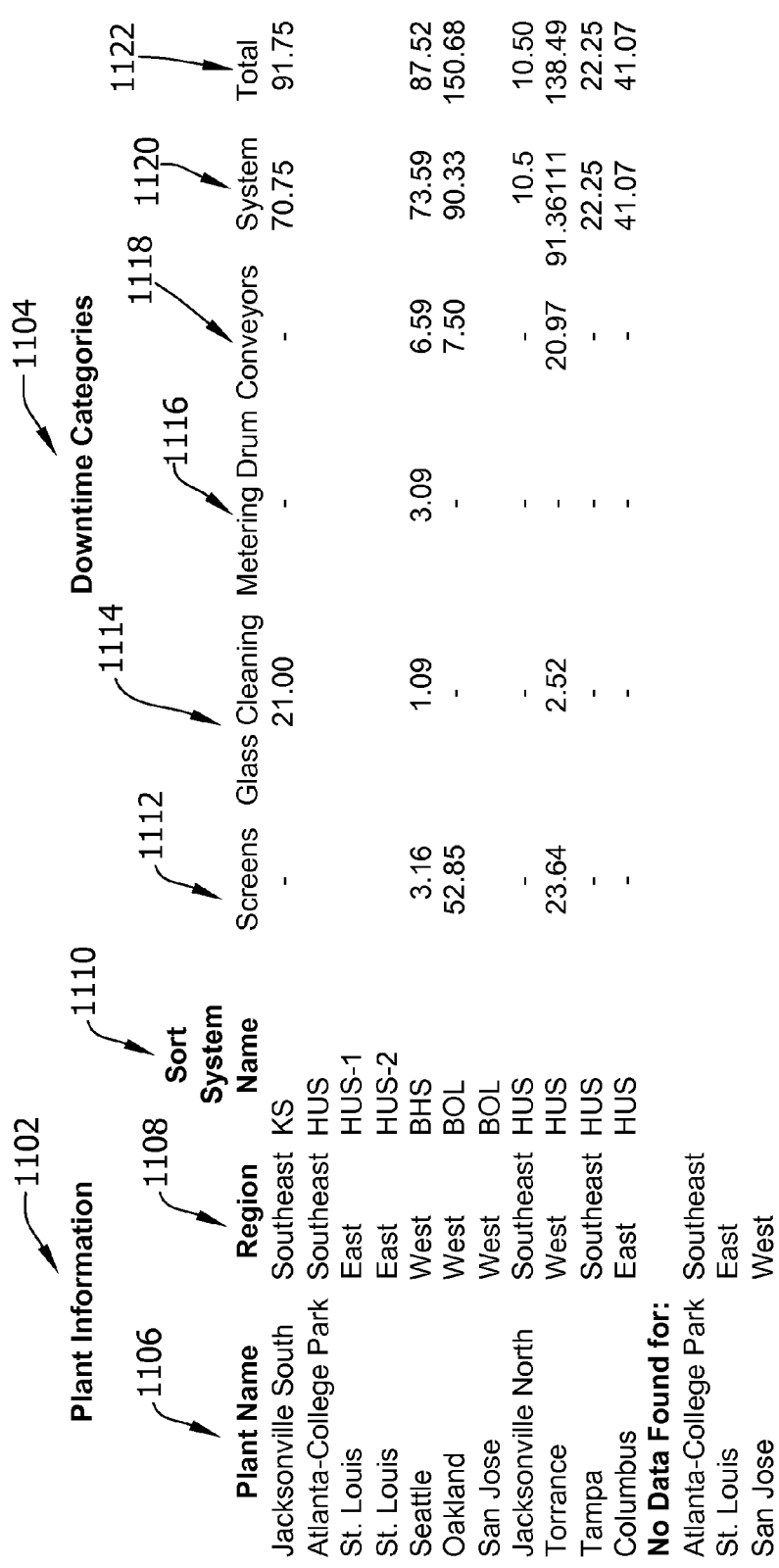

Outputting 424 the recorded downtime includes outputting the recorded downtime to any suitable device, such as a display device, a storage device, an analysis device, a communication device, and/or printing device. In the exemplary embodiment, outputting 424 the recorded downtime includes outputting 424 a report and/or a chart illustrating the recorded downtime. For example, a report as shown in FIGS. 22-24 and/or a chart as shown in FIGS. 25-29 may be output 424. In a particular embodiment, a report and/or a chart illustrating the qualification of the downtime, the shift information associated with the downtime, the operator information associated with the downtime, and/or the maintenance information associated with the downtime is output 424. Alternatively, or additionally, a report and/or a chart illustrating the recorded downtime and the portion of the sorting system experiencing the downtime is output 424. In one embodiment, the qualifications of each recorded downtime are used to analyze processes to prevent future downtimes within sorting system 100.

Further, method 400 can be used for monitoring the downtime experienced by a plurality of sorting systems. More specifically, monitoring interface 300 and sensors 304, 306, and/or 308 are provided within each of a plurality of sorting systems, and the plurality of monitoring interfaces 300 are communicatively coupled to at least one performance interface 302. Each monitoring interface 300 receives data from sensors 304, 306, and/or 308 within a respective sorting system, as described above, and each recorded downtime is transmitted to performance interface 302 to analyze the downtimes occurring within the plurality of sorting systems. Performance interface 302 can then output the recorded downtimes as, for example, a report and/or a chart illustrating the downtimes experienced by each sorting system of the plurality of sorting systems. Performance interface 302 may be configured to compare downtimes experienced by two or more of the plurality of sorting systems.

b. Characterization Methods and Processes

Figure 7:
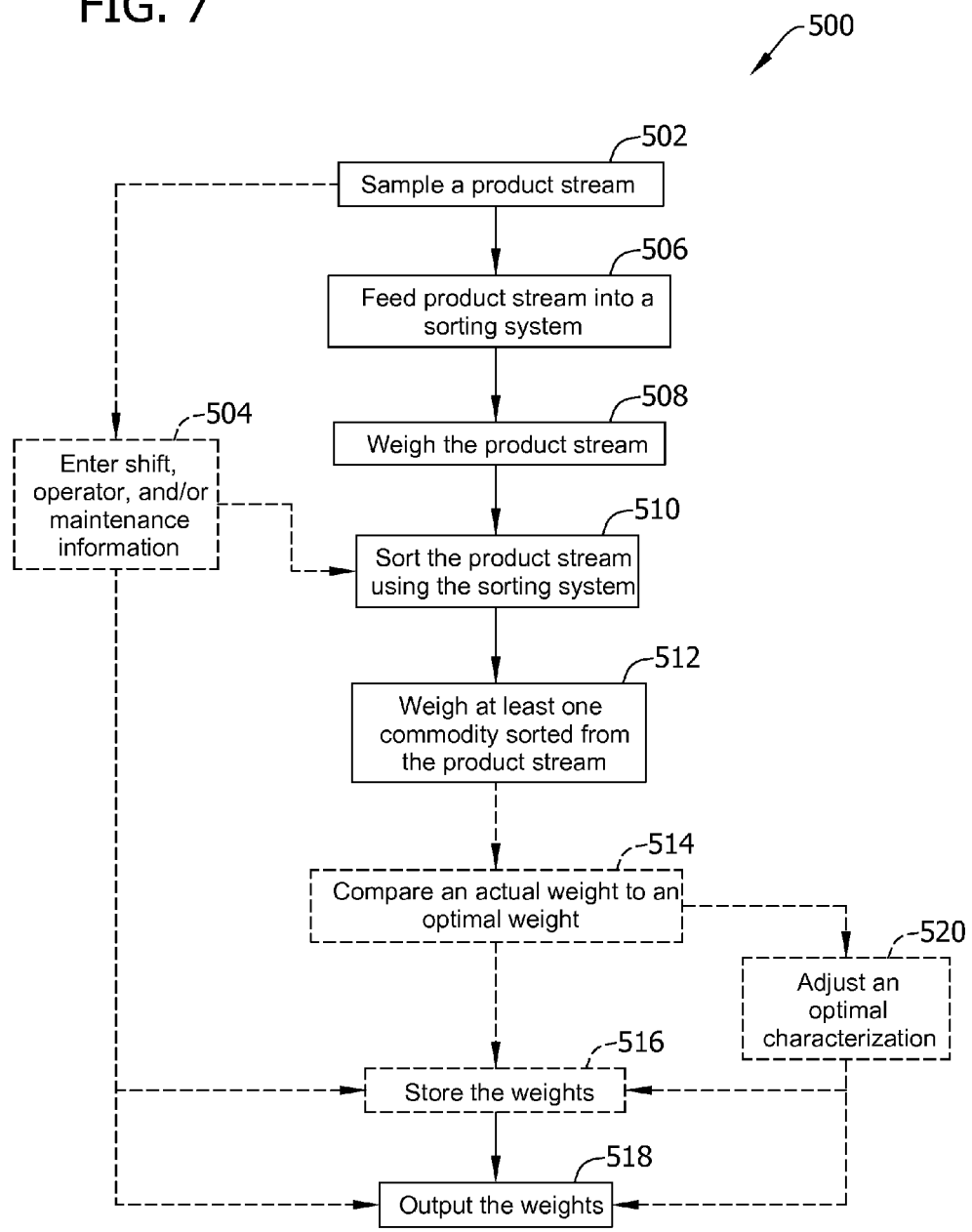

FIG. 7 is a flowchart of an exemplary characterization method 500 that may be used with the systems shown in FIGS. 3-5. In the exemplary embodiment, method 500 includes sampling 502 a product stream to determine an optimal characterization of the product stream. The optimal characterization includes at least an optimal weight of a first commodity within the product stream. More specifically, a relatively small quantity of the product stream (i.e., a sample amount), such as 3 yards, is hand sorted to determine percentages, for example, by weight, of each commodity present within the product stream. For example, the sample of the product stream is weighed to determine a total weight of the sample. The sample is then hand sorted into commodities, and each sampled commodity is weighed. The weight of each sampled commodity is compared to the total weight of the sample amount to determine the optimal characterization of the product stream. From the optimal characterization, personnel at sorting system 100 (shown in FIG. 1) can estimate amounts, such as weights and/or percentages, of each commodity that will be recovered from the entire product stream. Based on this estimate, the personnel can determine how much to charge for accepting the product stream and/or how much to purchase the product stream for. However, when the optimal characterization is not met, either from mis-estimation and/or sorting system under-performance, the full estimated recovery from the product stream will not be realized. Method 500 facilitates actual characterization of the product stream for future optimal characterizations and/or adjustment of sorting system 100 to increase recovery from the product stream by using real-time data.

Information regarding operating of sorting system 100 can be entered 504 into monitoring interface 300 using, for example, the screens shown in FIGS. 9-15. In the exemplary embodiment, an operator enters 504 shift information, operator information, and/or maintenance information related to the operation of sorting system 100. In one embodiment, sorting system 100 does not begin sorting a product stream until such information is entered 504. Once any required information has been entered 504 and a product stream has been provided to sorting system 100, sorting system 100 begins sorting the product stream as described herein.

More specifically, after sampling 502 the product stream, the product stream is fed 506 into sorting system 100. For example, the product stream can be deposited onto in-feed conveyor 102 (shown in FIGS. 1 and 2), and in-feed conveyor 102 feeds 506 the product stream into sorting system 100. As the product stream is fed 506 into sorting system 100, the product stream is weighed 508. In the exemplary embodiment, scale sensor 134 (shown in FIGS. 1 and 2) along in-feed conveyor 102 weighs 508 the product stream. The weight is transmitted from scale sensor 134 to monitoring interface 300. Monitoring interface 300 records the weight as a real-time value and/or a running total weight.

The product stream is sorted 510 into constituent commodities as described above with respect to FIGS. 1 and 2. In the exemplary embodiment, at least a first commodity is sorted 510 from the product stream using sorting system 100. After the first commodity is sorted 510 from the product stream, the first commodity is weighed 512 to determine an actual weight of the first commodity. More specifically, in the exemplary embodiment, scale sensor 154, 160, 186, 224, 226, and/or 258 positioned at or after a component of sorting system 100 that sorts 510 the first commodity from the product stream weighs 512 the first commodity. Additionally, more than one commodity is sorted 510 from the product stream, and each sorted commodity is weighted 512. Alternatively, although a plurality of commodities are sorted 510 from the product stream, fewer than all of the sorted commodities are weighed 512. In the exemplary embodiment, the weight of the first commodity is recorded by monitoring interface 300 as a real-time value and/or a running total weight.

The optimal characterization is input into performance interface 302 and/or actual weights are transmitted from monitoring interface 300 to performance interface 302. Performance interface 302 then compares 514 the actual weight of the first commodity to the optimal weight of the first commodity. Alternatively, performance interface 302 stores 516 and/or outputs 518 the actual weight and/or the optimal weight without performing comparison 514. When comparison 514 is performed, the optimal characterization can be adjusted 520 based on the comparison of the optimal weight and the actual weight.

The actual weight, the optimal weight, and/or the comparison can be stored 516 and/or output 518. When additional information is entered 504, the optimal weight of the first commodity and the actual weight of the first commodity are stored 516 and/or output 518 with the shift information, the operator information, and the maintenance information associated with the optimal weight and the actual weight.

Outputting 518 the weights and/or comparison includes outputting 518 the weights and/or comparison to any suitable device, such as a display device, a storage device, an analysis device, a communication device, and/or a printing device. In the exemplary embodiment, outputting 518 the weights and/or comparison includes outputting 518 a report and/or a chart illustrating the recorded weights and/or comparison. For example, a report as shown in FIGS. 22-24 and/or a chart as shown in FIGS. 25-29 may be output 518. In a particular embodiment, a report and/or a chart illustrating the actual weight per time, the actual weight per commodity, the optimal weight per time, the optimal weight per commodity, the ratio of actual weight to optimal weight, and/or any other suitable data is output 518. Alternatively, or additionally, a report and/or a chart illustrating the weights for each shift, operator, and/or maintenance personnel is output 518. In one embodiment, the weights of each commodity are used to analyze processes to prevent future under-realization of a sorting system 100. For example, a report and/or a chart illustrating the optimal weight and the actual weight with respect to at least one of a shift, an operator, and a maintenance personnel is output 518 and/or stored 516.

Further, method 500 can be used for monitoring the actual characterizations achieved by a plurality of sorting systems. More specifically, monitoring interface 300 and sensors 304, 306, and/or 308 are provided within each of a plurality of sorting systems, and the plurality of monitoring interfaces 300 are communicatively coupled to at least one performance interface 302. Each monitoring interface 300 receives data from sensors 304, 306, and/or 308 within a respective sorting system, as described above, and weight data is transmitted to performance interface 302 to analyze the actual weights of commodities sorted by the plurality of sorting systems. Performance interface 302 can then output the weights as, for example, a report and/or a chart illustrating the actual weights achieved by each sorting system of the plurality of sorting systems. Performance interface 302 may be configured to compare weights experienced by two or more of the plurality of sorting systems.

c. Performance Methods and Processes

Figure 8:
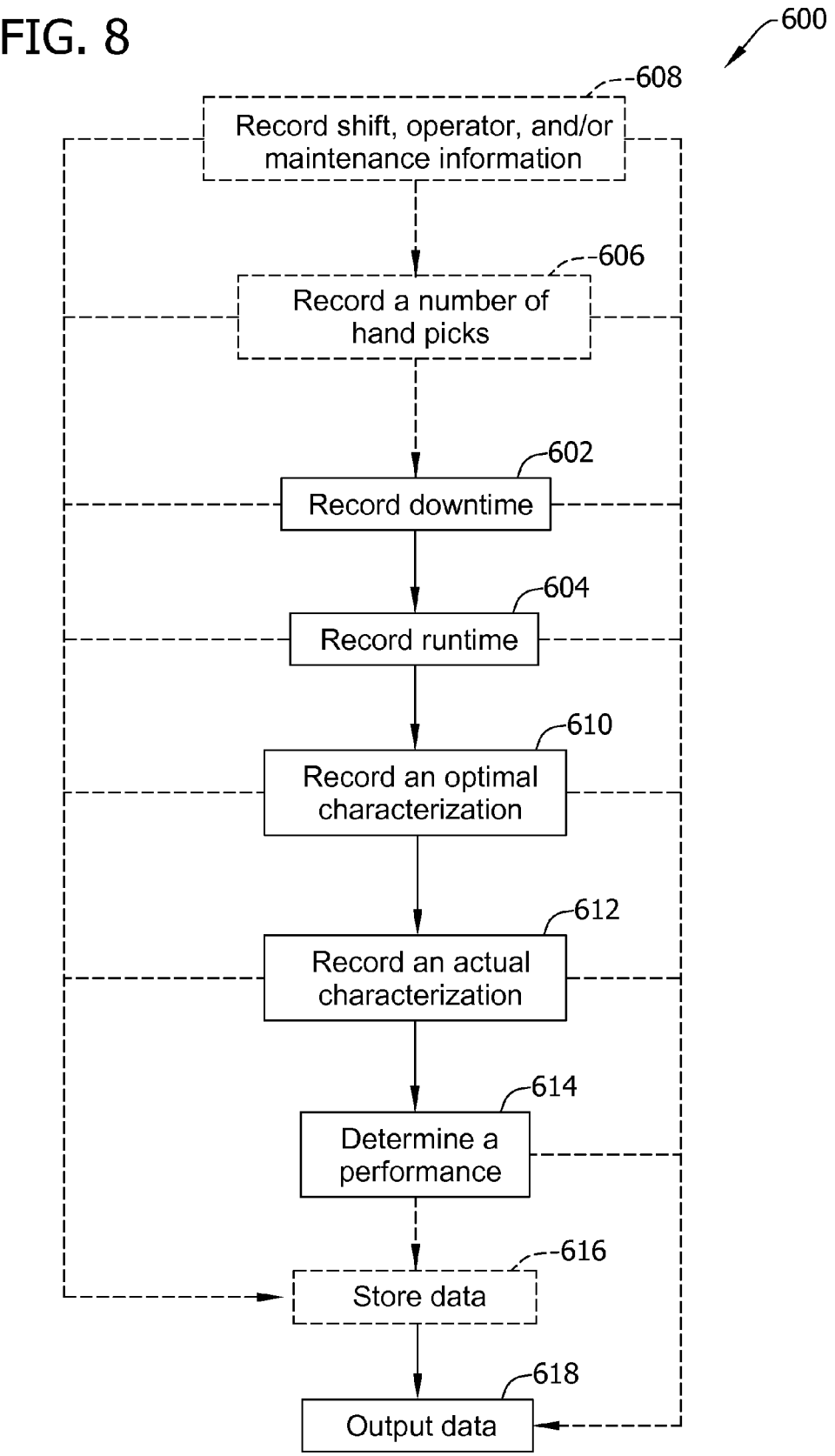

FIG. 8 is a flowchart of an exemplary performance analysis method 600 that may be used with the systems shown in FIGS. 3-5. In the exemplary embodiment, method 600 includes recording 602 downtime experienced by sorting system 100 (shown in FIGS. 1 and 2). More specifically, downtime can be determined as described above in Part VI(a), and the determined downtime can be recorded 602 within monitoring interface 300, performance interface 302, database 362, and/or any other suitable component of the computer systems described herein. Further, a runtime of sorting system 100 is recorded 604. Downtime and runtime can be recorded 602 and/or 604 in any order and/or substantially simultaneously and as real-time values and/or running total values. In the exemplary embodiment, the runtime can be determined by calculating the difference between a scheduled time and the determined downtime. Alternatively, the runtime can be determined using any suitable method. In the exemplary embodiment, once the runtime is determined, the runtime is recorded 604 within monitoring interface 300, performance interface 302, database 362, and/or any other suitable component of the computer systems described herein.

In addition to recording 602 and 604 the downtime and runtime, method 600 can include, in a particular embodiment, recording 606 a number of hand picks with respect to time. For example, a sensor may be located within chutes in workstations 140 and/or 268 (shown in FIG. 2), and each item inserted into a chute can be counted to determine a number of hand-picks. Alternatively or additionally, any suitable method for determining a number of hand-picks can be used to record 606 the number of the hand-picks. Further, in one embodiment, prior to running sorting system 100, shift information, operator information, and/or maintenance information can be entered into monitoring interface 300. For each downtime and/or runtime recorded 602 and/or 604, the shift information, the operator information, and/or the maintenance information associated with the downtime and/or runtime can be recorded 608 with the recorded downtime and/or the recorded runtime.

In the exemplary embodiment, method 600 further includes recording 610 an optimal characterization of a product stream to be sorted by sorting system 100. The optimal characterization includes at least an optimal weight of a first commodity of the product stream. The optimal characterization can be determined as described in Part IV(b) above and/or by using any suitable method to determine an optimal characterization of a product stream. Further, an actual characterization of the product stream as sorted by sorting system 100 is recorded 612. The actual characterization includes at least an actual weight of the first commodity sorted from the product stream. The actual characterization can be determined as described in Part IV(b) above using data from scale sensors and/or by using any suitable method to determine an actual characterization of a product stream.

At least one aspect of the performance of sorting system 100 is determined 614 based on at least two of the downtime, the runtime, the throughput, the optimal characterization, and the actual characterization. For example, the performance can be determined by determining a scheduled time, determining a ratio of the actual characterization with respect the scheduled time, determining a ratio of the actual characterization with respect to the runtime, and determining 614 the performance based on the ratios. Further, a ratio of the optimal characterization with respect the scheduled time and a ratio of the optimal characterization with respect to the runtime can be determined and any of the above-mentioned ratios can be used to determine 614 the performance of sorting system 100. In one embodiment in which hand-picks are recorded 606, the performance of sorting system 100 can be determined 614 using at least the number of hand picks with respect to time. In an alternative or additional embodiment, when the shift, operator, and/or maintenance information is recorded 608, a plurality of downtimes with respect to the shift information, the operator information and/or the maintenance information can be compared to determine 614 the performance of sorting system 100. It should be understood that although examples of determining the performance are set forth above, any suitable analysis of the data collected by monitoring interface 300 and/or performance interface 302 can be used to determine 614 an aspect of the performance of a sorting system.

In the exemplary embodiment, sorting system 100 is configured to sort a plurality of product streams, usually in series. When multiple product streams are sorted by sorting system 100, for example, during one shift, the performance of sorting system 100 can be determined 614 by comparing a downtime and an actual characterization for a first product stream with a downtime and an actual characterization for a second product stream and by determining whether the first product stream or the second product stream has a higher level of recovery based on the comparison.

Once at least one aspect of the performance of at least one sorting system is determined 614, the determined performance can be stored 616 and/or output 618. When additional information is recoded 606 and/or 608, the additional information is stored 616 and/or output 618. The additional information can be stored 616 and/or output 618 in association with a recorded downtime, a recorded runtime, a recorded optimal characterization, a recorded actual characterization, and/or any other suitable data.

Outputting 618 the recorded and/or determined data includes outputting 618 the recorded and/or determined data to any suitable device, such as a display device, a storage device, an analysis device, a communication device, and/or a printing device. In the exemplary embodiment, outputting 618 the recorded and/or determined data includes outputting 618 a report and/or a chart illustrating the recorded downtime. For example, a report as shown in FIGS. 22-24 and/or a chart as shown in FIGS. 25-29 may be output 618. In a particular embodiment, a report and/or a chart illustrating the actual weight per scheduled time, the actual weight per commodity per runtime time hour, the optimal weight per scheduled time, the optimal weight per commodity per runtime hour, the ratio of downtime to runtime, the ratio of actual weight to downtime, and/or any other suitable data is output 618. Alternatively, or additionally, a report and/or a chart illustrating the weights, downtimes, and/or runtimes for each shift, operator, and/or maintenance personnel is output 618. In one embodiment, the weights and/or times are used to analyze processes to prevent future under-realization of a sorting system 100. For example, a report and/or a chart illustrating the amount of recovery and/or downtime with respect to at least one of a shift, an operator, and a maintenance personnel is output 618 and/or stored 616.

Further, method 600 can be used for determining the performances of a plurality of sorting systems. More specifically, monitoring interface 300 and sensors 304, 306, and/or 308 are provided within each of a plurality of sorting systems, and the plurality of monitoring interfaces 300 are communicatively coupled to at least one performance interface 302. Each monitoring interface 300 receives data from sensors 304, 306, and/or 308 within a respective sorting system, as described above, and data recorded at each monitoring interface 300 is transmitted to performance interface 302 to analyze the performance of each sorting system. For example, when performance interface 302 is coupled in communication with a plurality of sorting systems, method 600 includes determining a performance for each sorting system, and/or comparing the performances of the plurality of sorting systems with each other to facilitate increasing the performance of at least one sorting system of the plurality of sorting systems. Performance interface 302 can then output the recorded and/or determined data as, for example, a report and/or a chart illustrating the performance of each sorting system of the plurality of sorting systems. Performance interface 302 may be configured to compare performances of two or more of the plurality of sorting systems.

V. User Interface

Having now described the exemplary method utilized by monitoring interface 300 (shown in FIGS. 1 and 3-5) and/or performance interface 302 (shown in FIGS. 1 and 3-5), the methods and processes described above may be implemented using menu-driven input screens described in the examples below. The menu-driven input screens guide the user through entering of pertinent runtime and downtime data inputs to be collected.

FIGS. 9-21 illustrate exemplary displays of a user interface 700 for monitoring interface 300 in an exemplary embodiment where input device 316 (shown in FIG. 3) is a touch sensitive screen. The examples of FIGS. 9-21 are illustrative only, and it is contemplated that other user interfaces and displays may likewise be utilized in different embodiments without limitation. It is further appreciated that other displays may likewise be tailored for use with a mouse and cursor familiar to those in the art. Still other menus and displays may be utilized in alternative embodiments with similar effect.

Figure 9:
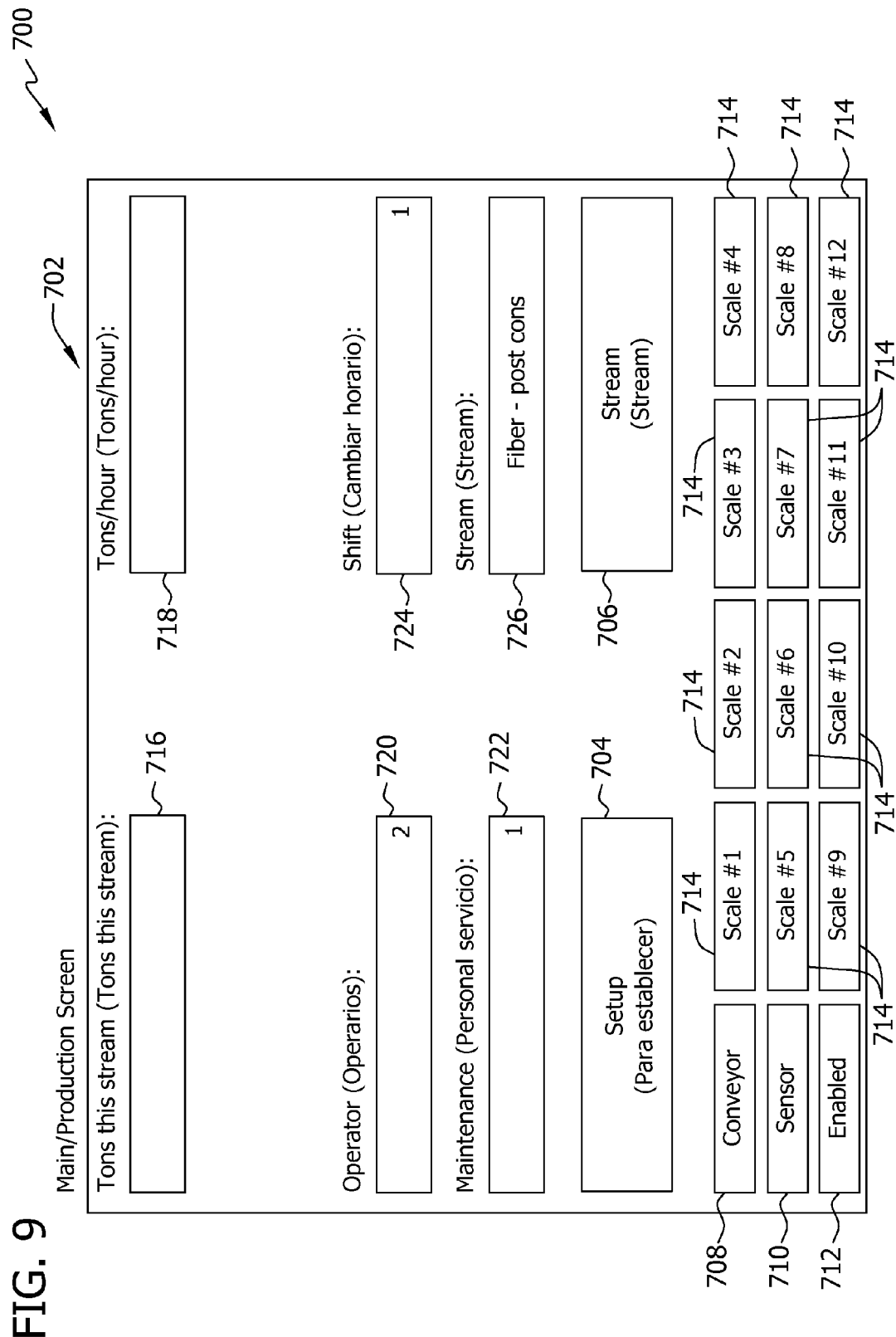

FIG. 9 is a main/production screen 702 that is presented to an operator on input device 316. The exemplary main/production screen 702 includes a plurality of selectable buttons including, but not limited to, a "Setup" button 704 and a "Stream" button 706, and a plurality of status boxes including, but not limited to, a "Conveyor" box 708, a "Sensor" box 710, an "Enabled" box 712, and a plurality of "Scale" boxes 714. Main/production screen 702 also includes text display boxes for displaying entered and/or calculated information. The display boxes include, without limitation, a "Tons this Stream" box 716, a "Tons/hour" box 718, an "Operator" box 720, a "Maintenance" box 722, a "Shift" box 724, and a "Stream" box 726. In other embodiments, greater or fewer areas, such as boxes and/or buttons, may be provided on main/production screen 702, and actual names, text, or other indicia may be provided in lieu of numbers as shown. For example, in one embodiment, main/production screen 702 includes a "Down Code" button.

Values displayed in "Tons this Stream" box 716 and "Tons/hour" box 718 are values that are calculated using the methods described herein. In the exemplary embodiment, the values are for the entire sorting system 100. However, the values can be for a particular sub-system within sorting system 100, and can be selectively displayed by, for example, using selectable buttons (not shown). "Conveyor" box 708, "Sensor" box 710, "Enabled" box 712, and "Scale" boxes 714 indicated which sensors and/or components are active. More specifically, "Conveyor" box 708 indicates whether or not the motor sensors are active and recording data, "Sensor" box 710 indicates whether or not the sensors are active and recording data, "Enabled" box 712 indicates whether or not the sorting system is in production, and "Scale" boxes 714 indicate whether or not scale data is being transferred to interface 300 and/or 302. Further, values displayed in "Operator" box 720, "Maintenance" box 722, and/or "Shift" box 724 are entered using a setup menu screen 728 (shown in FIG. 10) that is accessible using "Setup" button 704, and text displayed in "Stream" box 726 is entered using a stream screen 730 (shown in FIG. 15) that is accessible using "Stream" button 706.

Main/production screen 702 provides the operator with information such as tons this stream, tons/hour, operator, shift, maintenance, and/or stream. To begin using the systems and methods described herein, the operator presses "Setup" button 704 to select setup options and presses the "Stream" button 706 to select stream options, as described below. After a stream type has been selected, main/production screen 702 is again displayed to begin monitoring sorting system 100. Main/production screen 702 accurately displays a count of tons this stream, a count of tons/hour, the operator number, the shift number, the maintenance number, and the stream type. "Conveyor" button 708, "Sensor" button 710, "Enabled" button 712, and "Scale" buttons 714 display a status of each input. Boxes and/or buttons surrounded by a solid black lines means that an input is in the "On" state, and boxes and/or buttons surrounded by a dashed black line means that an input is in the "Off" state. In a display viewable by the operator, the "On" state is indicated by white text and the "Off" state is indicated by black text. In the figures, the solid and dashed lines are exemplary only to indicate that at least some boxes and/or buttons are in different states.

Main/production screen 702 remains displayed to the operator until a downtime condition is detected either by monitoring interface 300 and/or the operator. In the exemplary embodiment, the downtime condition is detected by monitoring interface 300 using the sensors. Once a downtime condition is detected, an alarm may be generated as described previously, and a down code menu screen 732 (shown in FIG. 16) is presented to the operator.

Figure 10:
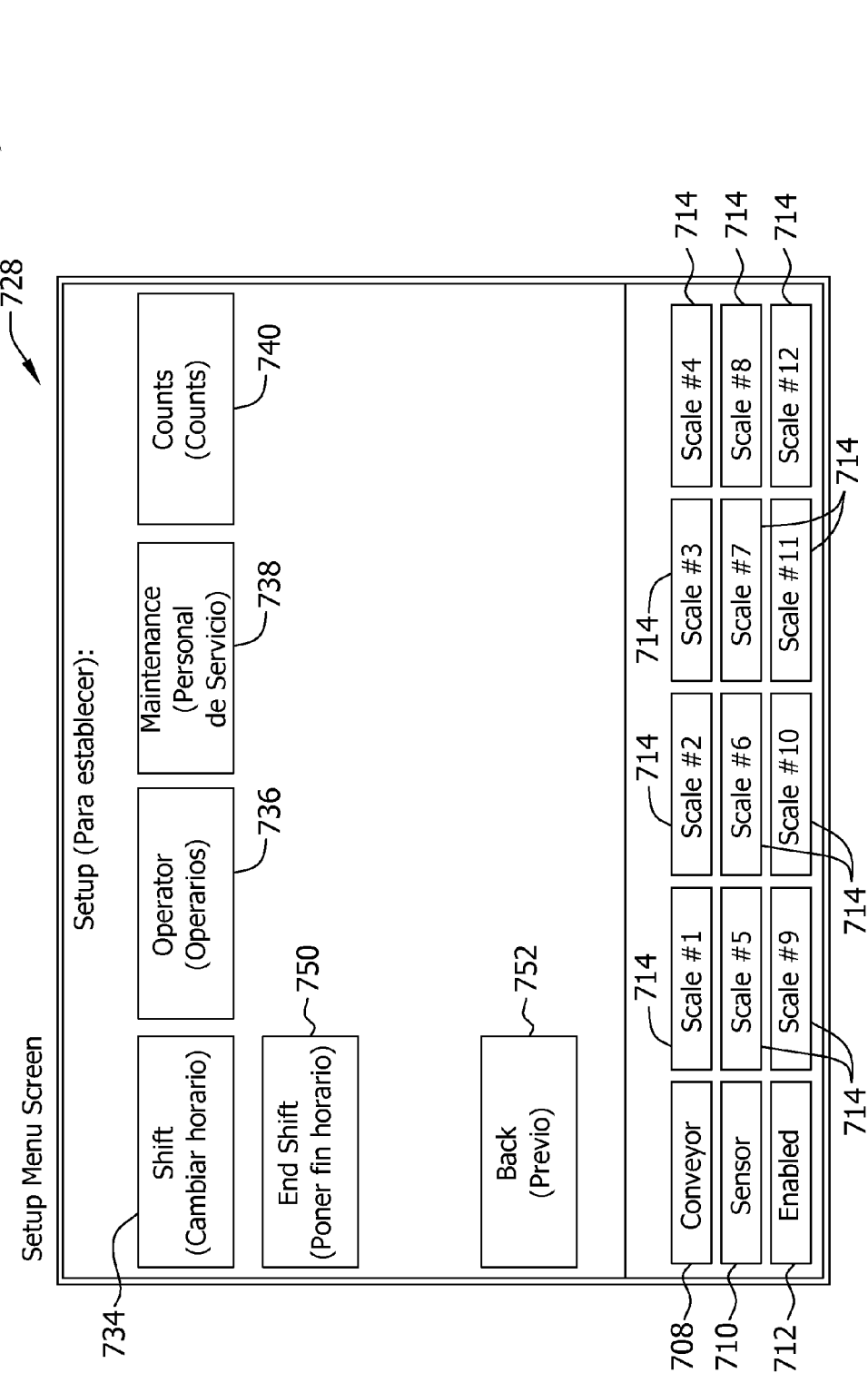
Figure 11:
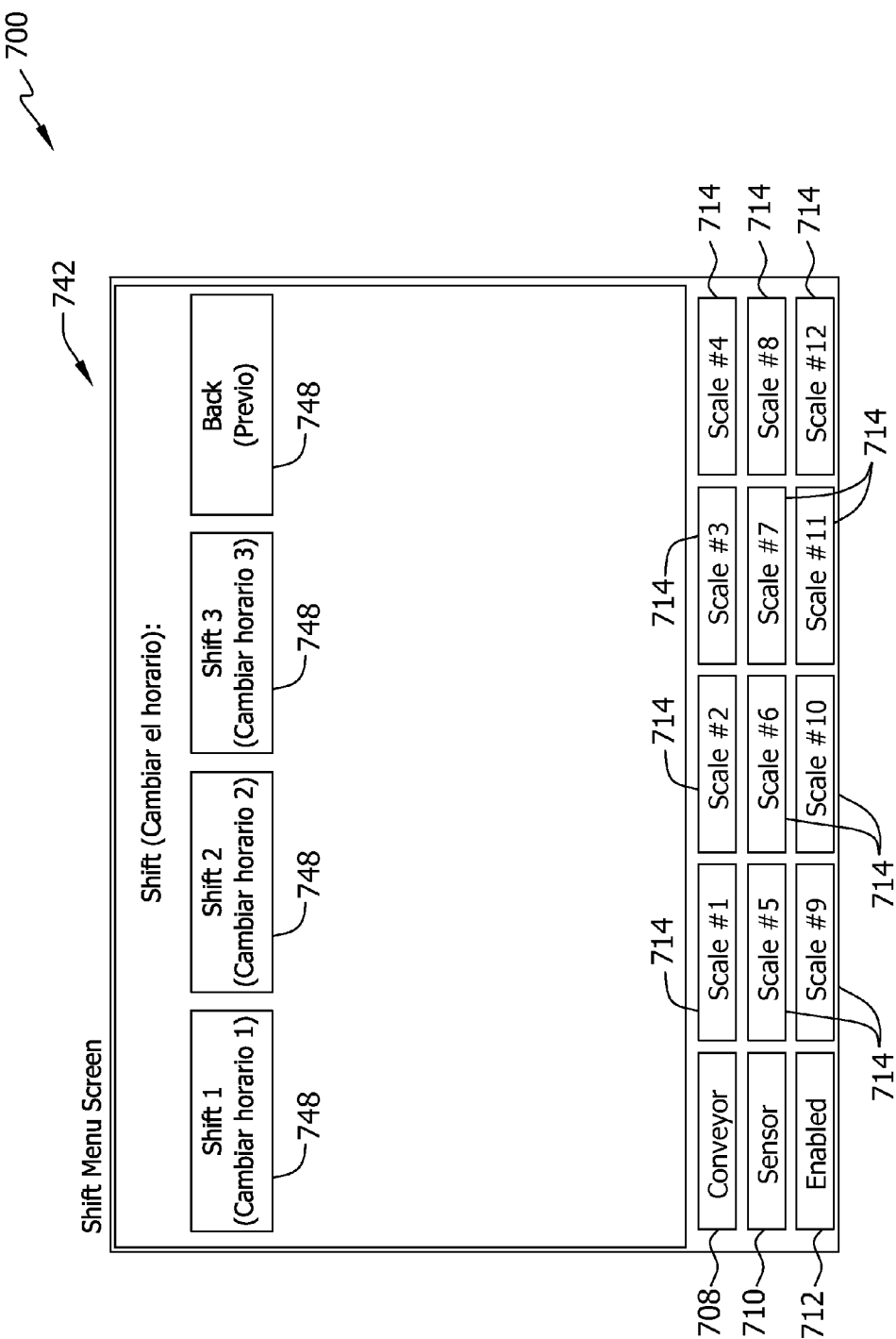
Figure 12:
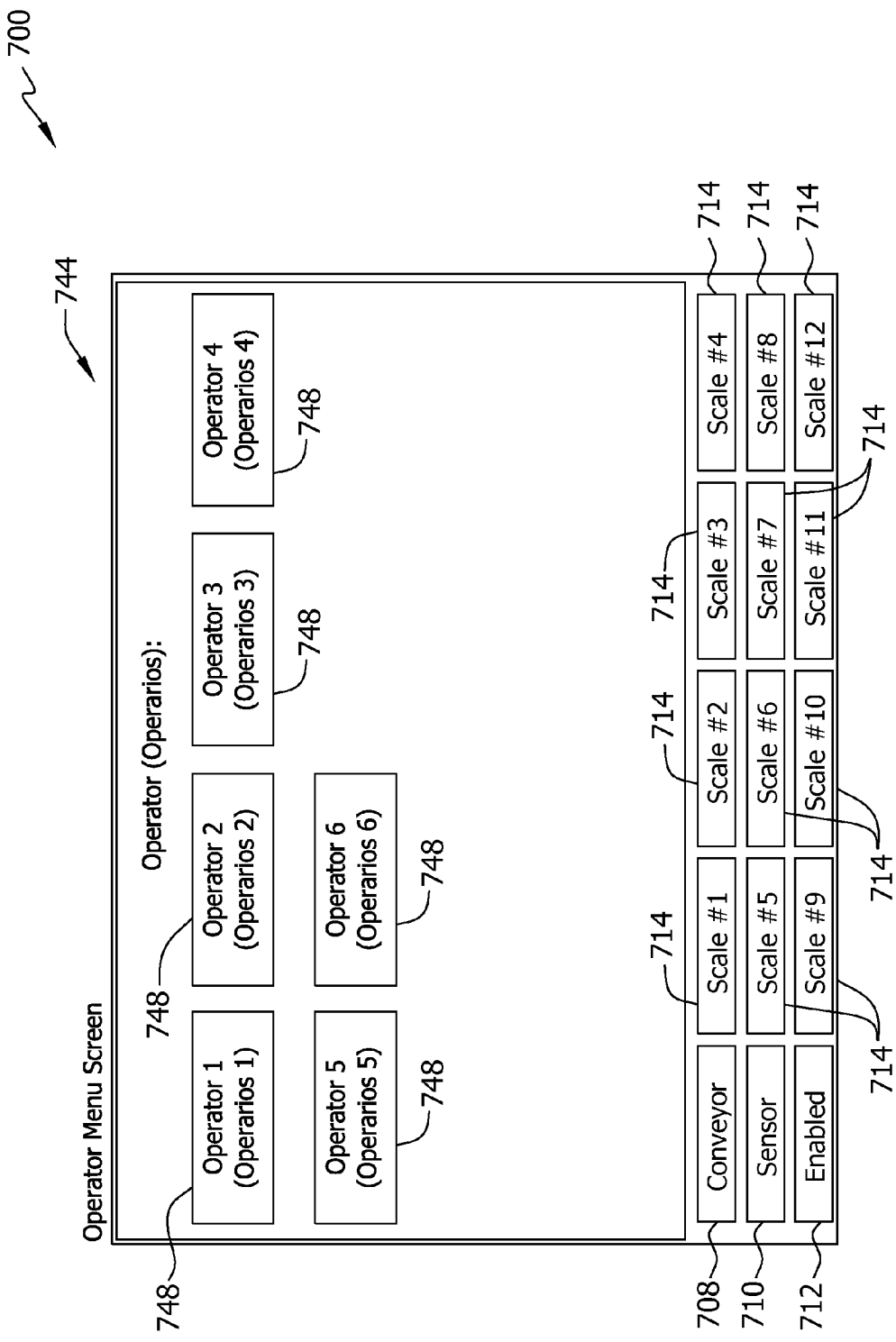

FIG. 10 is setup menu screen 728 that is presented to an operator upon selecting "Setup" button 704 (shown in FIG. 9) on main/production screen 702 (shown in FIG. 9). The exemplary setup menu screen 728 includes a plurality of selectable buttons including, but not limited to, a "Shift" button 734, an "Operator" button 736, a "Maintenance" button 738, and a "Counts" button 740. "Conveyor" box 708, "Sensor" box 710, "Enabled" box 712, and "Scale" boxes 714 are displayed on setup menu screen 728. Setup menu screen 728 enables the operator to select and/or change a shift number, an operator number, and/or a maintenance personnel number using "Shift" button 734, "Operator" button 736, and/or "Maintenance" button 738. Scale counts for each are also accessible from setup menu screen 728 by selecting "Counts" button 740.

Figure 13:
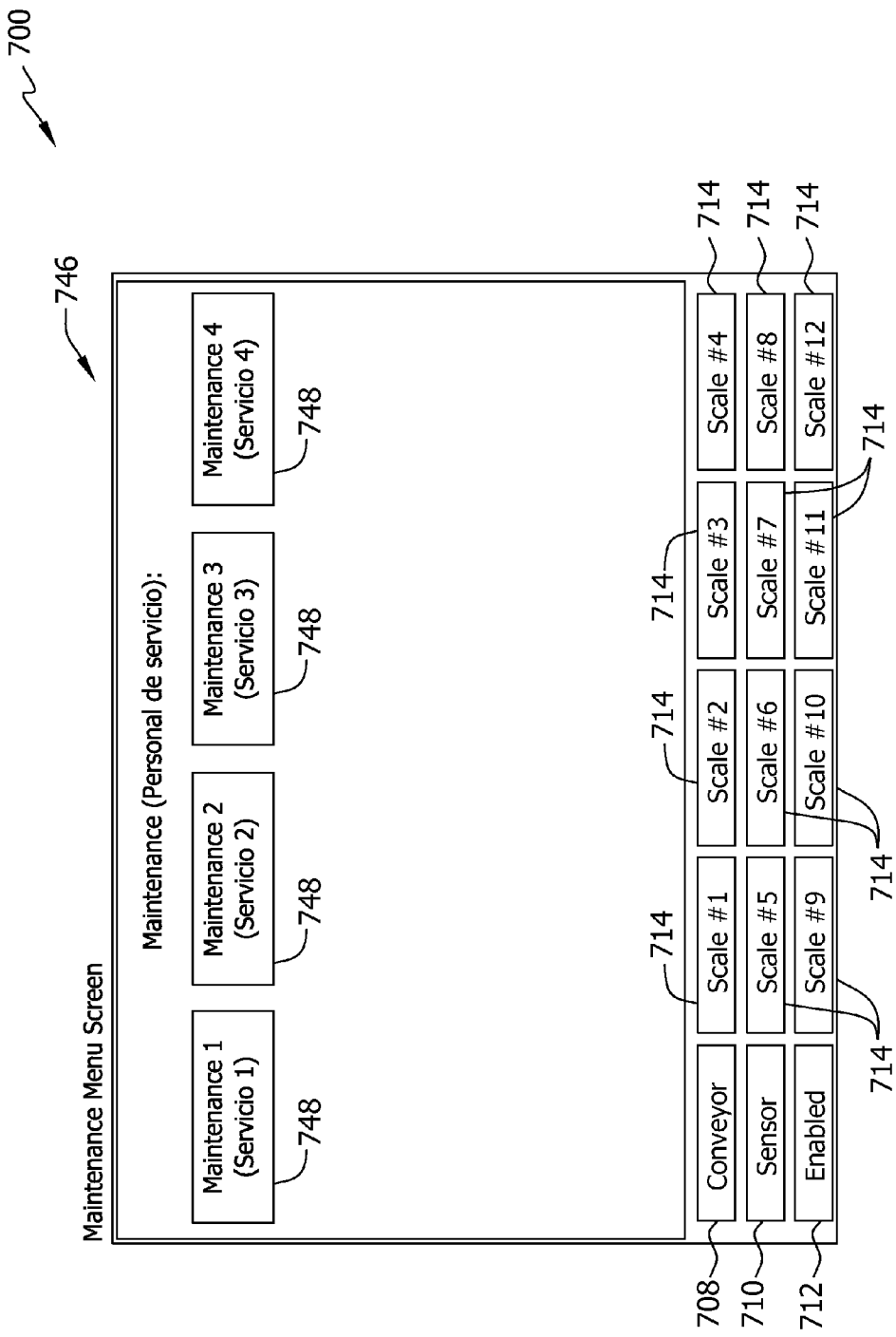

If there is not already a shift selected, a list of shift options, operator options, and maintenance options will be displayed as selectable buttons in three different menus, namely, a shift menu screen 742 (shown in FIG. 11), an operator menu screen 744 (shown in FIG. 12), and a maintenance menu screen 746 (shown in FIG. 13). The operator selects a shift number from shift menu screen 742, an operator number from operator menu screen 744, and a maintenance number from maintenance menu screen 746. After each selection made using selectable buttons 748 on shift menu screen 742, operator menu screen 744, and maintenance menu screen 746, setup menu screen 728 is again displayed. After the shift number, the operator number, and the maintenance number have been selected, main/production screen 702 is again displayed. If there is a shift has already selected, setup menu screen 728 displays an "End Shift" button 750, "Counts" button 740, and a "Back" button 752. Alternatively, all buttons are displayed on setup menu screen 728, and "End Shift" button 750 and "Counts" button 740 are disabled when no shift has been selected.

Figure 14:
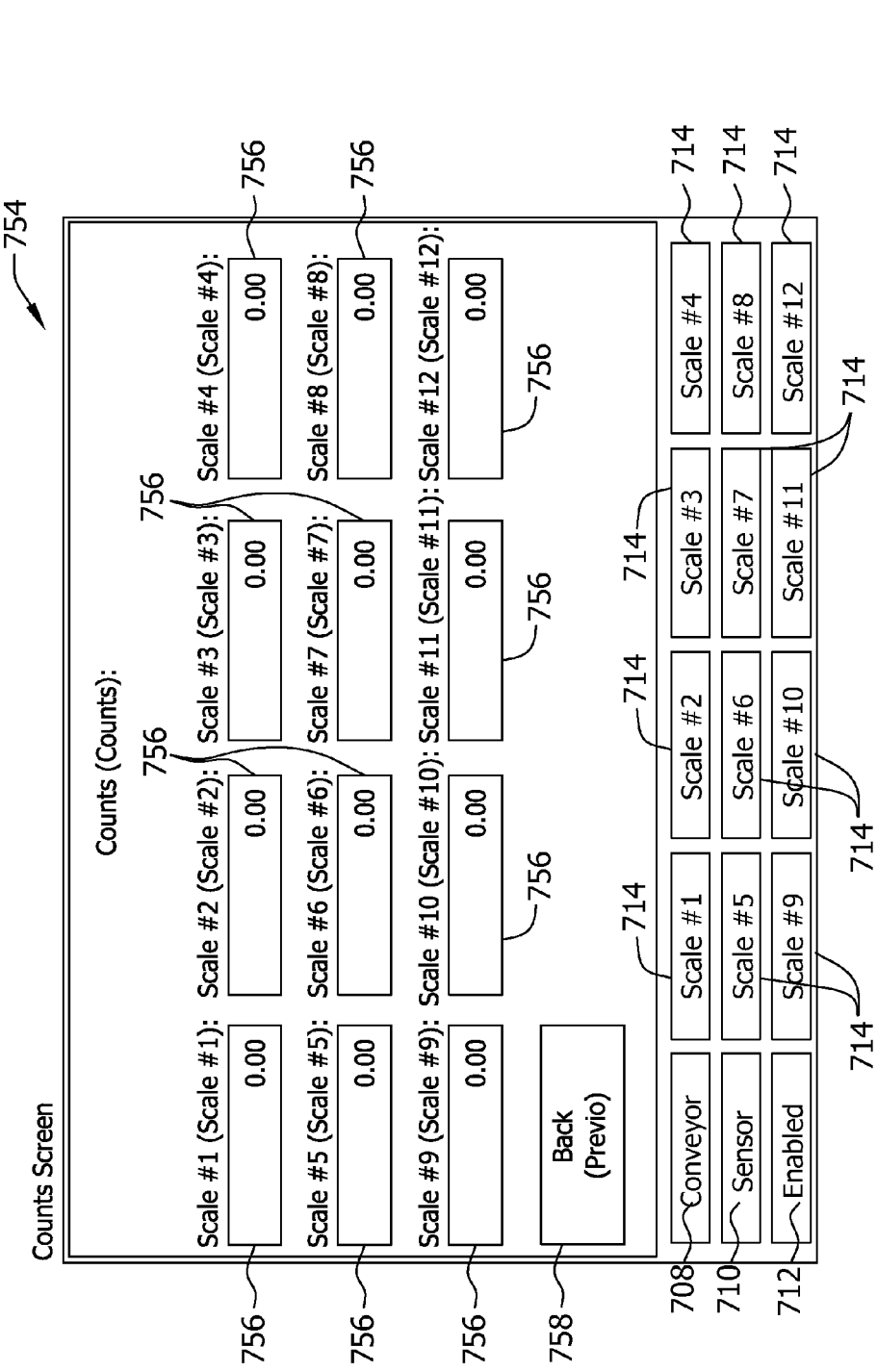

By selecting "Counts" button 740, the operator is directed to a counts screen 754, as shown in FIG. 14. Counts screen 754 includes a plurality of text display boxes, namely, one "Scale" box 756 for each scale sensor in sorting system 100. Each "Scale" box 756 displays a current or total weight value for a respective scale sensor. In one embodiment, counts screen include a toggle button for switching between current weight and total weight for the shift. In the exemplary embodiment, counts screen 754 includes a "Back" button 758 for returning to setup menu screen 728 (shown in FIG. 10). As such, counts screen 754 enables the operator to view each scale count. The scale counts are only viewable when a shift, an operator, and a maintenance number have been selected.

Figure 15:
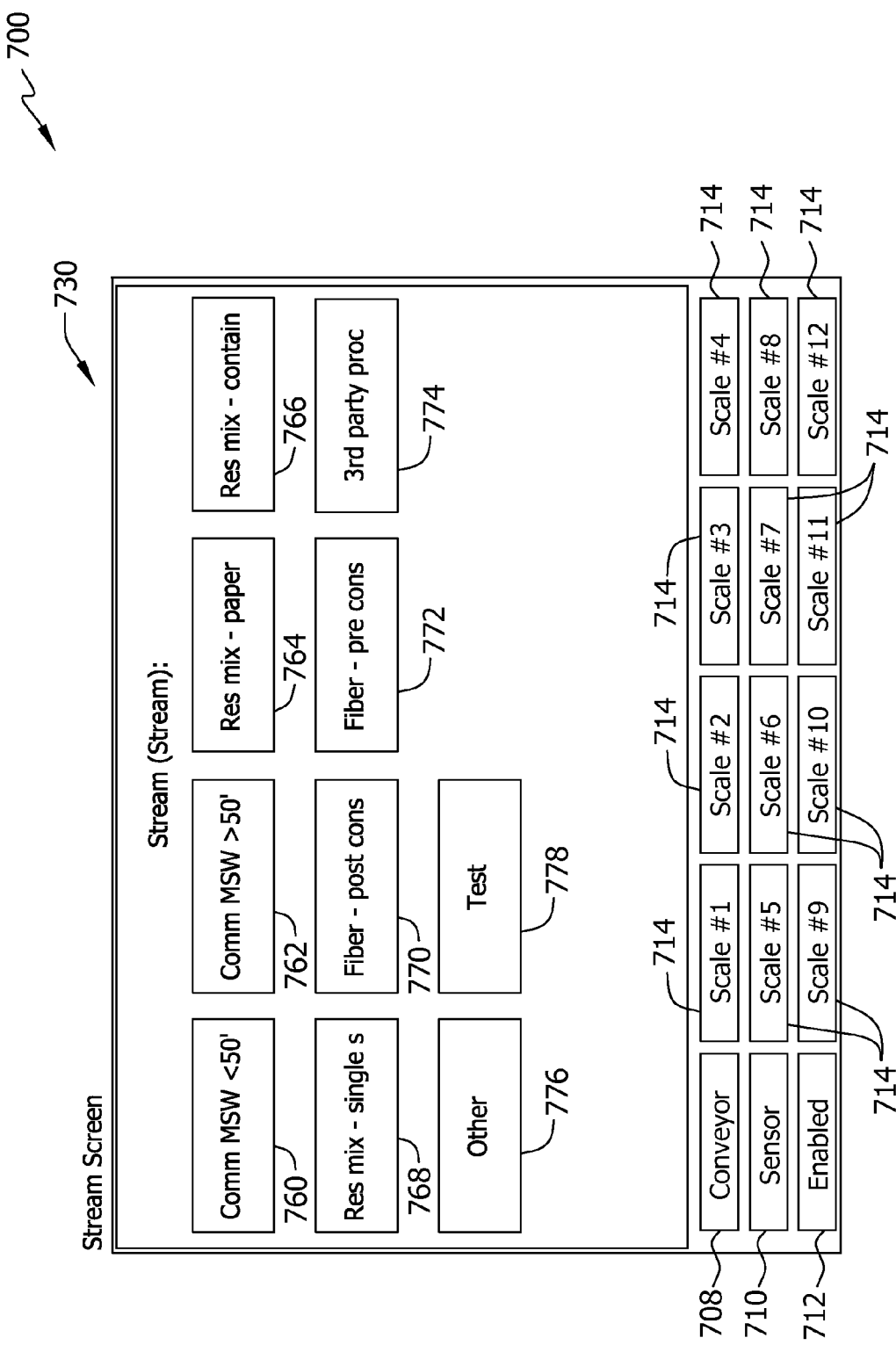

FIG. 15 is stream screen 730 that is presented to an operator upon selecting "Stream" button 706 (shown in FIG. 9) on main/production screen 702 (shown in FIG. 9). The exemplary stream screen 730 enables the operator to select one of seven different types of material that may be fed to sorting system 100. Alternatively, any suitable number of different types of materials may be selectable on stream screen 730. In the exemplary embodiment, stream screen 730 includes a "Comm MSW <50'" button 760, a "Comm MSW >50'" button 762, a "Res mix-paper" button 764, a "Res mix-containers" button 766, a "Res mix-single stream" button 768, a "Fiber-post cons" button 770, and "Fiber-pre cons" button 772, a "3rd party processor" button 774, and an "Other" button 776. As used herein, the abbreviation "comm." stands for "commercial," the abbreviation "MSW" stands for mixed solid waste, and the abbreviation "50'" stands for a percentage of residual. As such, "Comm MSW <50'" refers to a commercial mixed solid waste stream with less than 50% residual. Further, the abbreviation "Res" stands for "residential," and the abbreviation "cons" stands for "consumer." When the operator selects "Other" button 776, the operator may be allowed to enter a description of the stream or it may be sufficient that the stream is indicated as "other." In the exemplary embodiment, stream screen 730 also includes a "Test" button 778. By selecting "Test" button 778, the operator can select a test stream. When a test stream is selected, the operator can run a trial on a particular supply to isolate results of the test supply from results from other streams.

By pressing one of buttons 760, 762, 764, 766, 768, 770, 772, 774, or 776 in stream screen 730, the operator makes a corresponding input into to monitoring interface 300 to identify materials within a product stream to be sorted. More specifically, stream screen 730 is where a type of current stream is selected. The stream options are shown in buttons 760, 762, 764, 766, 768, 770, 772, 774, and 776. Upon selecting a stream type using buttons 760, 762, 764, 766, 768, 770, 772, 774, and/or 776, main/production screen 702 is again displayed.

In other embodiments, greater or fewer material input buttons may be provided, possibly using more than one screen to accommodate additional material inputs. Many types of material inputs, including papers, metals, glass, and/or plastics may be accommodated in stream screen 730. Additionally, inputs made from stream screen 730 may be communicated to one or more controllers of sorting system 100 such that appropriate settings for sorting system 100 are automatically selected for the input material type.

Figure 16:
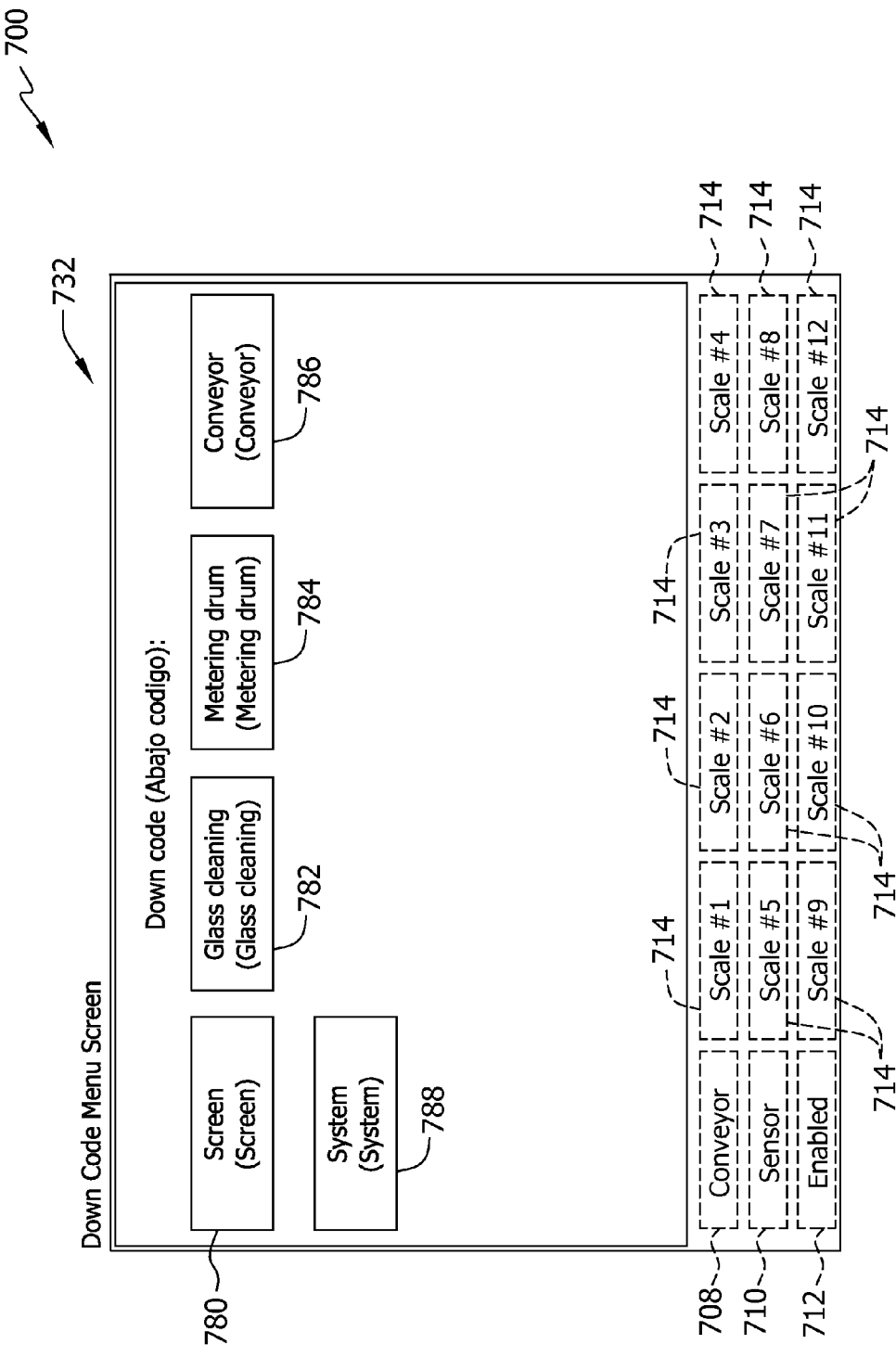

FIG. 16 is down code menu screen 732 that is displayed automatically when interface 300 and/or 302 determines that sorting system 100 has entered a period of downtime and/or when the "Down Code" button on main/production screen 702 (shown in FIG. 9) is selected by the operator. More specifically, in the exemplary embodiment, the display of down code menu screen 732 is triggered based on sensor readings. Down code menu screen 732 includes a plurality of selectable component option buttons including, but not limited to, a "Screen" button 780, a "Glass cleaning" button 782, a "Metering drum" button 784, a "Conveyor" button 786, and a "System" button 788. The operator selects a button 780, 782, 784, 786, or 788 depending on which component of sorting system 100 is experiencing downtime or whether entire sorting system 100 is experiencing downtime. Each button 780, 782, 784, 786, and 788 enables the operator to access a sub-menu corresponding to the selected button.

The operator uses down code menu screen 732 to enter information regarding system downtime. More specifically, down code menu screen includes, for example, five sub-menu options such as screen, glass cleaning, metering drum, conveyor, and system. Alternatively, down code menu screen 732 includes any suitable number of options depending on the sorting system with which user interface 700 is being used. In the exemplary embodiment, the operator selects the appropriate down code sub-menu from down code menu screen 732 using buttons 780, 782, 784, 786, and/or 788. The next menu will list options to give further description on the reason for the downtime, as described in more detail below.

Figure 17:
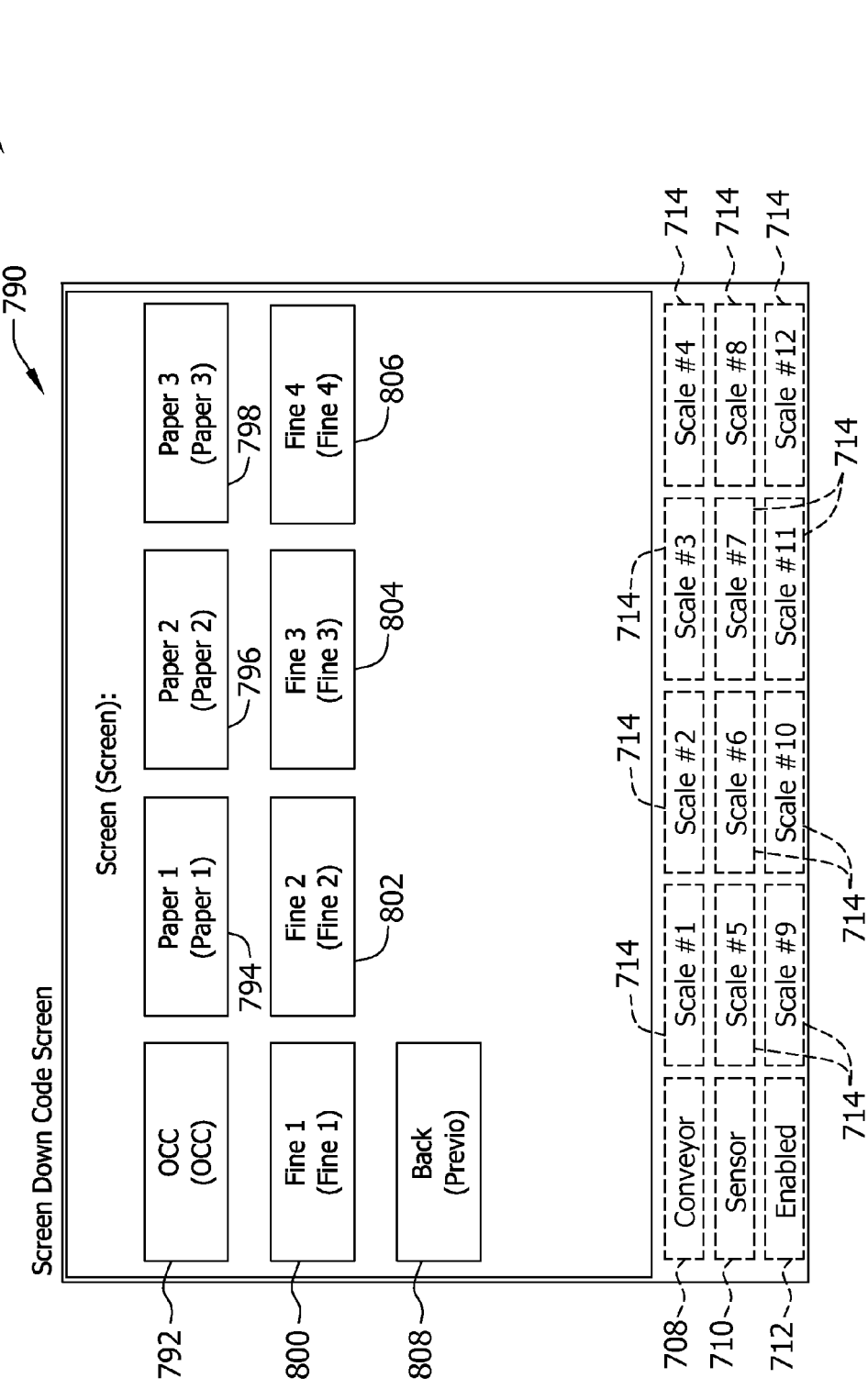

FIG. 17 is a screen down code screen 790 that is displayed when the operator selects "Screen" button 780 (shown in FIG. 16) on down code menu screen 732 (shown in FIG. 16). Screen down code screen 790 includes a plurality of selectable screen buttons that correspond to the screens included in the sorting system with which user interface 700 is being used. In the exemplary embodiment, screen down code screen 790 includes, without limitation, an "OCC" button 792, a "Paper 1" button 794, a "Paper 2" button 796, a "Paper 3" button 798, a "Fine 1" button 800, a "Fine 2" button 802, a "Fine 3" button 804, and a "Fine 4" button 806 corresponding to an old corrugated cardboard (OCC) screen, three paper screens, and four fine screens. Screen down code screen 790 further includes a "Back" button 808 selectable to return to down code menu screen 732.

Screen down code screen 790 enables the operator to enter additional information regarding the downtime of a screen. The operator selects the appropriate down code sub-menu from screen down code screen 790 using buttons 792, 794, 796, 798, 800, 802, 804, and/or 806. A menu of options for the selected screen is then displayed to allow the operator to provide a further description regarding the reason for the downtime of the selected screen. For example, the menu of options can include a plurality of selectable buttons each with a reason for the downtime, including an "Other" button that allows the operator to enter a reason not provided for with the selectable buttons. Examples of selectable description option buttons are shown in FIGS. 18-21. Upon selecting the appropriate description option, main/production screen 702 (shown in FIG. 9) is again displayed and interfaces 300 and/or 302 wait for sorting system 100 to be enabled. During the wait for enablement, interface 300 and/or 302 records the time from when the downtime began and/or was detected to when sorting system 100 becomes enabled. The recorded time is used to produce a report and/or a chart of the downtime experienced by sorting system 100.

Figure 18:
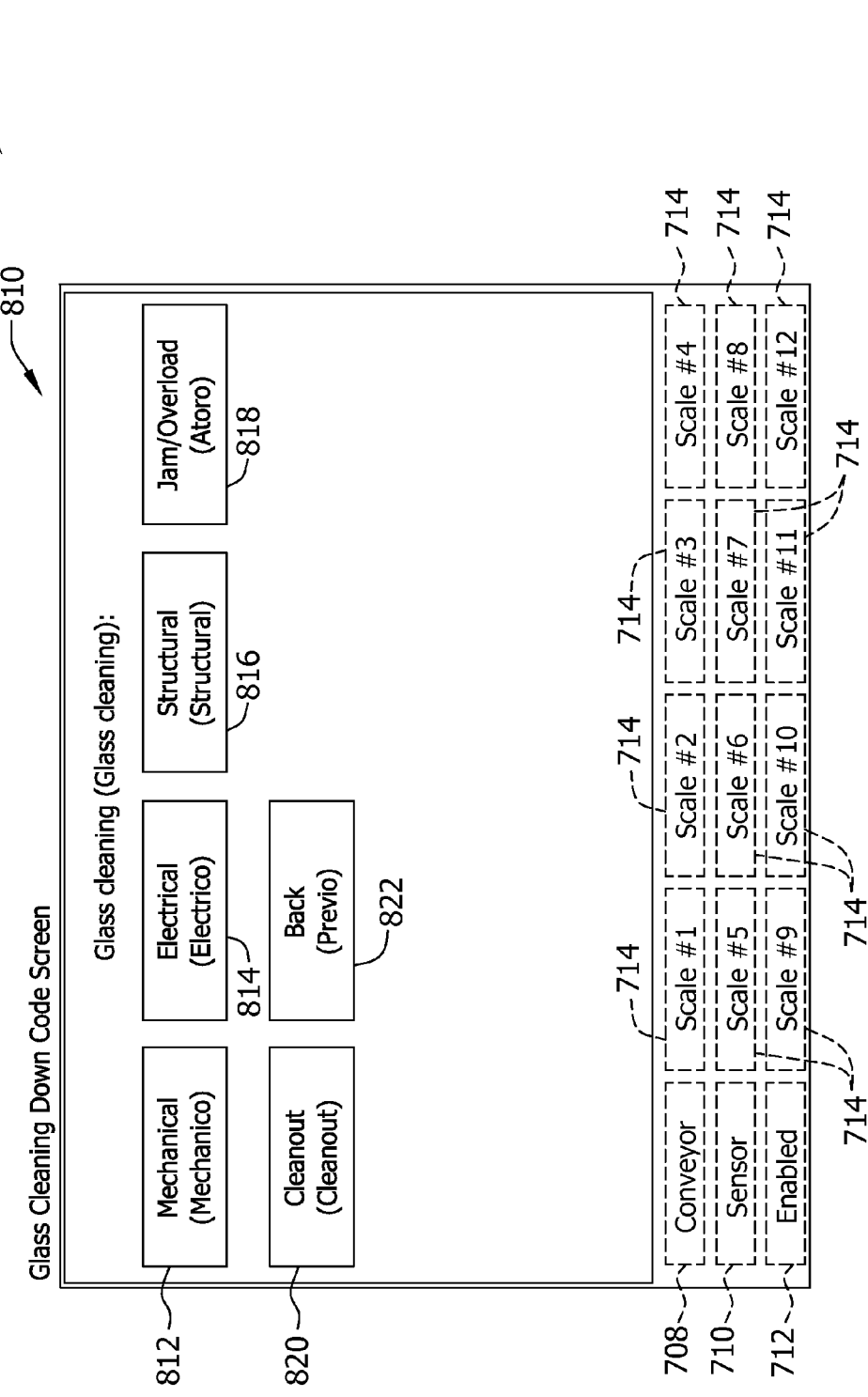

FIG. 18 is a glass cleaning down code screen 810 that is displayed when the operator selects the "Glass cleaning" button 782 (shown in FIG. 16) on down code menu screen 732 (shown in FIG. 16). Glass cleaning down code screen 810 includes a plurality of selectable description buttons corresponding to reasons a glass sorting and/or cleaning component may be experiencing downtime. In the exemplary embodiment, glass cleaning down code screen 810 includes a "Mechanical" button 812, an "Electrical" button 814, a "Structural" button 816, a "Jam/Overload" button 818, and a "Cleanout" button 820. In one embodiment, glass cleaning down code screen 810 includes an "Other" button that allows the operator to enter a reason not provided for with the selectable buttons 812, 814, 816, 818, and 820. In the exemplary embodiment, glass cleaning down code screen 810 further includes a "Back" button 822 that is selectable to return to down code menu screen 732. When sorting system 100 includes more than one glass cleaning and/or sorting component, a screen similar to screen down code screen 790 (shown in FIG. 17) is provided to select which glass cleaning and/or sorting component is experiencing downtime, and the description buttons are provided in a menu displayed upon selecting a particular glass cleaning and/or sorting component.

Glass cleaning down code screen 810 enables the operator to enter additional information regarding the downtime related to glass cleaning The operator selects the appropriate down code from glass cleaning down code screen 810 using buttons 812, 814, 816, 818, and/or 820. Upon selecting the appropriate description option, main/production screen 702 (shown in FIG. 9) is again displayed and interfaces 300 and/or 302 wait for sorting system 100 to be enabled. During the wait for enablement, interface 300 and/or 302 records the time from when the downtime began and/or was detected to when sorting system 100 becomes enabled. The recorded time is used to produce a report and/or a chart of the downtime experienced by sorting system 100.

Figure 19:
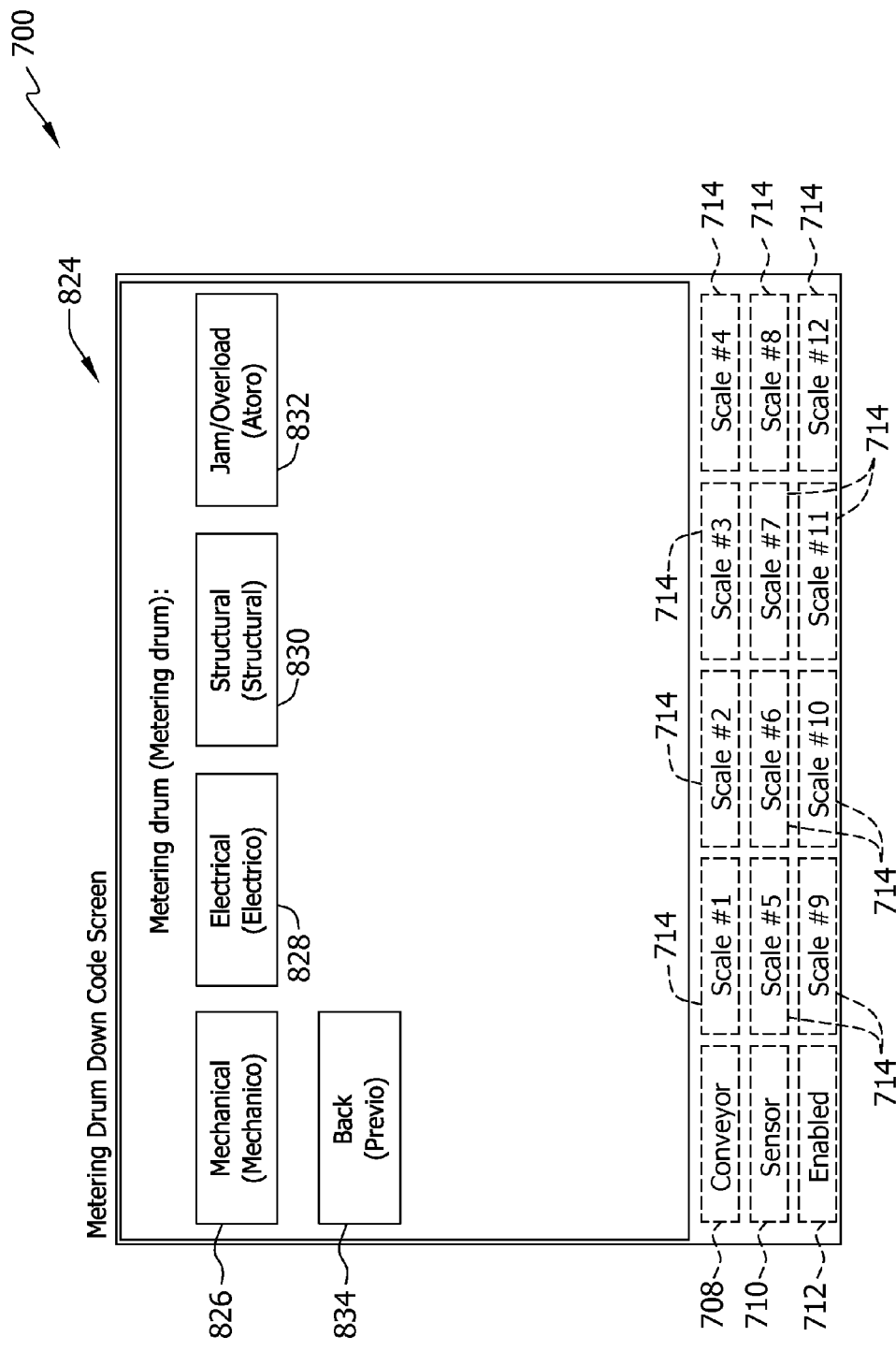

FIG. 19 is a metering drum down code screen 824 that is displayed when the operator selects "Metering drum" button 784 (shown in FIG. 16) on down code menu screen 732 (shown in FIG. 16). Metering drum down code screen 824 includes a plurality of selectable description buttons corresponding to reasons a metering drum may be experiencing downtime. In the exemplary embodiment, metering drum down code screen 824 includes a "Mechanical" button 826, an "Electrical" button 828, a "Structural" button 830, and a "Jam/Overload" button 832. In one embodiment, metering drum down code screen 824 includes an "Other" button that allows the operator to enter a reason not provided for with the selectable buttons 826, 828, 830, and 832. In the exemplary embodiment, metering drum down code screen 824 further includes a "Back" button 834 that is selectable to return to down code menu screen 732. When sorting system 100 includes more than one metering drum, a screen similar to screen down code screen 790 (shown in FIG. 17) is provided to select which metering drum is experiencing downtime, and the description buttons are provided in a menu displayed upon selecting a particular metering drum.

Metering drum down code screen 824 enables the operator to enter additional information regarding the downtime of a metering drum. The operator selects the appropriate down code from metering drum down code screen 824 using buttons 826, 828, 830, and/or 832. Upon selecting the appropriate description option, main/production screen 702 (shown in FIG. 9) is again displayed and interfaces 300 and/or 302 wait for sorting system 100 to be enabled. During the wait for enablement, interface 300 and/or 302 records the time from when the downtime began and/or was detected to when sorting system 100 becomes enabled. The recorded time is used to produce a report and/or a chart of the downtime experienced by sorting system 100.

Figure 20:
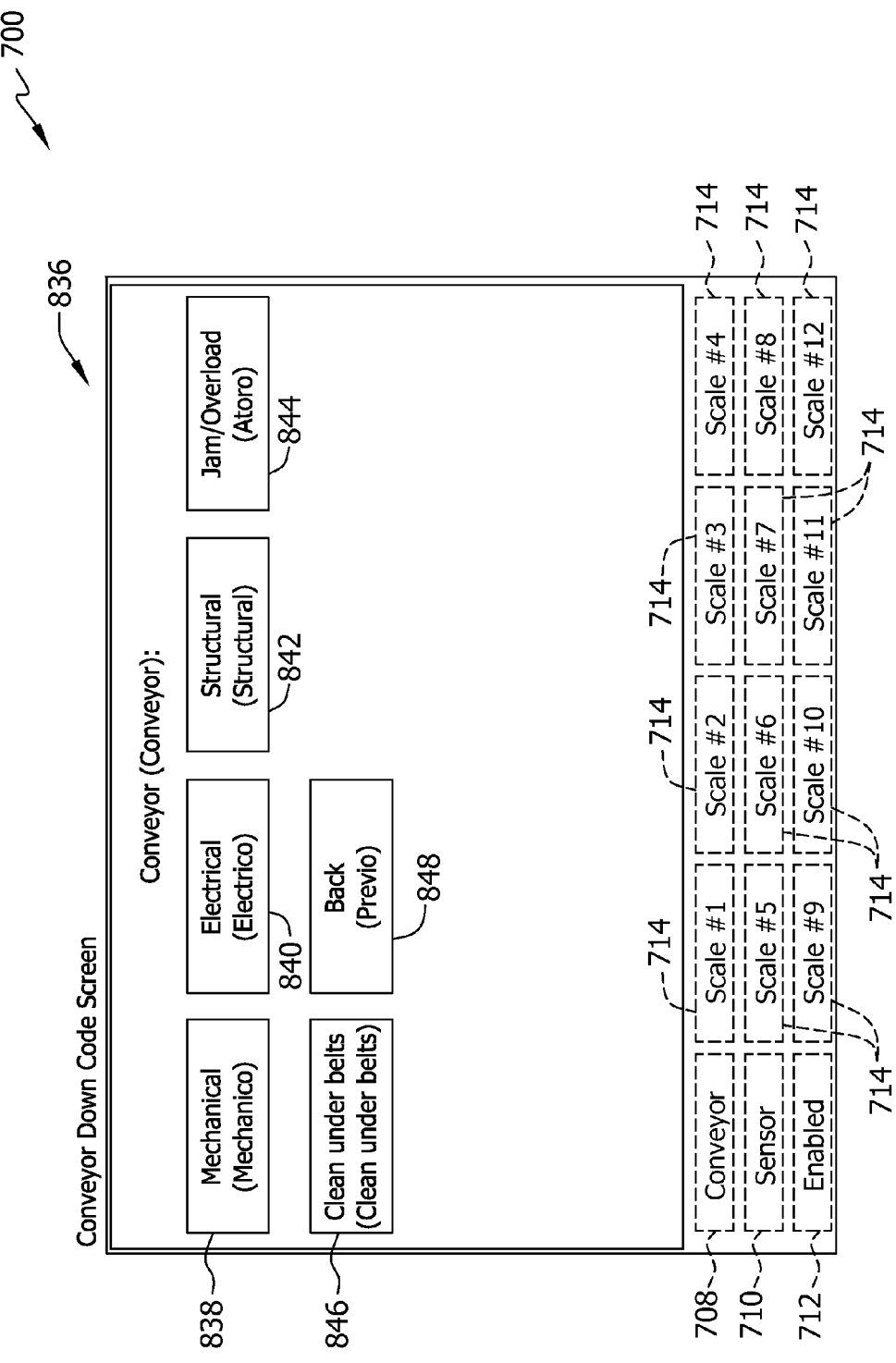

FIG. 20 is a conveyor down code screen 836 that is displayed when the operator selects "Conveyor" button 786 (shown in FIG. 16) on down code menu screen 732 (shown in FIG. 16). Conveyor down code screen 836 includes a plurality of selectable description buttons corresponding to reasons a conveyor may be experiencing downtime. In the exemplary embodiment, conveyor down code screen 836 includes a "Mechanical" button 838, an "Electrical" button 840, a "Structural" button 842, a "Jam/Overload" button 844, and a "Clean under belts" button 846. In one embodiment, conveyor down code screen 836 includes an "Other" button that allows the operator to enter a reason not provided for with the selectable buttons 838, 840, 842, 844, and 846. In the exemplary embodiment, conveyor down code screen 836 further includes a "Back" button 848 that is selectable to return to down code menu screen 732. When sorting system 100 includes more than conveyor, a screen similar to screen down code screen 790 (shown in FIG. 17) is provided to select which conveyor is experiencing downtime, and the description buttons are provided in a menu displayed upon selecting a particular conveyor.

Conveyor down code screen 836 enables the operator to enter additional information regarding the downtime of a conveyor. The operator selects the appropriate down code from conveyor down code screen 836 using buttons 838, 840, 842, 844, and/or 846. Upon selecting the appropriate description option, main/production screen 702 (shown in FIG. 9) is again displayed and interfaces 300 and/or 302 wait for sorting system 100 to be enabled. During the wait for enablement, interface 300 and/or 302 records the time from when the downtime began and/or was detected to when sorting system 100 becomes enabled. The recorded time is used to produce a report and/or a chart of the downtime experienced by sorting system 100.

Figure 21:
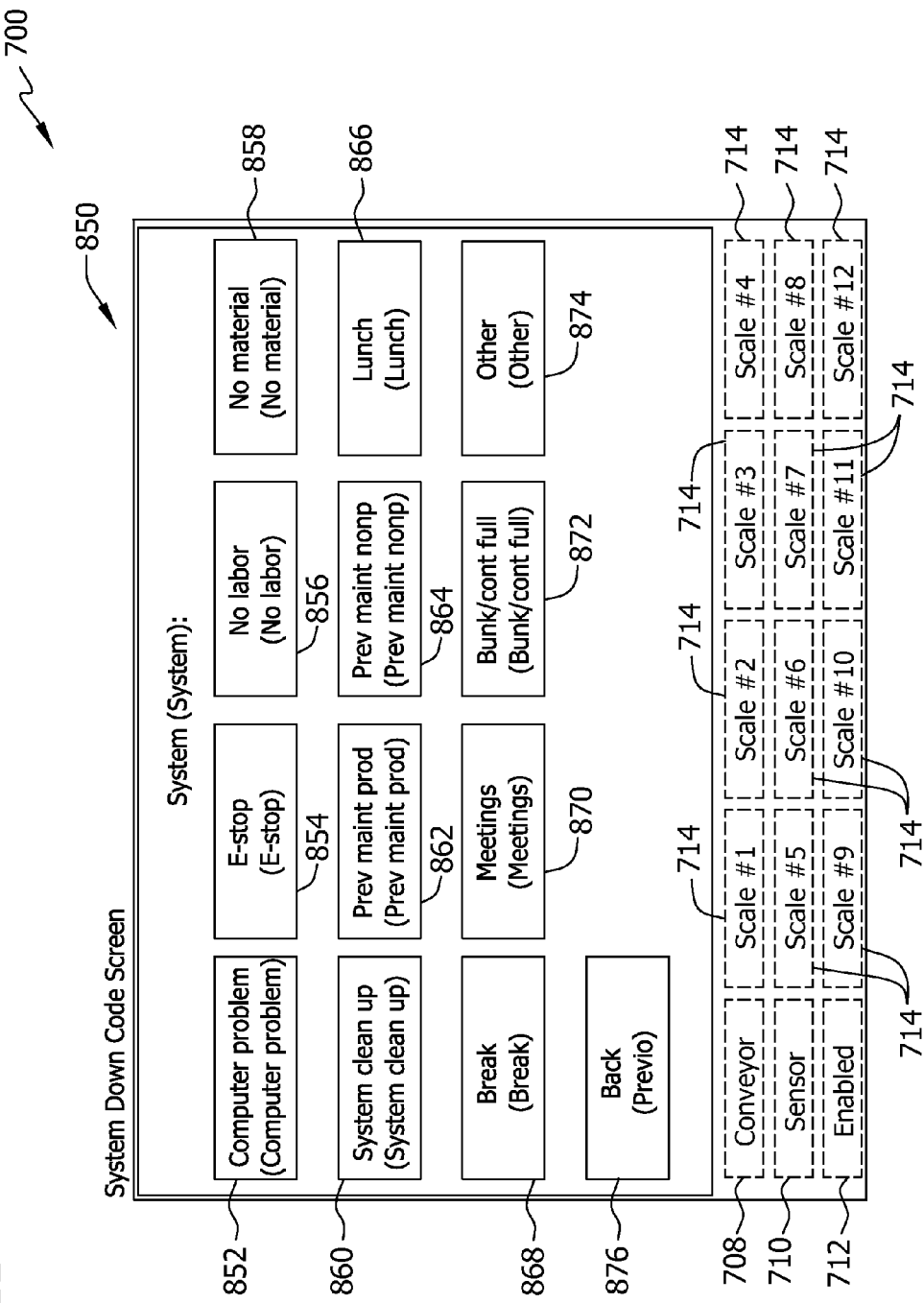

FIG. 21 is a system down code screen 850 that is displayed when the operator selects "System" button 788 (shown in FIG. 16) on down code menu screen 732 (shown in FIG. 16). System down code screen 850 includes a plurality of selectable description buttons corresponding to reasons entire sorting system 100 may be experiencing downtime. In the exemplary embodiment, system down code screen 850 includes a "Computer problems" button 852, an "Emergency stop" button 854, a "No labor" button 856, a "No Material" button 858, a "System clean up" button 860, a "Preventative maintenance production" button 862, a "Preventative maintenance nonproduction" button 864, a "Lunch" button 866, a "Break" button 868, a "Meetings" button 870, a "Bunker/container full" button 872, and an "Other" button 874.

In one embodiment, "Other" button 874 allows the operator to enter a reason not provided for with the other selectable buttons 852, 854, 856, 858, 860, 862, 864, 866, 868, 870, and 872. Alternatively, in some embodiments, it is sufficient to indicate that the system downtime is attributable to another reason not listed in buttons 852, 854, 856, 858, 860, 862, 864, 866, 868, 870, and 872. In the exemplary embodiment, system down code screen 850 further includes a "Back" button 876 that is selectable to return to down code menu screen 732.

System down code screen 850 enables the operator to enter additional information regarding the downtime of sorting system 100. The operator selects the appropriate down code from system down code screen 850 using buttons 852, 854, 856, 858, 860, 862, 864, 866, 868, 870, 872, and/or 874. Upon selecting the appropriate description option, main/production screen 702 (shown in FIG. 9) is again displayed and interfaces 300 and/or 302 wait for sorting system 100 to be enabled. During the wait for enablement, interface 300 and/or 302 records the time from when the downtime began and/or was detected to when sorting system 100 becomes enabled. The recorded time is used to produce a report and/or a chart of the downtime experienced by sorting system 100.

The screens of FIGS. 9-21 are utilized to collect a number of different types of sorting system runtime and downtime statuses that may be useful for analysis purposes. By accounting for specific persons using sorting system 100, such as operators and maintenance personnel, the screens shown in FIGS. 9-13 account primarily for human-related production factors and/or the effectiveness of the operators using sorting system 100. Monitoring interface 300 accounts for machine-related factors, however, user interface 700 qualifies the downtime in the down code screens discussed above. By tracking and recording such specific downtime events of sorting system 100, issues or problems in these areas may be diagnosed and, if possible, corrected as well as factored into a performance analysis.

Further, the user interface display screens shown in FIGS. 9-21 may be implemented conventionally in a computer program embodied on a computer-readable medium and having segments of code or instructions executed by a computer that correspond to the various functions and features described above. Using the screens shown in FIGS. 9-21, a wealth of information regarding sorting system runtime and downtime conditions is gathered for purposes of evaluating performance baselines and assessing performance as described in the methodology set forth above. Equipment issues and personnel issues may be capably monitored and rather comprehensively evaluated.

VI. Reports and Charts Produced

Using the information entered into user interface 700 (shown in FIGS. 9-21) and data collected by sensors 304, 306, and/or 308 (shown in FIG. 3), reports and/or charts are produced using method 400 (shown in FIG. 6), method 500 (shown in FIG. 7), and/or method 600 (shown in FIG. 8). Exemplary reports are shown in FIGS. 22-24 and exemplary charts are shown in FIGS. 25-29, however, it should be understood that results of methods 400, 500, and/or 600 can be presented in any suitable format showing any suitable information generated from methods 400, 500, and/or 600.

FIGS. 22A, 22B, 23A, 23B, 23C, 23D, and 24 illustrate exemplary pages of contemplated reports and analysis data produced by computer 320 (shown in FIGS. 3-5) and/or performance interface 302 (shown in FIGS. 3-5) using data collected from monitoring interface 300 (shown in FIGS. 3-5).

Figure 22A:
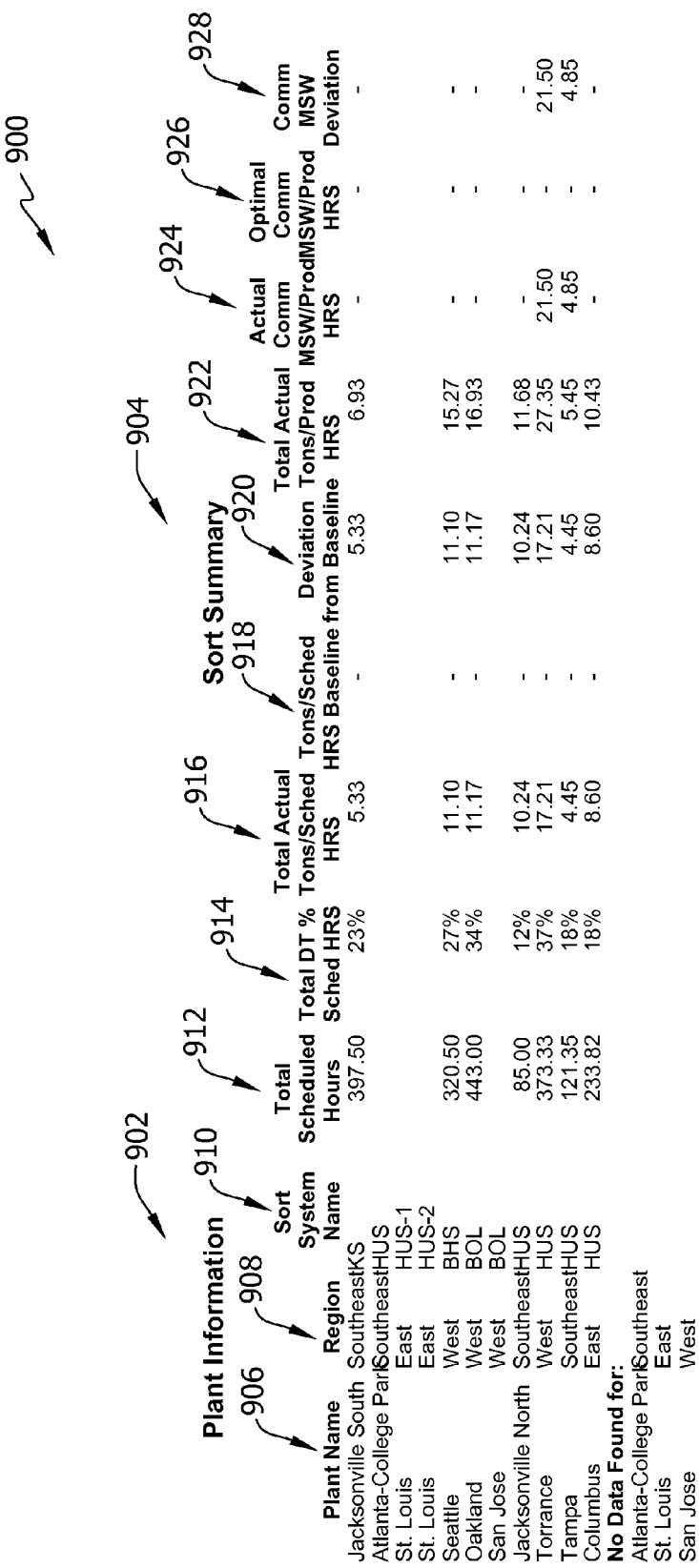
FIG. 22A represents a first page of a report including a sort summary section.
Figure 22B:
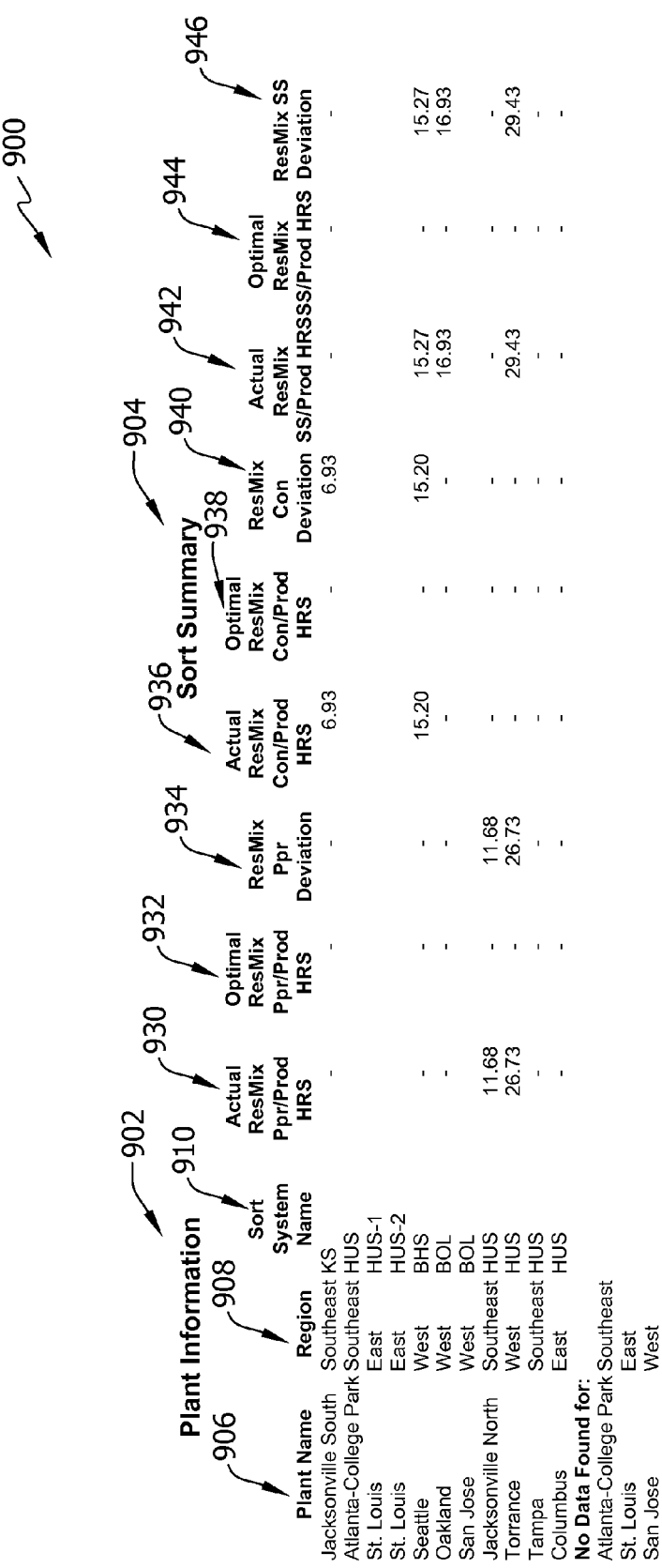
FIG. 22B represents a second page of the report including a sort summary section.
Figure 23A:
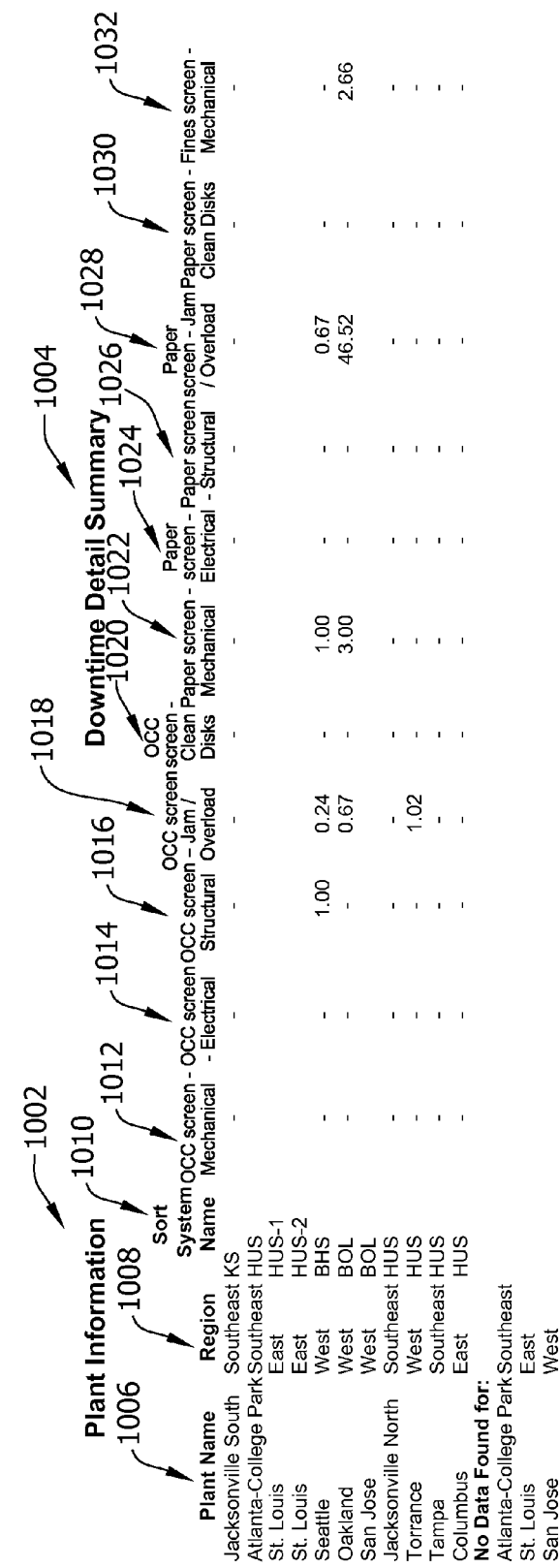
FIG. 23A represents a first page of a report including a downtime detail summary section.
Figure 23B:
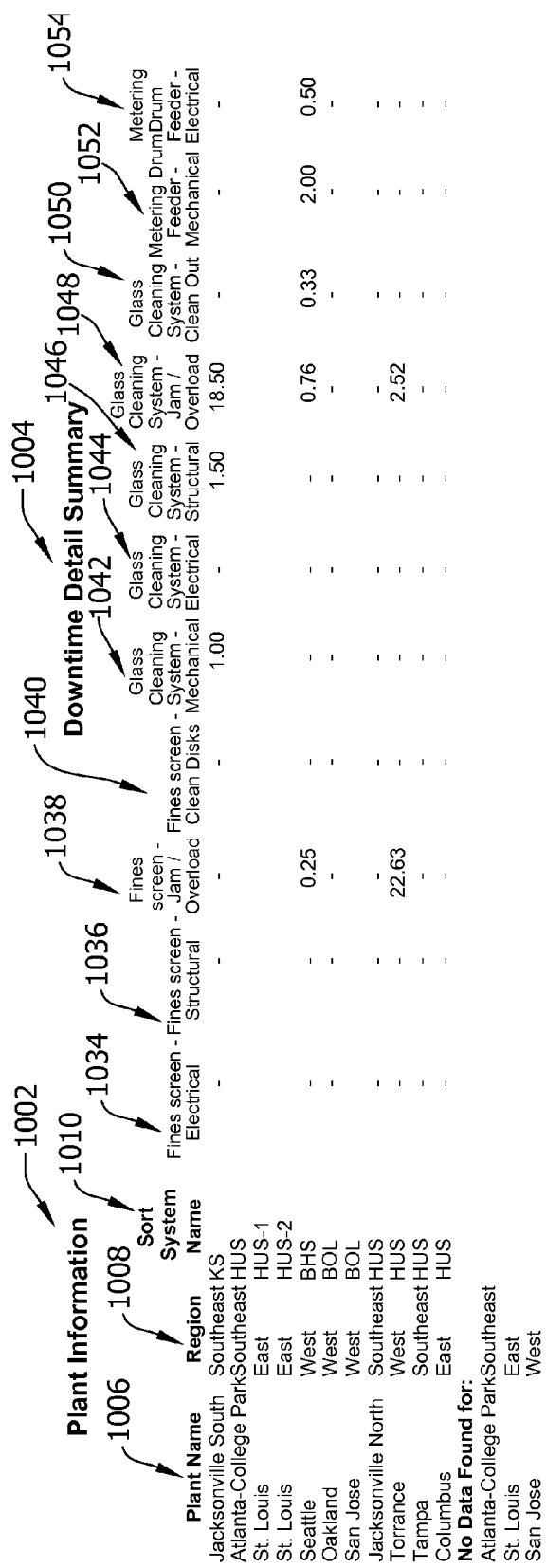
FIG. 23B represents a second page of the report including a downtime detail summary section.
Figure 23C:
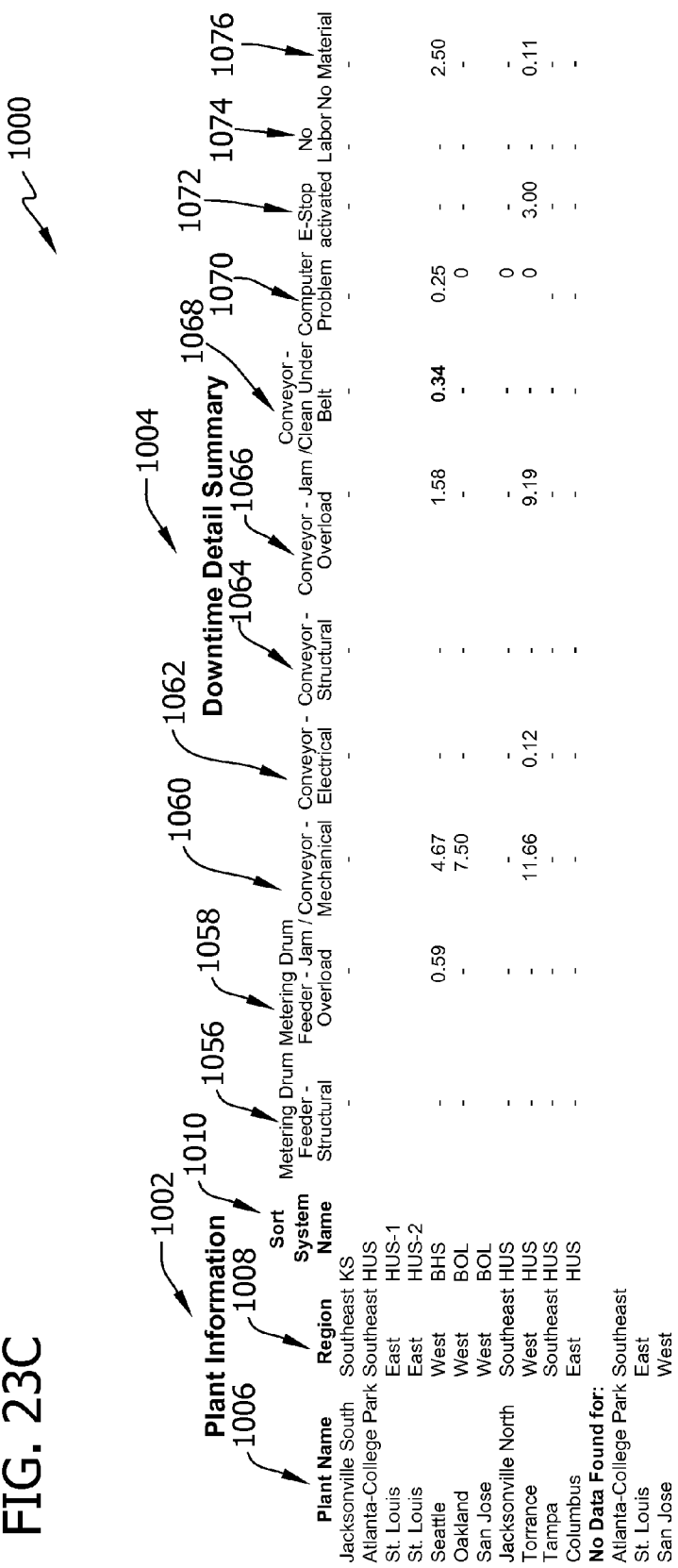
FIG. 23C represents a third page of the report including a downtime detail summary section.
Figure 23D:
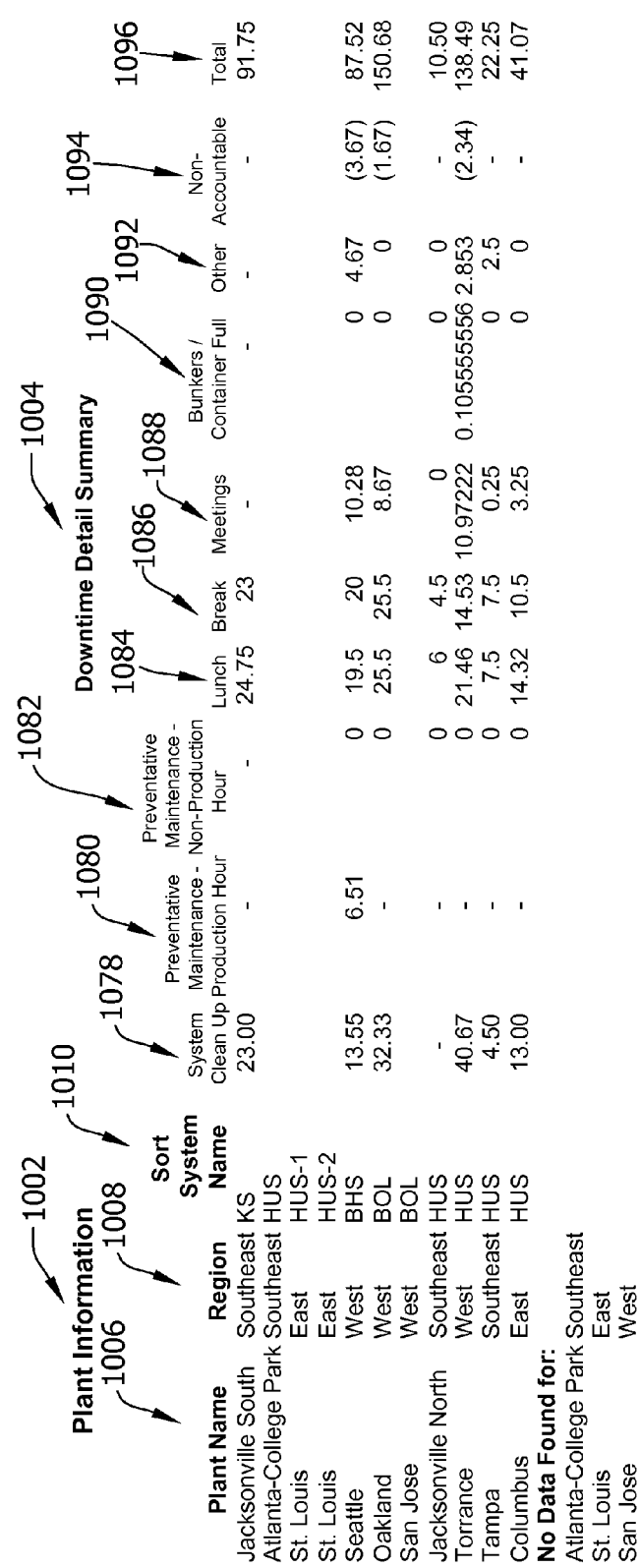
FIG. 23D represents a fourth page of the report including a downtime detail summary section.

FIGS. 22A and 22B represent an exemplary sort summary report 900 for multiple sorting systems in various facilities. As shown in FIGS. 22A and 22B, report 900 is provided in multi-column format and includes two general sections, namely a plant information section 902 and a sort summary section 904. Additional or fewer sections may be provided in alternative embodiments, with each row corresponding to data from different sorting systems of the same or different types.

In the illustrated example, plant information section 902 includes a plant name column 906, a region column 908, and a sort system name column 910 for each sorting system included in report 900. Additional or different columns could likewise be provided in plant information section 902. While eleven different rows are provided corresponding to eleven different sorting systems for which information was found to be included in report 900, it is understood that a greater or fewer number of sorting systems, including a single sorting system, could be included in report 900. Further, plant information section 902 includes rows in plant name column 906 for sorting systems for which data was not found. Alternatively, such information can be omitted from report 900.

Sort summary section 904 includes columns based on an optimal recovery of commodities from at least one incoming product stream. The optimal recovery is an estimate based on an initial hand sort of an incoming product stream as described above with respect to method 500 (shown in FIG. 7). In the exemplary embodiment, sort summary section 904 includes a total scheduled hours column 912, a total downtime percentage of the schedule hours column 914, a total actual tons per schedule hours column 916, a tons per scheduled hour baseline column 918, a deviation from baseline column 920, a total actual tons per production hour column 922, an actual Comm. MSW per production hour column 924, an optimal Comm. MSW per production hour column 926, a Comm. MSW deviation column 928, an actual res. mix paper per production hour column 930, an optimal res. mix paper per production hour column 932, a res. mix paper deviation column 934, an actual res. mix containers per production hour column 936, an optimal res. mix containers per production hour column 938, a res. mix containers deviation column 940, an actual res. mix SS (single stream) per production hour column 942, an optimal res. mix SS per production hour column 944, and a res. mix SS deviation column 946.

The optimal values are found from the initial hand sort described above and are entered into performance interface 302 prior to producing report 900 and, preferably, prior to sorting the product stream. Deviation columns 920, 928, 934, 940, and/or 946 illustrate how much above or below the optimal estimation the actual amount of a commodity is, based on the weights input by the scale sensors within sorting system 100. From the deviation amounts, the accuracy of the estimated optimal recovery for a product stream can be evaluated and adjusted before accepting a similar product stream into a sorting system. As such, report 900 illustrates the actual characterization of a product stream versus the estimated characterization of the product stream. Report 900 may also illustrate the effectiveness of a sorting system at properly characterizing a product stream.

FIGS. 23A, 23B, 23C, and 23D represent an exemplary downtime detail report 1000 for multiple sorting systems in various facilities. As shown in FIGS. 23A, 23B, 23C, and 23D, report 1000 is provided in multi-column format and includes two general sections, namely a plant information section 1002 and a downtime detail section 1004. Additional or fewer sections may be provided in alternative embodiments, with each row corresponding to data from different sorting systems of the same or different types.

In the illustrated example, plant information section 1002 includes a plant name column 1006, a region column 1008, and a sort system name column 1010 for each sorting system included in report 1000. Additional or different columns could likewise be provided in plant information section 1002. While eleven different rows are provided corresponding to eleven different sorting systems for which information was found to be included in report 1000, it is understood that a greater or fewer number of sorting systems, including a single sorting system, could be included in report 1000. Further, plant information section 1002 includes rows in plant name column 1006 for sorting systems for which data was not found. Alternatively, such information can be omitted from report 1000.

Downtime detail section 1004 includes columns based on components of the sorting systems and reasons each component may be experiencing downtime, as selected using, for example, user interface 700 (shown in FIGS. 9-21). In the exemplary embodiment, downtime detail section 1004 includes an OCC screen-mechanical column 1012, an OCC screen-electrical column 1014, and OCC screen-structural column 1016, an OCC screen-jam/overload column 1018, an OCC screen-clean disks column 1020, a paper screen-mechanical column 1022, a paper screen-electrical column 1024, a paper screen-structural column 1026, a paper screen-jam/overload column 1028, a paper screen-clean disks column 1030, a fines screen-mechanical column 1032, a fines screen-electrical column 1034, a fines screen-structural column 1036, a fines screen-jam/overload column 1038, a fines screen-clean disks column 1040, a glass cleaning system-mechanical column 1042, a glass cleaning system-electrical column 1044, a glass cleaning system-structural column 1046, a glass cleaning system-jam/overload column 1048, a glass cleaning system-clean out column 1050, a metering drum-mechanical column 1052, a metering drum-electrical column 1054, a metering drum-structural column 1056, a metering drum-jam/overload column 1058, a conveyor-mechanical column 1060, a conveyor-electrical column 1062, a conveyor-structural column 1064, a conveyor-jam/overload column 1066, a conveyor-clean under belt column 1068, a computer problem column 1070, an E-Stop activated column 1072, a no labor column 1074, a no material column 1076, a system clean up column 1078, a preventative maintenance-production hour column 1080, a preventative maintenance non-production hour column 1082, a lunch column 1084, a break column 1086, a meetings column 1088, a bunkers/container full column 1090, an other column 1092, and non-accountable column 1094, and a total column 1096.

Alternatively, downtimes are shown for each component, without further breakdown by the reason for the downtime. Further, in an alternative embodiment, rather than downtimes being shown for all OCC screens, paper screens, or fines screens in a sorting system, report 1000 may show downtimes for each OCC screen, paper screen, and/or fines screen separately.

FIG. 24 represents an exemplary downtime category report 1100 for multiple sorting systems in various facilities. As shown in FIG. 24, report 1100 is provided in multi-column format and includes two general sections, namely a plant information section 1102 and a downtime categories section 1104. Additional or fewer sections may be provided in alternative embodiments, with each row corresponding to data from different sorting systems of the same or different types.

In the illustrated example, plant information section 1102 includes a plant name column 1106, a region column 1108, and a sort system name column 1110 for each sorting system included in report 1100. Additional or different columns could likewise be provided in plant information section 1102. While eleven different rows are provided corresponding to eleven different sorting systems for which information was found to be included in report 1100, it is understood that a greater or fewer number of sorting systems, including a single sorting system, could be included in report 1100. Further, plant information section 1102 includes rows in plant name column 1106 for sorting systems for which data was not found. Alternatively, such information can be omitted from report 1100.

Downtime categories section 1104 is configured to show downtimes for each type of component within sorting system 100 and/or for entire sorting system 100. As such, using report 1100, the operator can ascertain which types of components are experiencing the most downtime. Preventative maintenance, repair, and/or replacement can then be performed to reduce the downtime of a component and/or the system. In the exemplary embodiment, downtime categories section 1104 includes a screens column 1112 for showing a total downtime for all screens in a sorting system, a glass cleaning column 1114 for showing a total downtime for all glass cleaning components in a sorting system, a metering drum column 1116 for showing a total downtime for all metering drums in a sorting system, a conveyors column 1118 for showing a total downtime for all conveyors in a sorting system, and system column 1120 for showing a total downtime for an entire sorting system, and a total column 1122 for showing all downtime experienced at a sorting system.

Referring to FIGS. 22-24, the columns in each of the sections are populated by performance interface 302, and reports 900, 1000, and/or 1100 may be generated periodically or on demand by interested parties. As examples, the reports described herein and/or any other suitable report may be generated daily, weekly, monthly, quarterly, and/or yearly. The reports may be customized to have varying levels of detail for review by different parties. The reports may be automatically faxed, emailed, printed, and/or otherwise provided to authorized parties. Similar reports may be generated including data for one sorting system only rather than a plurality of sorting systems.

The reports may additionally be highlighted or otherwise formatted to identify particular issues. For example, sorting system deviating below baseline values by a predetermined amount may be differentiated in style (e.g. bold, italics, different font types, etc.) or by a different color (e.g., red) from the color (e.g., black) of the rest of the report. Thus, problem areas may be automatically flagged to gain attention by persons reviewing the report. More than one technique of the same or different kind to that described above may likewise be employed to garner attention to different issues.

A number of advantages flow from such reports 900, 1000, and/or 1100, many of which are believed to be evident from FIGS. 22-24. The performance of individual sorting systems or groups of sorting system can quickly and consistently be assessed to see if they are performing above or below baseline values in various aspects of operation. Multiple queries may be run and reports generated to focus on different aspects of sorting system performance, different groups of sorting systems, different plants, etc. and reports may be custom-tailored for different users.

Using such reports 900, 1000, and/or 1100, the sorting systems may also be compared to one another to reveal irregularities that may require investigation, such as a sorting system that is consistently underperforming its peers in one or more areas of evaluation, or sorting systems having excessive downtime in particular areas that other sorting systems are not exhibiting. Further, sorting systems can be evaluated in terms of shifts, operators, and/or maintenance personnel to determine superior performing and/or underperforming shifts, operators, and/or maintenance personnel. Strategic planning is also facilitated as production output of different sorting systems of different manufacturers can be compared to see which better serves the needs of a facility in terms of output, reliability, and expense. Such considerations are very difficult to appreciate, if they could be appreciated at all, without the monitoring interfaces and performance interfaces as described.

Any suitable data collected by monitoring interface 300 (shown in FIGS. 3-5) and analyzed by performance interface 302 (shown in FIGS. 3-5) can be displayed as a chart. Example charts are shown in FIGS. 25-29, however, it should be understood that any suitable chart may be generated to evaluate the performance of at least one sorting system. Any of the charts produced using monitoring interface 300 and/or performance interface 302 can include interactive menus, such as drop down menus, to change any variable displayed in the chart, such as a location and/or sorting system.

Figure 25:
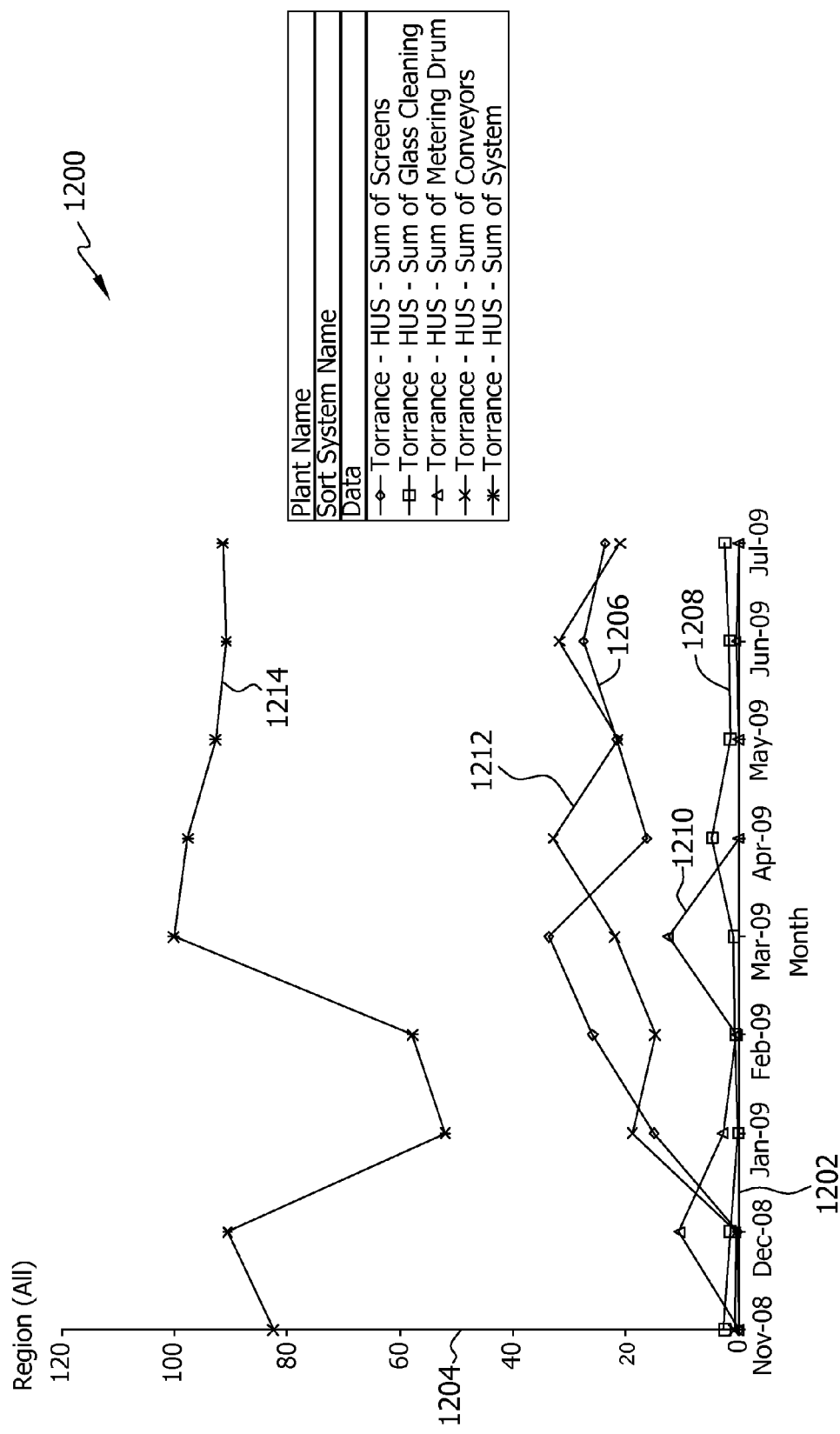

FIG. 25 is a representative downtime chart 1200 for a single sorting system, illustrating actual performance over time of the sorting system in terms of downtime per component and a total downtime of the sorting system. In chart 1200, a time is plotted on an X-axis 1202 in any suitable unit of time, such as months, and a length of downtime is plotted on a Y-axis 1204 in any suitable unit of time, such as hours. In the exemplary embodiment, chart 1200 includes a plotted line 1206 for all downtime for the screens in the sorting system, a plotted line 1208 for all downtime for the glass cleaning components in the sorting system, a plotted line 1210 for all downtime for the metering drums in the sorting system, a plotted line 1212 for all downtime for the conveyors in the sorting system, and a plotted line 1214 for all downtime of the entire sorting system. Corrective action may be taken, if possible, to bring any plotted line 1206, 1208, 1210, 1212, and/or 1214 closer to having a zero value.

Figure 26:
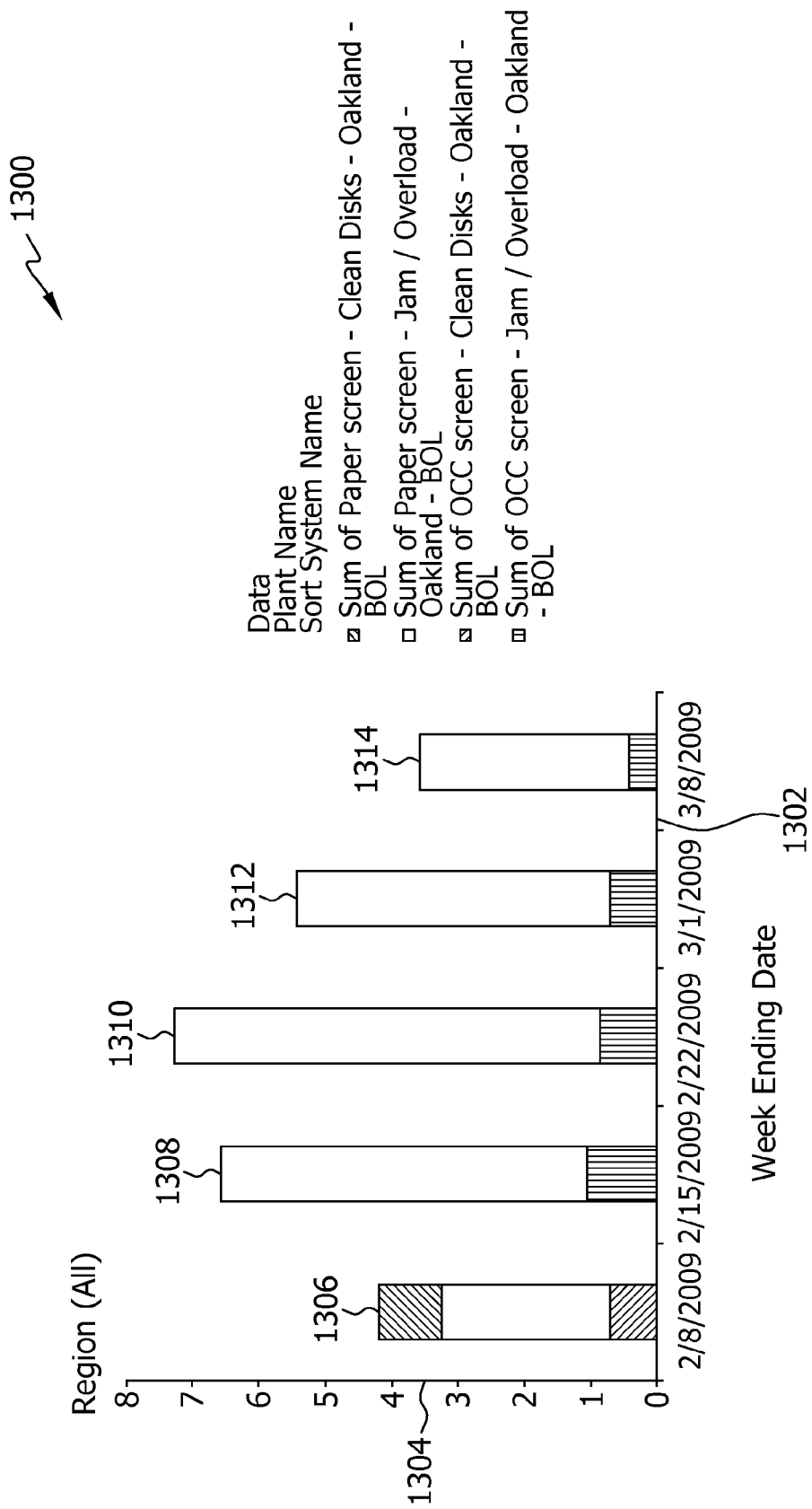

FIG. 26 is a representative downtime chart 1300 for a single sorting system, illustrating actual performance over time of the sorting system in terms of downtime per type of screen and downtime per reason. In chart 1300, a time is plotted on an X-axis 1302 in any suitable unit of time, such as weeks, and a length of downtime is plotted on a Y-axis 1304 in any suitable unit of time, such as hours. In the exemplary embodiment, chart 1300 includes a first bar 1306 having sections representing which screen experienced downtime for which reason during a first week, a second bar 1308 having sections representing which screen experienced downtime for which reason during a second week, a third bar 1310 having sections representing which screen experienced downtime for which reason during a third week, a fourth bar 1312 having sections representing which screen experienced downtime for which reason during a fourth week, and a fifth bar 1314 having sections representing which screen experienced downtime for which reason during a fifth week. The total height of each bar 1306, 1308, 1310, 1312, and 1314 illustrates a total downtime for the screens in the sorting system. Corrective action may be taken, if possible, to bring any bar 1306, 1308, 1310, 1312, and/or 1314 closer to having a zero value.

Figure 27:
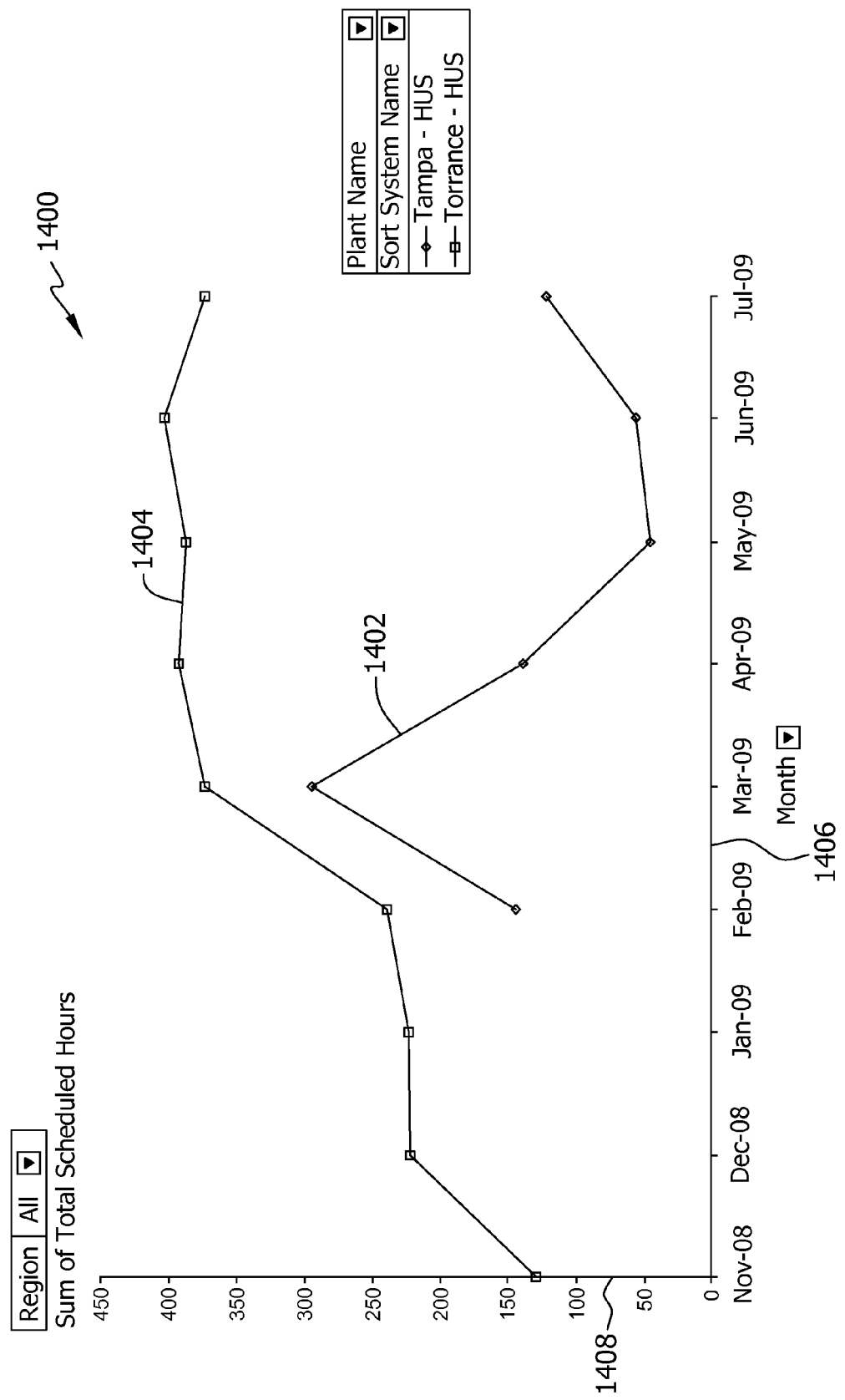

FIG. 27 is a representative sorting system comparison chart 1400 for a group of sorting systems that each correspond to one of the plotted lines 1402 or 1404 in chart 1400. In chart 1400, a time is plotted on an X-axis 1406 in any suitable unit of time, such as months, and a length of scheduled time is plotted on a Y-axis 1408 in any suitable unit of time, such as hours. In the exemplary embodiment, chart 1400 illustrates total scheduled hours for each sorting system represented in chart 1400. As such, chart 1400 can show which sorting systems are being used the most and/or are receiving more product streams to sort and/or which sorting systems have capacity to sort more product streams.

Figure 28:
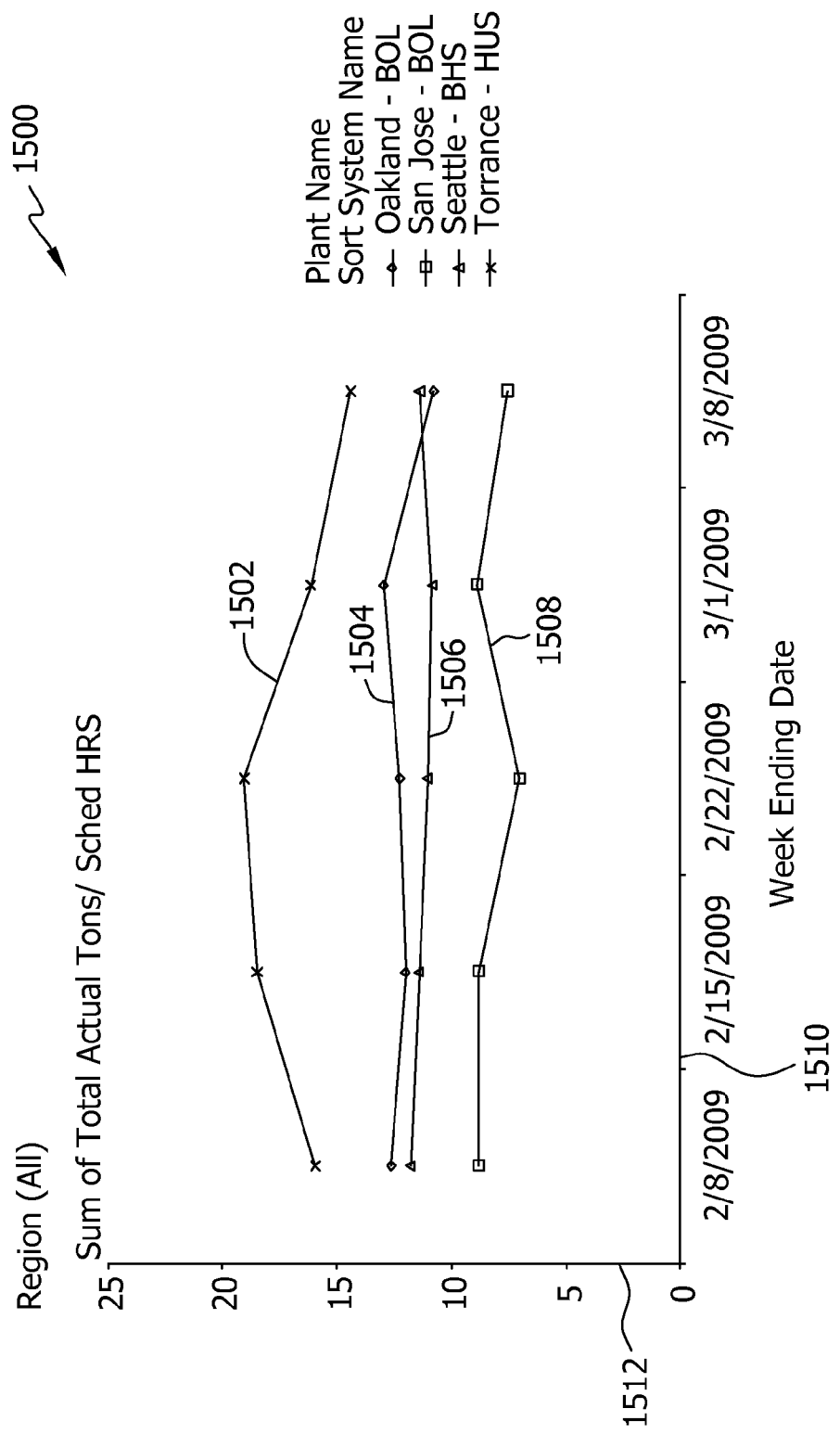

FIG. 28 is a representative sorting system comparison chart 1500 for a group of sorting systems that each correspond to one of the plotted lines 1502, 1504, 1506, or 1508 in chart 1500. In chart 1500, a time is plotted on an X-axis 1510 in any suitable unit of time, such as weeks, and a ratio of actual weight to scheduled time is plotted on a Y-axis 1512 in any suitable unit, such as tons/hour. Such a chart illustrates actual weights per scheduled hour to determine which sorting systems are outputting the most sorted commodities and/or are most efficiently sorting a product stream with the least amount of downtime. More specifically, because scheduled hours includes downtime and runtime, sorting systems having a lower actual output per scheduled hour may be experiencing more downtime. Using the systems and methods described herein, further investigation can be conducted to determine the cause of the lower output.

Figure 29:
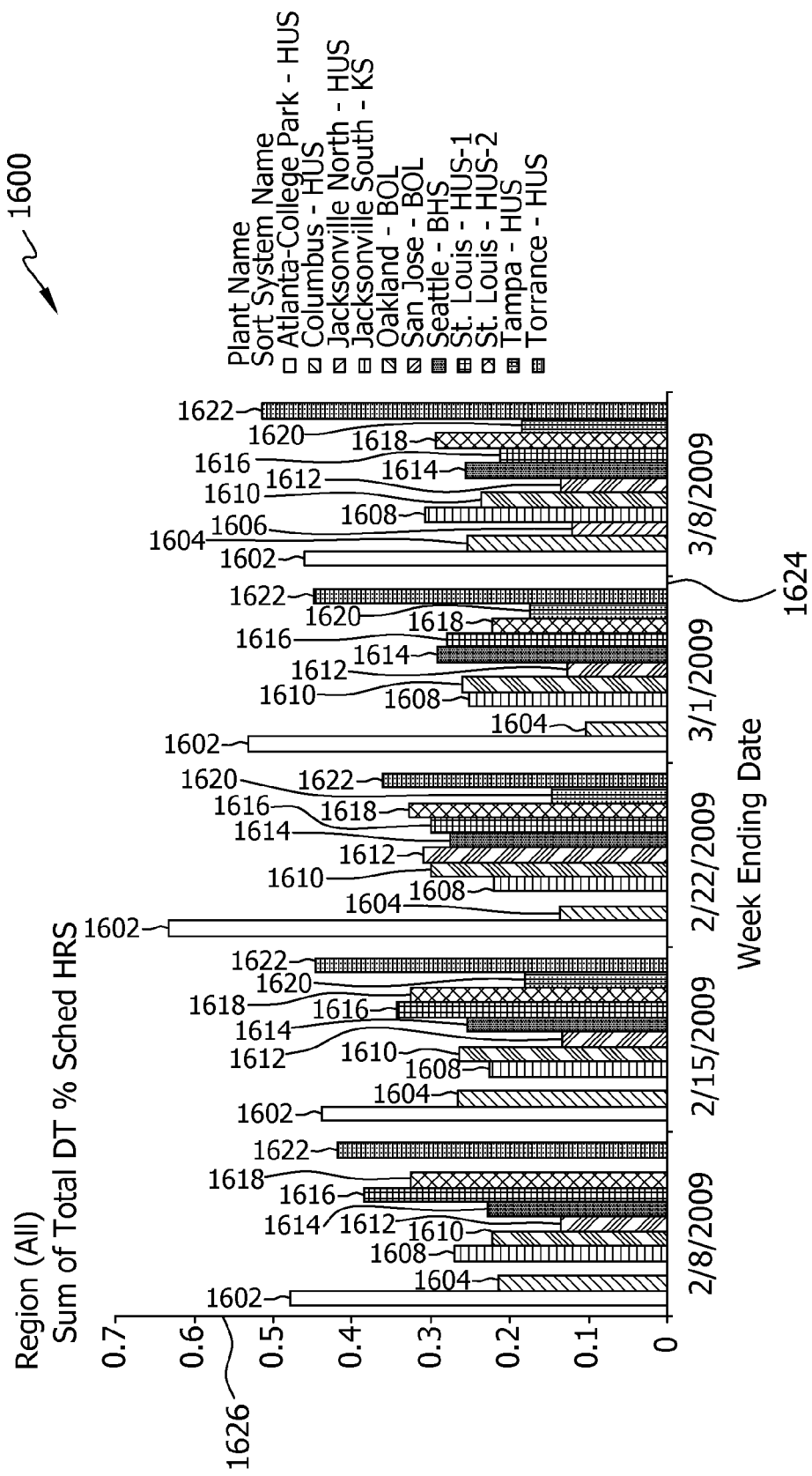

FIG. 29 is a representative sorting system comparison chart 1600 for a group of sorting systems that each correspond to one of the plotted bars 1602, 1604, 1606, 1608, 1610, 1612, 1614, 1616, 1618, 1620, or 1622 in chart 1600. In chart 1600, a time is plotted on an X-axis 1624 in any suitable unit of time, such as weeks, and a ratio of downtime to scheduled time is plotted on a Y-axis 1626 in any suitable unit or no unit, such as a percentage or index. Such a chart illustrates which sorting systems are experiencing the most downtime when they are operating. Using the systems and methods described herein, further investigation can be conducted to determine the cause of the higher percentages of downtime for certain sorting systems.

Such charts, as described above, can be particularly revealing in circumstances wherein otherwise similar or identical sorting systems are observed to exhibit greatly varying production characteristics. In particular, such a circumstance may reveal human-related issues in operating the sorting systems, including but not limited to, operation of a system at sub-optimal settings. Such a situation is extremely difficult to detect without monitoring interface 300 and performance interface 302 described herein. Using other data collected and analyzed by interfaces 300 and/or 302, further investigation into particular components, reasons, shifts, operators, and/or maintenance personnel experiencing longer downtimes can easily be conducted. Still other graphical charts could be provided to aid persons from having to review large amounts of data to draw similar conclusions.

While exemplary displays and reports have been described, it is understood that additional segments of code corresponding to additional tables, displays, links, graphics, information, and/or indicia may be provided in further embodiments, and further that not all of the exemplary information provided in the above-described displays, screens, and reports need be used in some embodiments of the invention. The displays and reports may be varied to suit the needs of specific equipment, installations, and users.

When the displays and reports are implemented with a network-based system as described above, the system may flexibly present information and perform analysis of sorting system data collection and performance installation through menu-driven graphical displays and information links. System users may quickly access needed information to properly manage and reliably evaluate the performance of complicated and expensive sorting systems. Detailed reports may likewise be saved on the system for further study and analysis.

VII. Conclusion

The systems and methods described herein provide a world-class operations performance module for sorting systems to improve efficiency and reduce downtime of sorting systems. More specifically, the systems described herein establish baselines to drive performance goals, trend system performance and throughput, and provide tools to analyze causal effects, quantify potential improvements, and/or direct focus on highest areas of return. By performing the above-described methods, an operator can determine which sorting systems experience the longest downtimes and/or which shifts, operators, and/or maintenance personnel experience the most downtime.

The above-described interfaces include an advanced scale technology for recording system throughput that also automatically records system downtime. More specifically, the monitoring interface has a recording capability of at least five major mechanical types on over ten major components, plus eleven system based causes. Further, the monitoring interface has the capability to use multiple scale sensors to track characterization. Moreover, the systems described herein can track run speeds for recovery comparisons for optimization. Shift reports can be generated and saved directly to a plant server daily to report both downtime and performance measures.

Additionally, the above-described systems and methods can be used to establish baselines to analyze year-over-year improvement, identify and quantify potential operational initiatives, match equipment to applications, measure opportunistic acquisition potential, and/or optimize capacity of a sorting system.

A technical effect of the systems and methods described herein includes at least one of: (a) recording downtime experienced by a sorting system; (b) recording runtime experienced by a sorting system; (c) recording throughput experienced by the sorting system; (d) recording an optimal characterization of a product stream to be sorted by a sorting system; (e) recording an actual characterization of the product stream as sorted by a sorting system; and (f) determining a performance of a sorting system based on at least two of a downtime, a runtime, an optimal characterization, and an actual characterization.

Exemplary embodiments of methods and systems for analyzing performance of a sorting system are described above in detail. The methods and systems are not limited to the specific embodiments described herein, but rather, components of systems and/or steps of the methods may be utilized independently and separately from other components and/or steps described herein. For example, the methods may also be used in combination with other systems and methods having performance based on many variables, and are not limited to practice with only the sorting systems and methods as described herein. Rather, the exemplary embodiment can be implemented and utilized in connection with many other performance analysis applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for analyzing performance of a sorting system, said method comprising:
   recording downtime experienced by the sorting system;
   recording runtime experienced by the sorting system;
   recording an optimal characterization of a product stream to be sorted by the sorting system, the optimal characterization including at least an optimal weight of a first commodity of the product stream;
   recording an actual characterization of the product stream as sorted by the sorting system, the actual characterization including at least an actual weight of the first commodity sorted from the product stream; and
   determining the performance of the sorting system based on at least two of the downtime, the runtime, the optimal characterization, and the actual characterization.

2. A method in accordance with claim 1, wherein a plurality of product streams are sorted by the sorting machine, and determining the performance of the sorting system comprises:
   comparing a downtime and an actual characterization for a first product stream of the plurality of product streams with a downtime and an actual characterization for a second product stream of the plurality of product streams; and
   determining whether the first product stream or the second product stream has a higher level of recovery based on the comparison.

3. A method in accordance with claim 1, wherein determining the performance of the sorting system comprises;
   determining a scheduled time;
   determining a ratio of the actual characterization with respect the scheduled time;
   determining a ratio of the actual characterization with respect to the runtime; and
   determining the performance based on the ratios.

4. A method in accordance with claim 3, further comprising:
   determining a ratio of the optimal characterization with respect the scheduled time;
   determining a ratio of the optimal characterization with respect to the runtime; and
   comparing at least two of the ratios to determine the performance of the sorting system.

5. A method in accordance with claim 1, wherein the sorting system experiences a plurality of downtimes and a plurality of runtimes, said method further comprising:
   recording shift information, operator information, and maintenance information associated with each downtime and each runtime; and
   comparing the plurality of downtimes with respect to at least one of the shift information, the operator information and the maintenance information to determine the performance of the sorting system.

6. A method in accordance with claim 1 further comprising:
   recording a number of hand picks with respect to time; and
   determining the performance of the sorting system using at least the number of hand picks with respect to time.

7. A method in accordance with claim 1 further comprising:
   determining a performance for each sorting system of a plurality of sorting systems; and
   comparing the performances of the plurality of sorting systems with each other to facilitate increasing the performance of at least one sorting system of the plurality of sorting systems.

8. A sorting system comprising:
   at least one sensor positioned within said sorting system;
   a computer system coupled in communication with said at least one sensor to receive data from said at least one sensor, said computer system configured to:
   record downtime experienced by said sorting system;
   record runtime experienced by said sorting system;
   record an optimal characterization of a product stream to be sorted by said sorting system, the optimal characterization including at least an optimal weight of a first commodity of the product stream;
   record an actual characterization of the product stream as sorted by said sorting system, the actual characterization including at least an actual weight of the first commodity sorted from the product stream; and
   determine the performance of said sorting system based on at least two of the downtime, the runtime, the optimal characterization, and the actual characterization.

9. A sorting system in accordance with claim 8, wherein said computer system comprising a monitoring system located within said sorting system.

10. A sorting system in accordance with claim 8, wherein said at least one sensor comprising at least one of a scale sensor, a motor sensor, and an eye sensor.

11. A sorting system in accordance with claim 8, wherein said computer system is configured to:
    determine whether the data received from said at least one sensor indicates that at least a portion of said sorting system is experiencing the downtime;
    when the received data indicates that at least a portion of said sorting system is experiencing downtime:
    begin recording of the downtime; and
    qualify the downtime; and when the received data indicates that at least the portion of said sorting system has been enabled, said computer system is configured to end the recording of the downtime.

12. A sorting system in accordance with claim 8, wherein said computer system is configured to:

weigh the product stream as the product stream is fed into said sorting system; and weigh the first commodity sorted from the product stream to determine the actual weight of the first commodity.

* * * * *